(12) United States Patent
Mihara

(10) Patent No.: US 6,198,769 B1
(45) Date of Patent: Mar. 6, 2001

(54) METHOD AND APPARATUS FOR CONTROLLING A TARGET AMOUNT OF CODE AND FOR COMPRESSING VIDEO DATA

(75) Inventor: Kanji Mihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/201,517

(22) Filed: Nov. 30, 1998

Related U.S. Application Data

(62) Division of application No. 08/820,007, filed on Mar. 18, 1997, now Pat. No. 6,100,931.

(30) Foreign Application Priority Data

Mar. 19, 1996 (JP) .................................................... 8-063327
Mar. 27, 1996 (JP) .................................................... 8-072855
Apr. 12, 1996 (JP) .................................................... 8-091313

(51) Int. Cl.[7] ..................................................... H04N 7/12
(52) U.S. Cl. ........................................................ 375/240.12
(58) Field of Search .............................. 375/240, 240.12, 375/240.01, 240.02; 348/415; H04N 7/12

(56) References Cited

U.S. PATENT DOCUMENTS

| | | | |
|---|---|---|---|
| 5,214,507 | * | 5/1993 | Aravind et al. ..................... 348/390 |
| 5,231,484 | * | 7/1993 | Gonzales et al. .................... 348/407 |
| 5,245,427 | * | 9/1993 | Kunihiro ............................. 348/409 |
| 5,291,282 | * | 3/1994 | Nakagawa et al. .................. 348/384 |
| 5,694,170 | * | 12/1997 | Tiwari et al. ........................ 348/390 |

FOREIGN PATENT DOCUMENTS 7-193818 * 7/1995 (JP) ............................... H04N/7/137

* cited by examiner

*Primary Examiner*—Young Lee
(74) *Attorney, Agent, or Firm*—Frommer Lawrence & Haug, LLP.; William S. Frommer; Dennis M. Smid

(57) ABSTRACT

An apparatus and method for encoding input video data representative of a number of group of pictures (GOPs) each having a plurality of fields or frames. The apparatus includes a first encoder for processing received input video data so as to determine difficulty data of a field or frame which is indicative of the difficulty of the video data, a computing device for determining a target code amount representative of an amount of data to be utilized in accordance with the difficulty data of a number (N) of the fields or frames, and a second encoder for encoding the received video data in accordance with the target code amount. The computing device determines the target code amount such that the target code amount for an ith field or frame is determined in accordance with the difficulty data of the N fields or frames from a jth field or frame, the target code amount for an ith+1 field or frame is determined in accordance with the difficulty data of the N fields or frames from a jth+1 field or frame, the target code amount for an ith+2 field or frame is determined in accordance with the difficulty data of the N fields or frames from a jth+2 image, and so forth. As a result, an acceptable allocation of bits may be provided for the encoding processing such that an image may be restored with a relatively high quality.

34 Claims, 24 Drawing Sheets

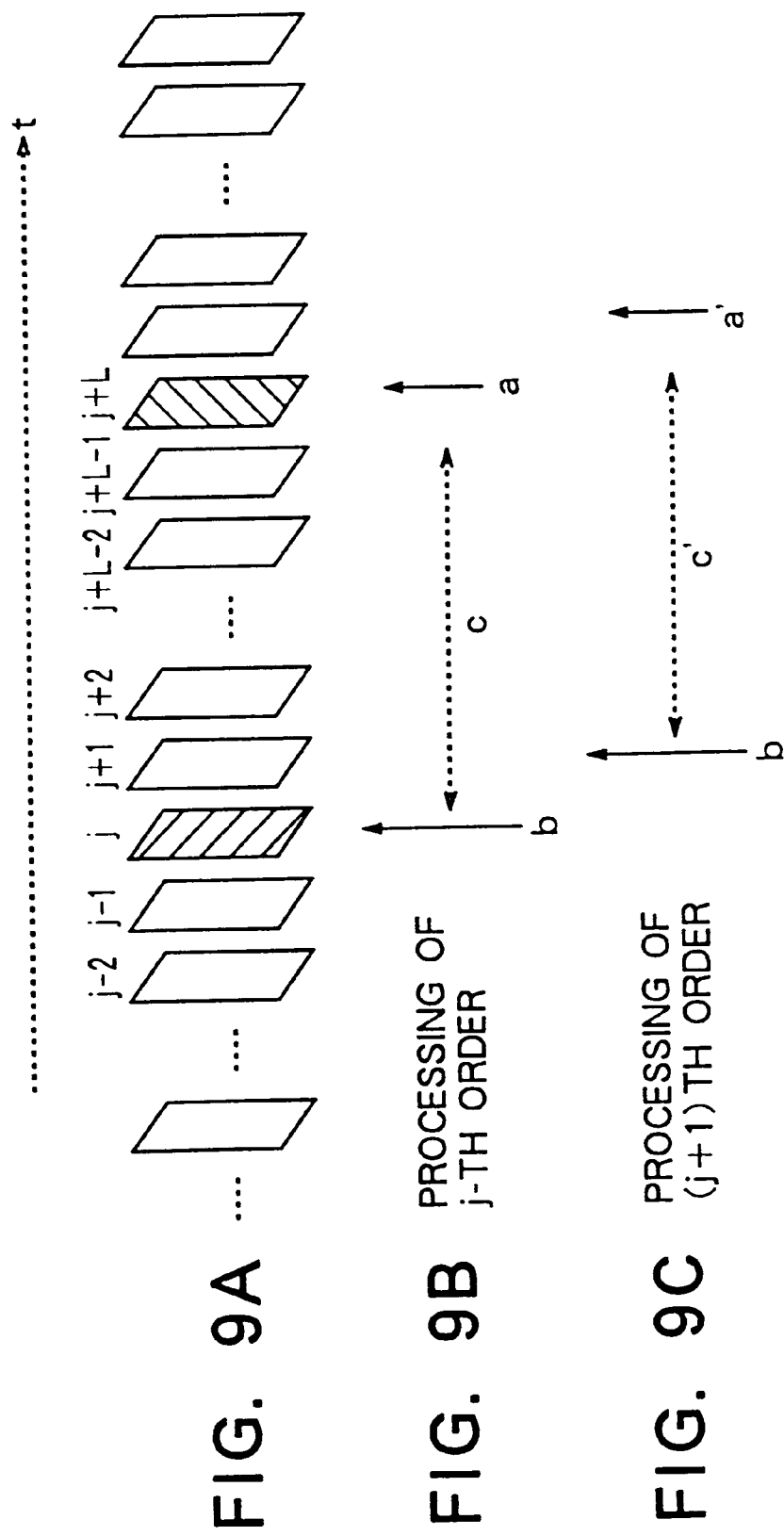

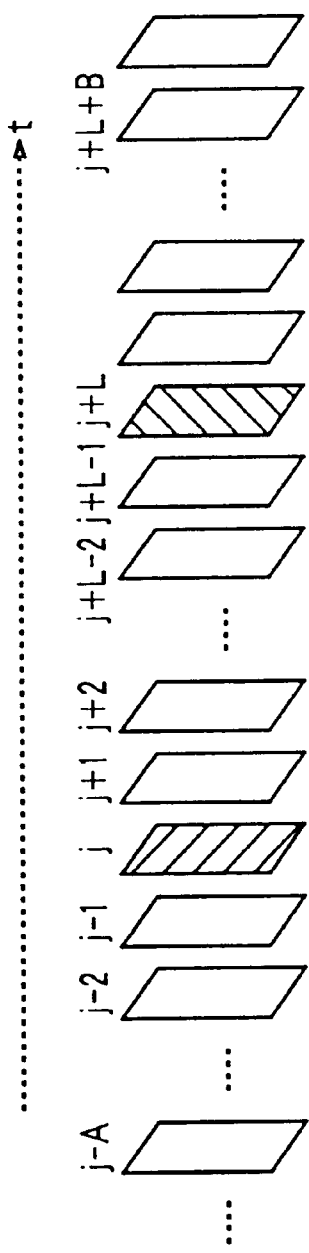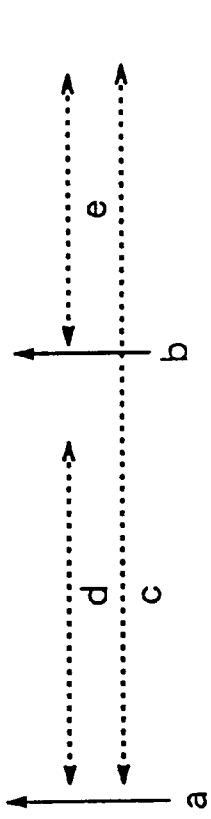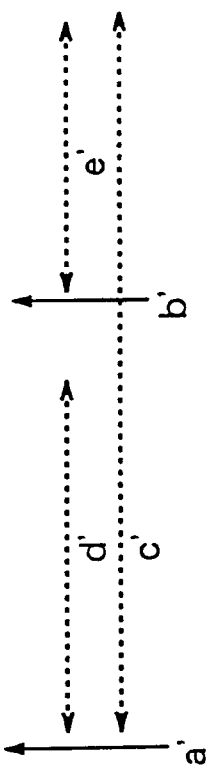
FIG. 10A
FIG. 10B
FIG. 10C

METHOD AND APPARATUS FOR CONTROLLING A TARGET AMOUNT OF CODE AND FOR COMPRESSING VIDEO DATA

This application is a divisional of U.S. application Ser. No. 08/820,007 filed Mar. 18, 1997 now U.S. Pat. No. 6,100,931 which issued on Aug. 8, 2000.

BACKGROUND OF THE INVENTION

The present invention relates to a method and apparatus for determining a target amount of code which may be used in a digital video disc (DVD) or the like or in a system for transmitting digital video broadcasting (DVB) digital data, and to a method and apparatus for compressing and coding noncompressed video data.

Techniques for reducing the amount of data during recording by converting video and audio signals to digital data and applying conversion and coding processing to the digital data have been standardized by MPEG (Moving Pictures Expert Group). Such processing may involve inter- or intra-coding of the video data for every macro block. In MPEG, a group of pictures (GOP) may include one frame or picture subjected to intra-coding (an I-picture), and a plurality of frames or pictures subjected to inter-coding which includes predictive coding (P-pictures) and bidirectional predictive coding (B-pictures).

In inter-coding processing, coding processing is applied to the difference between the video data of a current frame and the video data of a past frame. As is to be appreciated, the video data of the current frame may be easily obtained or restored if the video data of the past frame has been already sent.

In determining the above-described difference between frames of video data, motion detection and motion compensation processing may be performed.

Motion detection processing involves detecting or determining the position or macroblock in a past reference frame in which the sum of absolute values of differences of pixel values between such macroblock and the respective macroblock of the current frame is the smallest. Such detection may be performed by determining the number of pixels the macroblock needs to be moved from the position of the respective current frame macroblock in an X- and Y-direction such that the sum of absolute values of differences of the pixel values between the respective current frame macroblock and the reference frame macroblock is the smallest. Data representative of such amount of movement in units of pixels in the X- and Y-directions may be referred to as motion vector data.

Motion compensation processing involves determining a position based upon the motion vector data and the position of the past reference frame macroblock and extracting macroblock data pertaining to such position. Thereafter, the difference between the extracted past reference macroblock and the current respective macroblock, or the motion predictive error, is determined. The past reference frame may be obtained from a local decoder.

The motion predictive error signal may be subjected to orthogonal transformation, such as discrete cosine transformation (DCT) in units of predetermined blocks so as to remove the correlation in the space direction. From such DCT processing, transformed DCT coefficient(s) may be obtained which are subjected to quantization processing (that is, division by a quantization step) to eliminate fine signals whereafter the whole number value of such quotient and a quantization index are outputted. The quantized DCT coefficient(s), the quantized index, and the motion vector data may be variable length coded (VLC) and outputted.

In intra-coding processing, on the other hand, the above-described motion detection and motion compensation processing are not performed. Instead, pixel values are orthogonal transformed in block units, quantized, variable length coded, and outputted.

The above-described processing removes the redundancy in the time and space directions of the video data, thereby compressing the information data. Such compression enables image and audio data to be recorded on a single optical disk (such as a digital video disc-DVD), or a moving picture and audio data to be transmitted within the transmission line capacity of a telecommunications line or a satellite line.

Consider a situation wherein a DVD, a ROM disk, or the like is used. In such situation, the compressed and coded video data should be contained within the capacity of the disc. To accomplish such requirement, so-called variable rate coding may be utilized wherein the amounts of codes are allocated within the range of the amount of code so as to obtain the highest image quality. Such coding method utilizes or accounts for the fact that difficulty in image compression may fluctuate with time due to constant changes of the correlation strength of the video data in the time and space directions.

An example of the above-described fluctuation or change of correlation strength in the time direction will now be presented. A pattern of movement of a moving body in a moving picture may include not only simple parallel movement, but also complex movement patterns such as a change of movement speed, movement direction of the moving body, and shape of the moving body. In such a situation, the motion predictive error data may be increased by motion compensation in a manner as previously described. Alternatively, in moving picture data having little or no correlation in a time direction (such as random noise), the effect of compression by motion compensation may be negligible and motion predictive error data not much different in amount and/or data from that of the current frame may be generated. Such fluctuation in the difficulty of the image compression may exist not only with frame units, but also with other types of units such as GOP units, macroblock units, and so forth.

Accordingly, when compressing and coding data which fluctuates in difficulty (such as video data having a low correlation in the time and space directions) by a uniform bit rate (hereinafter, a "target code rate") per unit time, the DCT coefficient(s) may be quantized by a relatively large quantization step so that the generated code rate approaches the target code rate. As such, a relatively large quantization error may result and noticeable or conspicuous coding distortion may occur when expanding and decoding the data. On the other hand, when compressing and coding data having a low fluctuation in difficulty (such as video data having a high correlation in the time and space directions), the DCT coefficient (s) may be concentrated at the low frequency component side so as to finely quantize the same by a relatively small quantization step so that the generated code rate approaches the target code rate or target code amount. As a result, distortion after expansion and decoding of the data may be reduced.

Therefore, in recording on DVDs or the like, to avoid coding distortion due to image fluctuation over time and the deterioration of the image quality, variable length coding using a so-called 2 path or 2-pass encoding technique may be utilized. In such 2-pass encoding technique, video data is compressed and coded by a fixed quantization step, and the amount of codes generated is defined as the difficulty data and stored in a first pass or path, and, during a second path or pass, compression and coding are performed based on the difficulty data such that a relatively large amount of code may be allocated to difficult video data and a relatively small amount of code may be allocated to non-difficult video data. (The term "difficult data" refers to the amount of data necessary to obtain a certain constant image quality.)

In the above-described 2-pass encoding technique, the actual encoding (second pass) commences after encoding all of the video data in the first pass. As a result, it is very difficult, if not impossible, to perform such technique on supplied video and audio data with no interruption(s). Due to such limitation, such 2-pass encoding technique may not be suitable for encoding at the time of communication and broadcasts in which relatively long data streams should be encoded without interruption and in real time.

Alternatively, a 2-path or 2-pass technique may be utilized which uses two encoders, that is, a first encoder for encoding data passing through a memory having an FIFO (first-in first-out) configuration and a second encoder for encoding the data not passing through such memory. Hereinafter, this 2-pass encoding technique will be referred to as a "simplified 2-pass encoding" technique to distinguish it from the above 2-pass encoding technique. In the simplified 2-pass encoding technique, difficulty information of the received data is obtained in the first path or pass and the data is encoded using the obtained difficulty information in the next path or pass. Two types of simplified 2-pass encoding techniques may be utilized. In one type, a target amount of bits of each GOP is determined based on difficulty information of several GOPs. This type may be considered rate control in units of GOPs. The other type controls the target amount of bits in each picture unit in the GOP and may be considered rate control in units of pictures.

In the simplified 2-pass encoding, difficulty information may be obtained from a number (K) of GOPs and utilized for such GOPs. As such, information pertaining to patterns before and after the K number of GOPs may not be utilized in obtaining the difficulty information for any of such K GOPs. However, utilizing such obtained difficulty information, without using the information of the patterns before and after the K GOPs, may present a problem upon encoding the data. Such problem will be explained hereinbelow with reference to FIGS. 5A to 5D.

Assume that the difficulty of input materials or data is as shown in FIG. 5A. (In FIG. 5A, the ordinate axis represents the difficulty, and the abscissa axis represent time in GOP units. Further, in FIG. 5, the amount or length of the difficulty data which may be obtained in advance, that is, the capacity of the FIFO memory, is 2 GOPs.) As shown in FIG. 5A, the difficulty of the input data gradually rises to a high value in the period of the first two GOPs, falls to a low value at the start of the period of the next two GOPs and remains at such low value for the remainder of this period, rises to a high value after entering the period of the next two GOPs and gradually falls to a low value thereafter. (In FIG. 5, the difference of difficulty according to picture type is ignored for simplification.) Ideally, input data having a difficulty distribution as shown in FIG. 5A should have an amount of bits allocated in proportion to such difficulty distribution as shown in FIG. 5B. Such ideal bit amount distribution provides equitable arrangement in that it enables a large amount of bits to be used for a difficult pattern and a small amount of bits to be used for a simple pattern. Further, such distribution may enable encoding to be performed without deteriorating (or without significant deterioration of) the image quality. (As a reference, the average amount or rate is shown in FIG. 5B by a broken line.)

FIG. 5C illustrates an allocation of the amount of bits in GOP units obtained by the simplified 2-pass encoding. As shown therein, such bit allocation is flat or constant within each GOP unit and is not proportional to the difficulty distribution shown in FIG. 5A. Such flat or constant allocation in each GOP is the result of allocating the amount of bits in units of GOPs.

FIG. 5D illustrates an allocation of the amount of bits in picture units obtained by the simplified 2-pass encoding. Since the allocation of the amount of bits is performed in units of pictures, such bit allocation is proportional to the difficulty distribution shown in FIG. 5A. However, such bit allocation of FIG. 5D is smaller in several portions thereof (that is, the first and last third) than that shown in FIG. 5B. Such difference in bit allocation is a result of allocating the amount of bits in units of two GOPs. That is, if the allocation of the amount of bits is determined in units of two GOPs, the amount of allocated bits may be insufficient within two GOPs having a difficult pattern or wherein a difficult pattern continues, and the amount of allocated bits may be excessive within two GOPs having a simple pattern or wherein a simple pattern continues.

Therefore, the above-described simplified 2-pass encoding technique may not provide a proper allocation of bits.

Further, when compressing and coding noncompressed digital video data by the method of the MPEG (Moving Picture Experts Group) or the like and recording the same on a recording medium such as a magneto-optical disc (MO disc), it is necessary to reduce the amount of data (bit amount) of the compressed video data after the compression and coding to less than the recording capacity of the recording medium while enhancing the quality of the video after expansion and decoding as much as possible.

In order to satisfy this need, there has been adopted a method of first preliminarily compressing and coding the noncompressed video data and estimating the amount of data after the compression and coding (first path), then adjusting the compression rate based on the estimated amount of data and carrying out the compression and coding so that the amount of data after the compression and coding becomes less than the recording capacity of the recording medium (second path) (hereinafter, such a compressing and coding method will be described as "two-path encoding" too).

When carrying out the compression and coding by the two-path encoding, however, it is necessary to apply similar compressing and coding processing two times with respect to the same noncompressed video data, so a long time is taken. Further, since the final compressed video data cannot be generated by one compressing and coding processing, it is not possible to compress and code and record the captured video data in real time as it is.

Furthermore, when compressing and coding noncompressed digital video data in units of GOPs (groups of pictures) comprised by I-pictures (intra-coded pictures), B-pictures (bi-directionally coded pictures), and P-pictures (predictive coded pictures) by the method of the MPEG (Moving Picture Experts Group) or the like and recording the same on a recording medium such as a magneto-optic disc (MO disc), it is necessary to reduce the amount of data (amount of bits) of the compressed video data after the compression and coding to less than the recording capacity of the recording medium or less than the transmission capacity of the communication line while maintaining a high quality of the video after expansion and decoding.

For this purpose, there is adopted a method in which the noncompressed video data is first preliminarily compressed and coded and the amount of data after the compression and coding is estimated (first path), then a compression rate is adjusted based on the estimated amount of data and the compression and coding are carried out so that the amount of data after the compression and coding becomes less than the recording capacity of the recording medium (second path) (hereinafter, such a compressing and coding method will be also referred to as "two-path encoding").

When carrying out the compression and coding by the two-path encoding, however, it is necessary to apply similar compressing and coding processing two times with respect to the same noncompressed video data, so a long time is taken. Further, since the final compressed video data cannot be generated by one compressing and coding processing, it is not possible to compress and code and record the captured video data in real time as it is.

Further, when a plurality of series of noncompressed video data (hereinafter, also referred to as scenes) not correlated in the time direction are continuously connected to obtain one series of noncompressed video data by edit processing (edited video (Y data) and this edited video data is compressed and coded by for example a picture type sequence I, B, P, B, P, B, P, B, P, B, P, B, the first picture after the compression and coding sometimes becomes the P-picture. In order to expand and decode this first P-picture, it is necessary to refer to the picture immediately before the compressed video data generated from the other scene. When a picture generated from another scene not having correlation is used for the expansion and decoding of the first P-picture, however, the motion prediction error is considerably increased and therefore an enormous amount of data becomes necessary. Where only a limited amount of data can be used, the video after the expansion and decoding is deteriorated.

Japanese Unexamined Patent Publication No. 7-193818 discloses an image processing method and an image processing apparatus to solve such a problem. In the image processing method and the image processing apparatus disclosed in Japanese Unexamined Patent Publication No. 7-193818, when the noncompressed edited video data containing for example two scenes (a first scene and a second scene) is compressed and coded by for example the above picture type sequence I, B, P, B, P, B, P, B, P, B, P, B, the compression and coding are carried out by changing the leading P-picture of the second compressed video data ($I_2$, $B_2$, $P_2$ in the following picture type sequence) obtained by compressing and coding the second scene to the I-picture not referring to the last picture of the first compressed video data ($I_1$, $B_1$, $P_1$ in the following picture type sequence) obtained by compressing and coding the first scene and further changing the last I-picture of the first compressed video data to the P-picture so as to suppress an increase of the amount of the data generated.

That is, specifically, the image processing method and the image processing apparatus disclosed in Japanese Unexamined Patent Publication No. 7-193818 are constituted so that when the compression and coding are carried out without a change of the picture type sequence and the first compressed video data and the second compressed video data are obtained by a picture type sequence $B_1$, $I_1$, $B_1$, $P_1$, $B_1$, $P_1$, $B_1$, $P_2$, $B_2$, $P_2$, $B_2$, $P_2$, $B_2$, the last I-picture of the first compressed video data is changed to the P-picture, and further the first P-picture of the second compressed video data is changed to the I-picture to perform the compression and coding and thereby obtain the first compressed video data and the second compressed video data of the picture type sequence $B_1$, $P_1$, $B_1$, $P_1$, $B_1$, $P_1$, $B_1$, $I_2$, $B_2$, $P_2$, $B_2$, $P_2$, $B_2$.

OBJECTS AND SUMMARY OF THE INVENTION

An object of the present invention is to provide a method and apparatus for encoding input data which provides a more proper allocation of bits for input data as compared to the above-described encoding techniques so as to provide a relatively high quality restored image.

A further object of the present invention is to provide a video data compressing apparatus with which a high quality video can be obtained when expanding and decoding the compressed video data which was compressed and coded to less than a predetermined amount of data not according to the two-path encoding and a method of the same.

Another object of the present invention is to provide a video data compressing apparatus with which the amount of the compressed video data after the compression and coding is estimated, the compression rate is adjusted based on the estimated amount of the compressed video data, and the noncompressed video data can be compressed and coded not according to the two-path encoding and a method of the same.

A still further another object of the present invention is to provide a video data compressing apparatus with which the noncompressed video data can be compressed and coded while estimating the amount of data of the compressed video data after the compression and coding with a high precision not according to the two-path encoding and a method of the same.

A further object of the present invention is to provide a video data compressing apparatus with which the compressed video data can be generated by compressing and coding video data continuously containing a plurality of scenes less than a predetermined amount of data without relying on 2-path encoding and in addition with which the quality of the video obtained by expanding and decoding the compressed video data obtained by compressing and coding the boundary (scene change) part in the time direction of successive plurality of scenes can be held and a method of the same.

In accordance with an aspect of the present invention, a method for encoding input video data is provided which comprises the steps of encoding the input video data in a first coding device and, substantially simultaneously therewith, delaying the input video data by a delaying device and supplying the delayed output to a second coding device, determining a target amount of code based on difficulty data indicative of the difficulty of the video data determined by the encoding in the first coding device, and utilizing the target amount of code when coding the video data from the delaying device by the second coding device. The step of determining the target amount of code includes multiplying an average amount of bits allocated to L number of images by a ratio of the difficulty of the image to be coded to a sum of difficulties indicative of the difficulty of the subsequent L number of images so as to determine the target amount of code each time an image is coded.

In accordance with another aspect of the present invention, an apparatus for encoding input video data representative of a plurality of images is provided which comprises a device for receiving the input video data, a device for delaying the received video data by a predetermined amount, a computing device for determining a target code amount in accordance with difficulty data of a number (N) of the images, and a device for encoding the received input video data so as to determine the difficulty data of each image which is indicative of the difficulty of the video data and for encoding the delayed video data in accordance with the target code amount. The computing device determines the target code amount such that the target code amount for an ith image is determined in accordance with the difficulty data of the N images from a jth image, the target code amount for an ith+1 image is determined in accordance with the difficulty data of the N images from a jth+1 image, the target code amount for an ith+2 image is determined in accordance with the difficulty data of the N images from a jth+2 image, and so forth.

A video data compressing apparatus according to the present invention has a first compressing and coding means for compressing and coding noncompressed video data which is input for every picture by a predetermined compressing and coding method to generate first compressed and coded data; a delaying means for delaying the noncompressed video data by exactly a time during which a predetermined number of pictures of the noncompressed video data is input; a target value data generating means for generating the target value data indicating the target value of the amount of the compressed video data after compressing and coding the noncompressed video data for every picture based on the amount of the first compressed and coded data generated during a period when the predetermined number of pictures of the noncompressed video data is input; and a second compressing and coding means for compressing and coding the delayed noncompressed video data for every picture so that the amount has a value indicated by the generated target value data by a compressing and coding method corresponding to the compressing and coding method of the first compressing and coding means to generate second compressed and coded data, wherein the target value data generating means predicts the amount of the still ungenerated first compressed and coded data based on the amount of the first compressed and coded data generated during a period when the predetermined number of pictures of the noncompressed video data is input to generate the target value data based on the amount of the generated first compressed and coded data and the amount of the predicted still ungenerated first compressed and coded data.

Preferably, the delaying means delays the noncompressed video data by exactly a time for which L number of pictures of the noncompressed video data is input; and when the second compressing and coding means compresses and codes a j-th picture of the delayed noncompressed video data, the target value data generating means predicts the amount of data of a (J+L)th picture to a (J+L+B)th picture of the first compressed video data based on the amount of data of a (J−A)th picture to a (J+L−1)th picture of the first compressed video data generated by compressing and coding the (J−A)th picture to the (J+L−1)th picture of the noncompressed video data by the first compressing and coding means and generates the target value data based on the amount of data of the (J−A)th picture to the (J+L−1)th picture of the first compressed video data and the (J+L)th picture to the (J+L+B)th picture of the predicted first compressed video data (where, A, B, and j are integers).

Preferably, the target value data generating means finds a predetermined function based on a mean value of the amount of data of the (J−A)th picture to the (J+L−1)th picture of the generated first compressed video data and a change of the amount of data of the (J−A)th picture to the (J+L−1)th picture of the first compressed video data along with the elapse of time; predicts the amount of data of the (J+L)th picture to the (J+L+B)th picture of the first compressed video data based on the found predetermined function; and generates the target value data based on the amount of data of the (J−A)th picture to the (J+L−1)th picture of the first compressed video data and the amount of data of the (J+L)th picture to the (J+L+B)th picture of the predicted first compressed video data.

Preferably, the target video data generating means finds the predetermined function by integrating a primary function approximating the amount of data of the (J−A)th picture to the (J+L−1)th picture of the first compressed video data indicated by this function and the change of the amount of data of the (J−A)th picture to the (J+L−1)th picture of the generated first compressed video data along with the elapse of time.

Preferably, the target value data generating means finds the predetermined function so that a square sum of each of the values of difference between the amount of data of the (J−A)th picture to the (J+L−1)th picture of the first compressed video data indicated by this predetermined function and the amount of data of the (J−A)th picture to the (J+L−1)th picture of the generated first compressed video data or an absolute value sum becomes a minimum.

Preferably, the target value data generating means uses the primary function as the predetermined function.

Preferably, the target value data generating means finds the predetermined function by performing weighing greater for the value of the difference nearer the j-th picture of the first compressed video data in time.

Preferably, the first compressing and coding means generates the first compressed video data in GOP units by compressing and coding the noncompressed video data which is input and the target value data generating means predicts the amount of data of the still ungenerated first compressed and coded data in units of GOPs based on the amount of data of the GOP units of the first compressed video data.

Preferably, the first compressing and coding means compresses and codes the noncompressed video data which is input to generate the first compressed video data in GOP units containing a plurality of types of pictures and the target value data generating means normalizes the amount of data of the first compressed video data for every type of the pictures contained in the GOP of the first compressed video data and predicts the amount of data of the still ungenerated first compressed and coded data based on the amount of data of the normalized first compressed video data.

In the video data compressing apparatus according to the present invention, the first compressing and coding means successively compresses and codes the noncompressed digital video data input from the outside for every picture by a compressing and coding method such as the MPEG to generate the first compressed and coded data used for estimating the amount of data after the compression and coding.

The delaying means delays the noncompressed video data by exactly a time during which for example L number of pictures of the noncompressed video data is input so as to obtain the first compressed and coded data sufficient for estimating the amount of data after the compression and coding.

The target value data generating means successively generates the target value data indicating the target value of the amount of data after the compression and coding. When the second compressing and coding means suppresses the amount of the compressed video data after the compression and coding to less than the recording capacity of the recording medium or transmits the compressed video data via a predetermined communication line, it holds the data within a range where an overflow and underflow are not caused in a receiving buffer of the transmitting apparatus and in addition holds the quality of the compressed video data.

For this purpose, when the second compressing and coding means compresses and codes the j-th picture of the delayed noncompressed video data, the target value data generating means uses the amount of data from the (J−A)th to (J+L−1)th pictures of the first compressed video data obtained from the (J−A)th to (J+L−1)th pictures of the noncompressed video data and the amount of data from the (J+L)th to (J+L+B)th pictures of the first compressed video data which are predicted from the (J−A)th to (J+L−1)th pictures of the first compressed video data and actually have not yet been generated at this point of time as indexes indicating the complexity (difficulty) of the pattern of the noncompressed video data and allocates the amount of data so that the j-th picture of the noncompressed video data is compressed and coded to the amount of data in accordance with the complexity of that pattern.

That is, the target value data generating means first calculates the mean value of the amount of data of the first compressed video data of the amount of (L+A) pictures from the (J−A)th to (J+L−1)th pictures of the first compressed video data or finds the center value.

Next, the target value data generating means predicts the amount of data from the (J+L)th picture to the (J+L+B) th picture of the first compressed video data which has not yet been generated based on the calculated mean value or found center value.

Further, the target value data generating means generates a higher precision target value data when compared with the case where only the amount of data from the (J−A)th to (J+L−1)th pictures of the first compressed video data is used by using the amount of data from the (J−A)th to (J+L−1)th pictures of the first compressed video data and the amount of data from the (J+L)th to (J+L+B)th pictures of the predicted first compressed video data.

The second compressing and coding means compresses and codes the noncompressed video data delayed by exactly an amount of L number of pictures by the delaying means so that it becomes the amount of data indicated by the target value data to generate the second compressed video data by the same method as that by the first compressing and coding means.

The second compressed video data generated in this way is output as the compressed video data obtained as a result of the final compressing and coding processing by the video data compressing apparatus according to the present invention and recorded on for example a recording medium or transmitted via a predetermined communication line.

Further, the video data compressing method according to the present invention comprises compressing and coding the noncompressed video data which is input for every picture by a predetermined compressing and coding method to generate first compressed and coded data; delaying the noncompressed video data by exactly a time in which a predetermined number of pictures of the noncompressed video data is input; predicting the amount of the still ungenerated first compressed and coded data based on the amount of the first compressed and coded data generated during a period when the predetermined number of pictures of the noncompressed video data is input; generating the target value data indicating the target value of the amount of the compressed video data after compressing and coding the noncompressed video data for every picture based on the amount of data of the generated first compressed and coded data and the amount of data of the predicted still ungenerated first compressed and coded data; and compressing and coding by the predetermined compressing and coding method the delayed noncompressed video data for every picture to generate second compressed and coded data so that the amount of data has the value indicated by the generated target value data.

A video data compressing apparatus according to the present invention has a picture rearranging means for rearranging pictures of a successive plurality of series of noncompressed video data in a predetermined order; a first compressing means for compressing the plurality of series of noncompressed video data rearranged in order by a predetermined compressing method by a predetermined picture type sequence comprised of a plurality of types of pictures to generate first compressed video data; a delaying means for delaying the noncompressed video data by exactly a time during which a predetermined number of pictures of the noncompressed video data are input; a target value data generating means for generating target value data indicating the target value of the amount of data of each of the pictures of the compressed video data generated from the plurality of series of noncompressed video data based on a sum of the amounts of data of the first compressed video data generated during a period where the predetermined number of pictures of the noncompressed video data are input and on the type of the picture of the first compressed video data generated from the picture of a boundary part of a time direction of the plurality of series of noncompressed video data; and a second compressing means for compressing the delayed plurality of series of noncompressed video data by a compressing method corresponding to the compressing method of the first compressing means so that the amount of data becomes the target value indicated by the generated target value data to generate second compressed video data individually corresponding to the plurality of series of noncompressed video data.

Preferably, the target value data generating means further has a boundary detecting means for detecting a boundary of the plurality of series of noncompressed video data based on a change of the amount of data of the first compressed video data; a sum predicting means for predicting the sum of the amounts of data of the first compressed video data based on the types of the pictures of the first compressed video data generated from the leading picture of the plurality of series of noncompressed video data and the amount of data thereof; and a target value data calculating means for calculating the target value data indicating the target value of the amount of data of the compressed video data generated from a predetermined number of pictures after the boundary of the plurality of series of noncompressed video data based on the sum of the predicted amounts of data of the first compressed video data.

Preferably, the boundary detecting means detects the boundary of the plurality of series of noncompressed video data immediately before a P-picture with an amount of data which becomes large when the amount of data of a P-picture of the first compressed video data becomes larger than the amount of data of the P-picture immediately before it by a predetermined proportion or more in the predetermined picture type sequence.

Preferably, the boundary detecting means detects the boundary of the plurality of series of noncompressed video data immediately before an I-picture immediately before a B-picture with an amount of data which becomes large where the amount of data of a B-picture of the first compressed video data becomes larger than the amount of data of the B-picture immediately before this by a predetermined proportion or more in the predetermined picture type sequence.

Preferably, provision is further made of a data amount predicting means for predicting the amount of data of each of the pictures of the compressed video data generated from the noncompressed video data and where the ratio between the amount of data of the pictures of the corresponding first compressed video data and the predicted amount of data of the pictures of the compressed video data is a predetermined value or more, a boundary of the noncompressed video data is detected.

Preferably, the first compressing means compresses the plurality of series of noncompressed video data by a picture type sequence comprised of an I-picture, P-pictures, and B-pictures; the picture rearranging means rearranges the pictures of the plurality of series of noncompressed video data in order so that a P-picture or I-picture is generated from the leading picture of the plurality of series of noncompressed video data; and the sum predicting means calculates a multiplication value by multiplying the amount of data of the P-picture of the first compressed video data generated from the leading picture of the noncompressed video data by a coefficient based on the ratio among the amounts of data of the I-picture, P-pictures, and B-pictures where a P-picture is generated from the leading picture of the noncompressed video data and adds a predetermined constant to this to predict the sum of the amount of data of the first compressed video data.

Preferably, the sum predicting means corrects the predetermined constant to be added to the multiplication value based on the amounts of data of the B-pictures of the first compressed video data generated from the second and subsequent pictures from the head of the noncompressed video data to predict the sum of the amount of data of the first compressed video data.

Preferably, the first compressing means compresses the plurality of series of noncompressed video data by a picture type sequence in which a set of a predetermined number of B-pictures is regularly sandwiched by pictures of a type other than a B-picture; the picture rearranging means rearranges the pictures of the plurality of series of noncompressed video data in order so that a picture other than a B-picture is generated from the leading picture of the plurality of series of noncompressed video data; where an I-picture is generated from the leading picture of the noncompressed video data, the sum predicting means multiplies the amount of data of the I-picture of the first compressed video data generated from the leading picture of the noncompressed video data by a coefficient based on the ratio among the amounts of data of the plurality of types of pictures constituting the picture type sequence to calculate the multiplication value; corrects the predetermined constant to be added to the multiplication value based on at least the amount of data of the set of B-pictures to predict the sum of the amounts of data of the first compressed video data; and the target value data calculating means calculates the target value data indicating the target value of the amount of data of the compressed video data after the first set of B-pictures generated from the plurality of series of noncompressed video data based on the sum of the predicted amounts of data of the first compressed video data.

When the video data compressing apparatus according to the present invention, for example, compresses the noncompressed video data to the picture type sequence I, B, B, P, B, B, . . . , P, B, B (individual pictures of the noncompressed video data to be compressed to the above picture type sequence will be referred to as the pictures $I_1$, $B_2$, $B_3$, $P_4$, $B_5$, $B_6$, . . . , $P_{13}$, $B_{14}$, $B_{15}$), the picture rearranging means rearranges the pictures $I_1$, $B_2$, $B_3$, $P_4$, $B_5$, $B_6$, $P_7$, . . . , $P_{13}$, $B_{14}$, $B_{15}$ of the continuously input plurality of scenes (noncompressed video data) to the order suited to the compression and coding, i.e., the pictures $I_1$, $B_{-2}$, $B_{-1}$, $P_4$, $B_1$, $B_2$, . . . , $P_{13}$, $B_{11}$, $B_{12}$. That is, in the noncompressed video data, a set of B-pictures sandwiched by for example an I-picture and a P-picture is moved after the I-picture or P-picture immediately after this.

The first compressing means preliminarily compresses and codes a plurality of scenes in which the order of pictures is rearranged by the picture rearranging means to and generates the first compressed video data which becomes necessary to find difficulty data necessary for determining the amounts of data individually allocated to the pictures after compression. Specifically, the first compressing means compresses and codes each scene in units of GOPs (groups of picture) comprised of the picture type sequence I, B, B, P, B, B, . . . , P, B, B by for example the MPEG system to generate the first compressed video data. Note that the order of the pictures of the scene have been rearranged as mentioned above, therefore the leading picture of the scene immediately after the scene change (boundary in time direction of plurality of scenes) becomes the I-picture or the P-picture.

The delaying means delays each scene input by exactly a time for which the predetermined number of pictures of each scene are input, that is, by exactly a time sufficient for obtaining the first compressed video data necessary for the generation of difficulty data of an amount sufficient for calculating the amounts of data individually allocated to the pictures of the compressed video data obtained by compressing the scenes.

The target value data generating means generates target value data based on the sum of the amounts of data of the first compressed video data generated by the first video compressing means during a period where the delaying means delays each scene in the parts other than the scene change part for which the first compressed video data generated heretofore can be used as they are for the generation of target value data indicating the target value of the amount of data of each of the pictures of the compressed video data.

Further, the target value data generating means predicts the sum of the amount of data of the first compressed video data based on the type of the leading picture of the scene in the scene change part for which the first compressed video data generated heretofore cannot be utilized as they are for the generation of the target value data of the pictures of the compressed video data and further generates the target value data based on the sum of the predicted amount of data of the first compressed video data.

The second compressing means generates the second compressed video data of each of the scenes by compressing and coding the scenes delayed by the delaying means so that the amount of data of each of the pictures after compression becomes the amount of data indicated by the corresponding target value data by the same MPEG system as that for the first compressing means.

Further, in the video data compressing method according to the present invention, the pictures of a successive plurality of noncompressed video data are rearranged in a predetermined order; the plurality of noncompressed video data rearranged in order are compressed by the predetermined compression method by the predetermined picture type sequence comprised by a plurality of types of pictures; the noncompressed video data are delayed by exactly a time for which the predetermined number of pictures of the noncompressed video data are input; the target value data indicating the target value of the amount of data of each of the pictures of the compressed video data generated from the plurality of noncompressed video data is generated based on the sum of the amount of data of the first compressed video data generated during the period where the predetermined number of pictures of the noncompressed video data are input, and the type of the picture of the first compressed video data generated from the picture of the boundary part in the time direction of the plurality of noncompressed video data; and second compressed video data individually corresponding to the plurality of noncompressed video data are generated by compressing the delayed plurality of noncompressed video data so that the amount of data thereof exhibits the target value indicated by the generated target value data by the compressing method corresponding to the compressing method of the first compressing means.

Other objects, features and advantages of the present invention will become apparent from the following detailed description of the illustrated embodiments when read in conjunction with the accompanying drawings in which corresponding components are identified by the same reference numerals.

BRIEF DESCRIPTION OF THE DRAWINGS

FIGS. 9(A) to (C) are diagrams to which reference will be made in explaining a simplified 2-pass encoding operation according to an embodiment of the present invention;

FIGS. 10(A) to (C) are diagrams to which reference will be made in explaining a simplified 2-pass encoding operation according to another embodiment of the present invention;

DETAILED DESCRIPTION OF PREFERRED EMBODIMENTS

Figure 1:
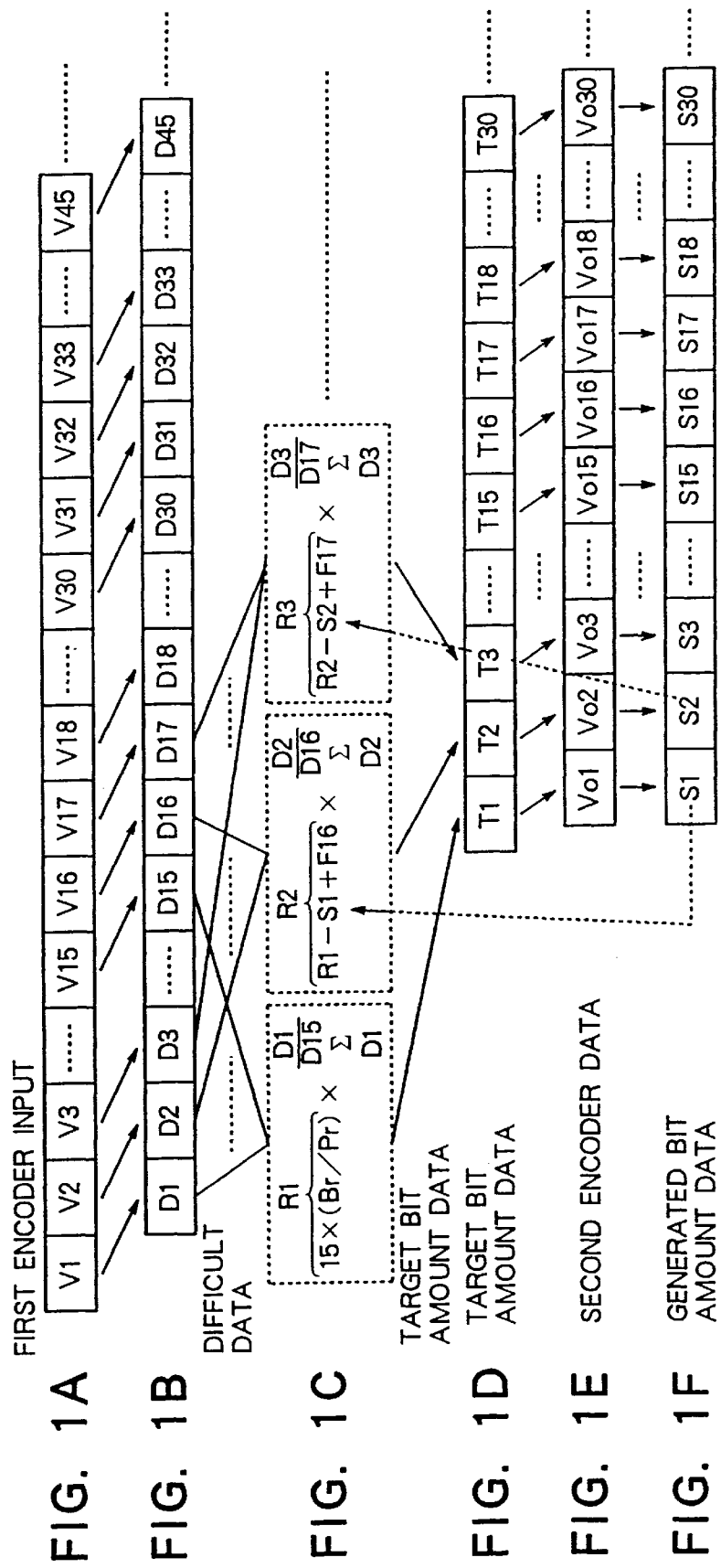
FIGS. 1A–1F are diagrams to which reference will be made in explaining an operation of the present invention involving the control of a target amount of code.

A detailed explanation will now be presented of the embodiments of the present invention with reference to the figures. Initially, an explanation of the concept of an embodiment of the present invention will be presented with reference to FIG. 1.

In the present invention, a first encoder may be utilized for detecting difficulty information in advance and a second encoder may be utilized for performing the actual encoding processing based on the difficulty information detected by the first encoder. FIG. 1A illustrates an input of such first encoder, FIG. 1B illustrates difficulty data detected or obtained by the first encoder, FIG. 1C illustrates an equation for obtaining data representative of a target amount of bits (target amount of code), FIG. 1D illustrates the data of the target amount of bits obtained by the equation of FIG. 1C, FIG. 1E illustrates data encoded by the second encoder, and FIG. 1F illustrates bit amount data which may be generated during the encoding performed by the second encoder.

More specifically, video data V1, V2, . . . shown in FIG. 1A, which may respectively correspond to image pictures, fields or frames, may be successively supplied to the first encoder. In such first encoder, encoding processing may be performed with a predetermined quantization step size. Such encoding processing may include inter- or intra-coding and DCT, quantization, and variable length coding.

As a result of the encoding processing performed by the first encoder, difficulty data D1, D2, . . . shown in FIG. 1B may be obtained. Difficulty data corresponding to a predetermined number of pictures, fields, or frames may be respectively utilized in a slidable manner to obtain target bit amount data T1, T2 . . . and so forth. In other words, difficulty data corresponding to a predetermined number of pictures, fields, or frames starting at a jth-picture (or field or frame) may be utilized to obtain a target bit amount data Ti, difficulty data corresponding to a predetermined number of pictures, fields, or frames starting at a jth+1-picture (or field or frame) may be utilized to obtain a target bit amount data Ti+1, . . . , and so forth. As an example, consider the situation in which one group of pictures (GOP) includes 15 pictures. In such situation, difficulty data is corresponding to 15 different or respective pictures may be utilized to determine each target bit amount data T1, T2, . . . such that the difficulty data D1 to D15 is utilized to determine the target bit amount data T1, the difficulty data D2 to D16 is utilized to determine the target bit amount data T2, the difficulty data D3 to D17 is utilized to determine the target bit amount data T3, and so forth, as shown in FIGS. 1B–1D.

The target bit amount data T1, T2, . . . shown in FIG. 1D may be successively supplied to the second encoder along with the video data V1, V2, . . . shown in FIG. 1A by way of a FIFO (first-in first-out) memory. As a result, the second encoder encodes the video data V1, V2, . . . (of FIG. 1A) based on the target bit amount data (of FIG. 1D) so as to obtain encoded data Vo1, Vo2, . . . as shown in FIG. 1E. Bit amount data S1, S2, . . . shown in FIG. 1F may be generated therefrom and utilized in the determination of the target bit amount data. For example, the generated bit amount data S1 may be utilized along with the difficulty data D2 to D16 in determining the target bit amount data T2, the generated bit amount data S2 may be utilized along with the difficulty data D3 to D17 in determining the target bit amount data T3, and so forth. In such example, the generated bit amount data S is not utilized in determining the target bit amount data T1 (FIGS. 1C and 1D).

A further explanation of the computation shown in FIG. 1C will now be presented.

In FIGS. 1C, R1, R2, . . . represent the average amount of bits which can be allocated to respective sequences each corresponding to 15 pictures. R1 is the initial value, and for R2, R3, . . . and so forth, the preceding average amount of bits is utilized in determining the respective R value. More specifically, the average amount of bits R1 may be obtained by multiplying the number of pictures of the GOP (that is, 15) by a ratio of a bit rate Br to a picture rate Pr. The bit rate Br may represent an amount of bits corresponding to a predetermined time period (for example, one second), and the picture rate Pr may represent a number of pictures corresponding to a predetermined time period (for example, one second). The average amount of bits R2 may be obtained by subtracting the generated bit amount S1 from the preceding average amount of bits R1 and adding thereto an amount of bits F16. The average amount of bits R3, R4, and so forth may be obtained in a similar manner. The amount of bits F16, F17, . . . per frame may be obtained by allocating the average amount of bits to the pictures for which the difficulty is currently being determined by the picture type of the respective picture.

The average amount of bits R1, R2, . . . may be respectively multiplied by a ratio of the difficulty of the picture currently being processed to the total difficulties of 15 pictures so as to determine the target bit amount-data. For example, the average amount of bits R1 (the initial value) is multiplied by the ratio of the difficulty D1 of the picture V1 to the total of the difficulties D1 to D15 of the pictures V1 to V15 so as to determine is the target bit amount data T1. As another example, the average amount of bits R2 is multiplied by the ratio of the difficulty D2 of the picture V2 to the total of the difficulties D2 to D16 of the pictures V2 to V16d so as to determine the target bit amount data T2.

Thus, the target bit amount data T1, T2, . . . may be obtained from the encoding or processing performed by the first encoder and utilized by the second encoder in the encoding of the video data. As compared to the other arrangements previously described, such arrangement may provide a more proper allocation of bits and, as a result, enable more proper encoding so as to provide a relatively high quality picture. Further, such arrangement may enable data to be encoded wherein real time processing or property may be important.

Figure 2:
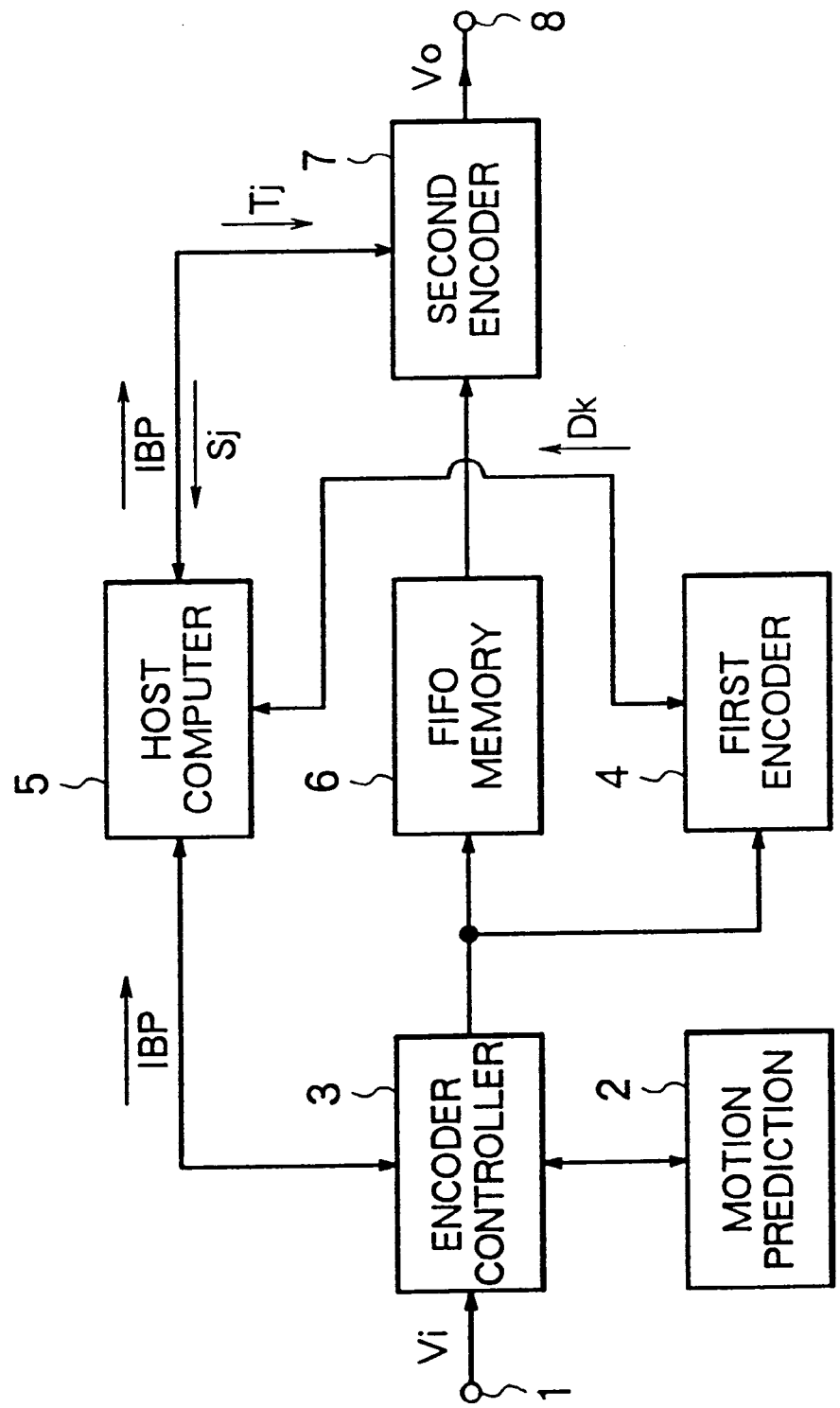
FIG. 2 is a diagram illustrating an encoding apparatus according to an embodiment of the present invention.

FIG. 2 illustrates an encoding apparatus in accordance with an embodiment of the present invention. As shown therein, such encoding apparatus generally includes a motion predicting circuit 2, an encoder controller 3, a first encoder 4, a host computer 5, an FIFO (first in first out) memory 6, and a second encoder 7.

Video data Vi representative of a plurality of I, P and B picture data may be supplied by way of an input terminal 1 to the encoder controller 3. The encoder controller 3 may supply picture type data IBP, which may indicate the type of picture data currently being supplied, to the motion predicting circuit 2 and the host computer 5. Additionally, it may output an I-picture(s) as is and may take the difference from the current video data and the previous video data for B- and P-pictures so as to form a difference signal in accordance therewith and output the same. The motion predicting circuit 2 may apply motion detection and motion compensation processing to the received video data (such as the B- and P-pictures thereof) based on the picture type data IBP supplied from the encoder controller 3.

Output video data from the encoding controller 3 (which may have been processed by the motion prediction circuit 2) may be supplied to the first encoder 4 wherein such video data may be encoded. As a result of such encoding or processing, the first encoder 4 determines difficulty data Dk and supplies the same to the host computer 5.

The host computer 5 receives the difficulty data Dk from the first encoder 4 and generated bit amount data Sj from the second encoder 7 and, in accordance therewith, determines the target amount of bits Tj in a manner similar to that previously described with reference to FIG. 1C and supplies such target amount of bits Tj to the second encoder 7. The host computer 5 may also perform overall control of the apparatus 10.

The output video data from the encoder controller 3 may be further supplied to the FIFO memory 6, wherein such data may be supplied to the second encoder 7 after being delayed by a predetermined amount of time. Such predetermined amount of time may be substantially equivalent to the amount of time needed for the first encoder 4 to obtain the difficulty data Dk and for the host computer 5 to obtain the target bit amount data Tj by using the difficulty data Dk and to supply the same to the second encoder 7.

The second encoder 7 encodes the video data read from the FIFO memory 6 in accordance with the target bit amount data Tj supplied from the host computer 5 and outputs the encoded video data to an output terminal 8. Further, as previously described, the second encoder 7 may supply generated bit amount data Sj to the host computer 5.

In the above-described embodiment, a target bit amount of data may be determined by using L (L is an integer) number of pictures of difficulty data, and one picture may be coded based on such target bit amount of data. Such embodiment or arrangement may be considered a feed forward control arrangement with regard to determining the amount or allocation of bits. In other words, in this embodiment, the target bit amount of data of one picture may be obtained by multiplying the ratio of the difficulty of the picture to be coded to the sum of difficulties of L pictures by the amount of bits allowable for the L pictures. When the coding of one picture is completed, the coding of the next picture may be performed by subtracting the generated amount of bits from the amount of bits usable in L pictures and adding thereto the average amount of bits in accordance with the respective picture type and multiplying the obtain result by the ratio of the difficulty of the picture to be coded to the sum of difficulties of L pictures.

A further description of the computation or processing performed by the host computer 5 will now be presented.

The target bit amount of data Tj of the j-th picture in the video sequence may be represented by the following equation:

$$T_j = R_j \times (Dj/\Sigma_{k=j}^{j+L-1} Dk) \qquad (1)$$

In equation 1, L represents the number of pictures for which difficulty data is measured in advance and may be determined by the capacity of a frame (or field or picture) memory or the like and the amount of video data of one frame (or field or picture). Dj represents the difficulty information of the picture j. Rj represents the average amount of bits which may be allocated to a sequence of L pictures from the jth picture. As is to be appreciated, based upon equation 1, a larger or smaller amount of bits than the amount of bits indicated by the average amount of bits Rj may be allocated to a picture.

The average amount of bits R1 (which is the initial value of the average amount of bits Rj) may be the average amount of bits for L frames. Such relationship may be represented by the following equation:

$$R1 = (Br \times L)/Pr \qquad (2)$$

In equation 2, Br represents the amount of bits per second, and Pr represents the number of pictures per second.

The average amount of bits Rj+1 (j=1, 2, 3, ...) other than the average amount of bits R1 (the initial value) may be represented by the following equation:

$$R_{j+1} = Rj - Sj + F_{j+L} \qquad (3)$$

In equation 3, Sj represents the amount of bits generated when the jth picture is encoded by the second encoder 7, and $F_{j+L}$ represents the amount of bits per frame when allocating the average amount of bits for the j+lth picture for which the difficulty is currently being determined by the first encoder 4 in accordance with the picture type of the j+Lth picture.

Alternatively, in equation 3, the target amount of bit data Tj may be utilized for the value of the generated amount of bits Sj. Such arrangement may simplify the present encoding apparatus. That is, in such arrangement, the generated amount of bits Sj does not need to be supplied from the second encoder to the host computer 5 and, as a result, the amount of bits may be controlled by just the host computer 5.

Figure 3:
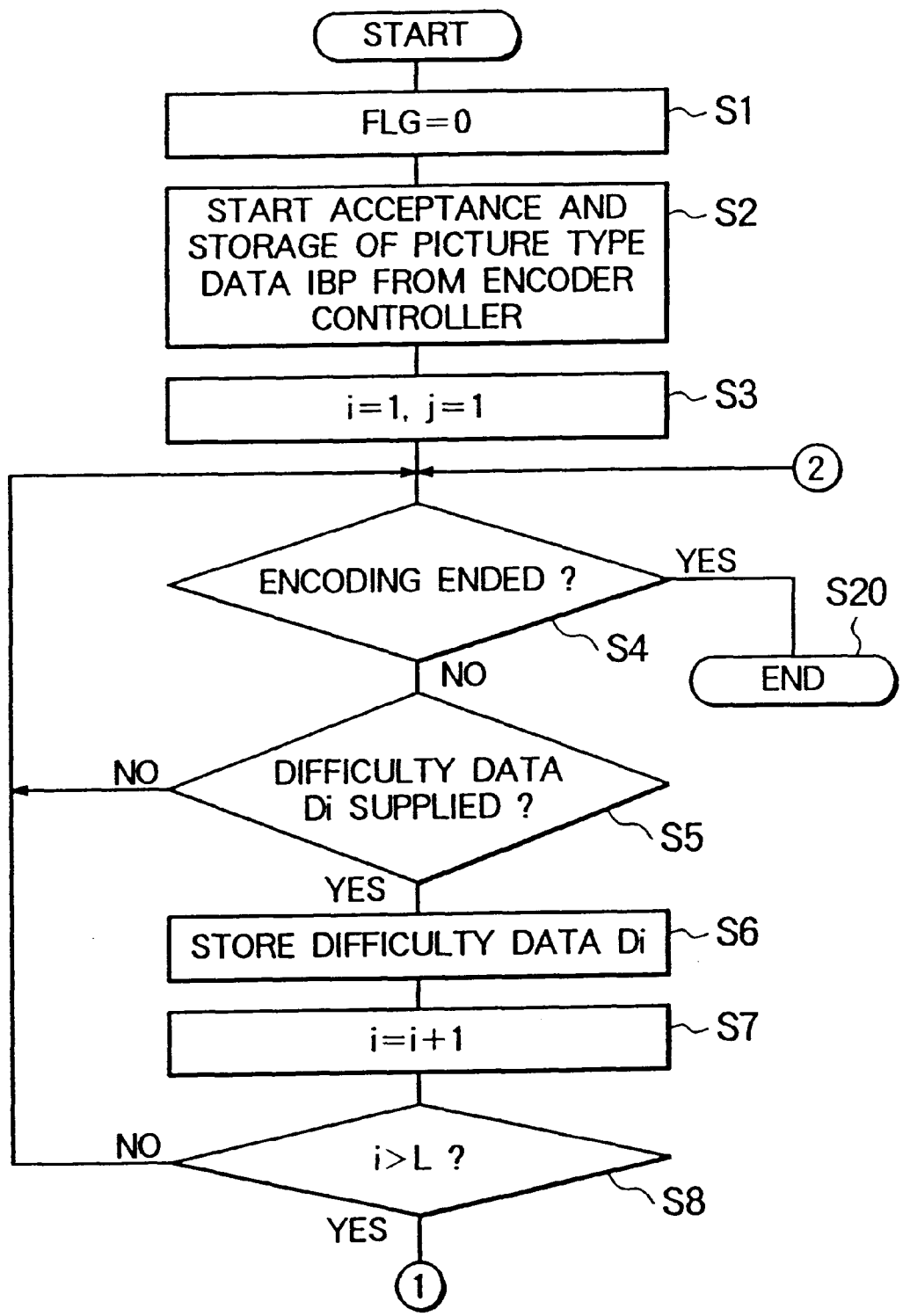
FIG. 3 is a flow chart to which reference will be made in explaining the operation of the encoding apparatus of FIG. 2.
Figure 4:
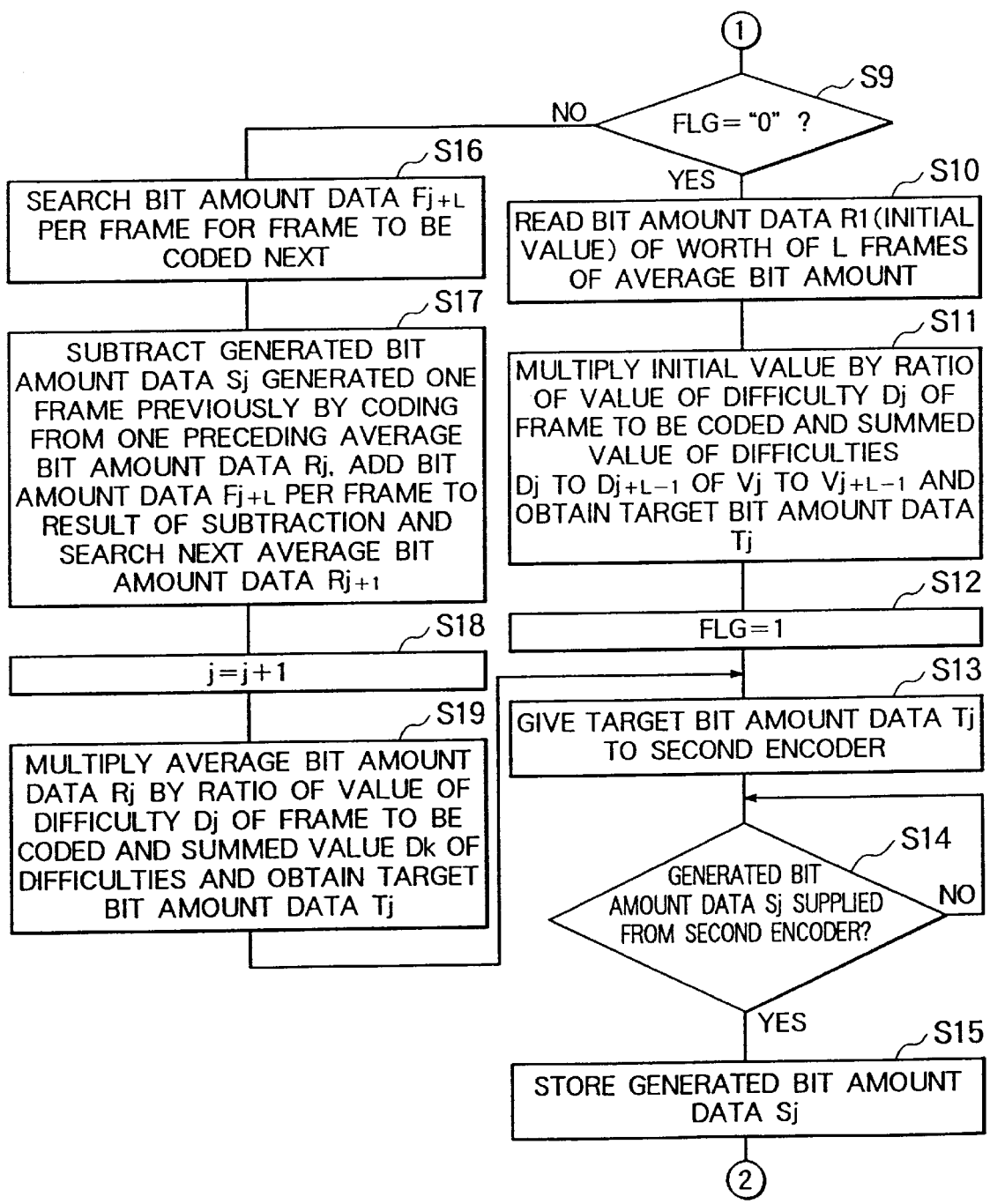
FIG. 4 is another flow chart to which reference will be made in explaining the operation of the encoding apparatus of FIG. 2.

A control operation which may be performed by the host computer 5 will now be described with reference to FIGS. 3 and 4

At step S1, the host computer 5 sets a flag FLG to "0". Processing then proceeds to step S2, wherein the host computer 5 starts receiving and storing picture type data IBP from the encoder controller 3. Processing then proceeds to step S3, wherein the host computer 5 sets the variables i and j to "1". Thereafter, processing proceeds to step S4.

At step S4, a determination is made by the host computer 5 as to whether or not the encoding processing has ended. If such determination is affirmative, processing is terminated, as indicated in step S20. If, however, such determination is negative, processing proceeds to step S5.

At step S5, a determination is made by the host computer 5 as to whether or not difficulty data Di is being or has been supplied from the first encoder 4. If such determination is negative, processing returns to step S4. However, if such determination is affirmative, processing proceeds to step S6, wherein the host computer 5 stores the difficulty data Di. Thereafter, processing proceeds to step S7, wherein the host computer 5 adds "1" to the variable i. Processing then proceeds to step S8.

At step S8, a determination is made by the host computer 5 as to whether or not the variable i is larger than "L". If such determination is negative, processing proceeds to step S4. However, if such determination is affirmative, processing proceeds to step S9 shown in FIG. 4.

At step S9, a determination is made by the host computer 5 as to whether or not the flag FLG is "0". If such determination is affirmative, processing proceeds to step S10, wherein the host computer 5 reads or obtains the initial value of the average amount of bits Rj (such value may be obtained by multiplying the ratio of the amount of bits per second to the number of pictures per second by L as indicated in equation 2). The data of the average amount of bits Rj may be obtained by equation 3. Processing proceeds to step S11.

At step S11, the host computer 5 obtains the target amount of bit data Tj by multiplying the average amount of bits Rj by the ratio of the value of the difficulty Dj of the frame to be coded to a summed value of the difficulties Dj to Dj+L−1 of the video data Vj to Vj+L−1. Processing then proceeds to step S12, wherein the host computer 5 sets the flag FLG to "1". Thereafter, processing proceeds to step S13.

At step S13, the host computer 5 supplies the data of the target amount of bits Tj to the second encoder 7. In accordance with such target bit amount data Tj, the second encoder 7 encodes the video data Vj supplied from the FIFO 6. Additionally, the second encoder 7 supplies the generated amount of bit data Sj (which indicates the amount of bits generated by such encoding) to the host computer 5. Thereafter, processing proceeds to step S14.

At step S14, a determination is made by the host computer 5 as to whether or not the generated amount of bit data Sj is being or has been supplied from the second encoder 7. If such determination is negative, processing returns to step S14. If, however, such determination is affirmative, processing proceeds to step S15 wherein the host computer 5 stores the generated amount of bit data Sj supplied from the second encoder 7. Thereafter, processing returns to step S4 (FIG. 3).

If the determination of step S9 is negative, processing proceeds to step S16, wherein the host computer 5 determines or obtains the data of the amount of bits $F_{j+L}$ per frame for the video data of the frame to be coded next by the second encoder 7. Thereafter, processing proceeds to step S17, wherein the host computer 5 subtracts the amount of bit data Sj generated by the coding of the second encoder 7 one frame previously from the preceding average amount of bit data Rj, and adds thereto the data of the amount of bits $F_{j+L}$ per frame so as to obtain the next average amount of bit data Rj+1. Processing then proceeds to step S18, wherein the host computer 5 adds "1" to the variable j. Thereafter, processing proceeds to step S19, wherein the host computer 5 obtains the target amount of bit data Tj by multiplying the ratio of the value of the difficulty Dj of the frame to be coded at the second encoder 7 to a summed value of difficulties by the average amount of bit Rj. Thereafter, processing proceeds to step S13.

Accordingly, processing proceeds through step S10 to S12 when the first picture is coded at the second encoder 7, and processing proceeds through step S16 to S19 when the second and subsequent pictures are coded at the second encoder 7. Further, the flag FLG is utilized to change the processing path between the first picture and the second and subsequent pictures.

Therefore, in the present encoder apparatus 10 of FIG. 2, the first encoder 4 may encode L number of pictures in advance, provide difficulty data to the host computer 5 (for example, D1–D15), and subsequently provide difficulty data of the next pictures to the host computer 5 one picture at a time (for example, D16, D17, . . .). The host computer 5 multiplies the ratio of the difficulty data Dj of the jth-picture from the first encoder 4 to the sum of the difficulty data Dk of L pictures by the average amount of bit data Rj (which indicates the average amount of bits which may be allocated to a sequence of L pictures from the jth-picture) so as to determine the target amount of bit data Tj, and supplies the same to the second encoder 7. As a result, the second encoder 7 may perform encoding processing such that the resultant data has a number of bits which is substantially the same as the target amount of bits Tj, whereupon an acceptable allocation of bits may be obtained.

Figure 5:
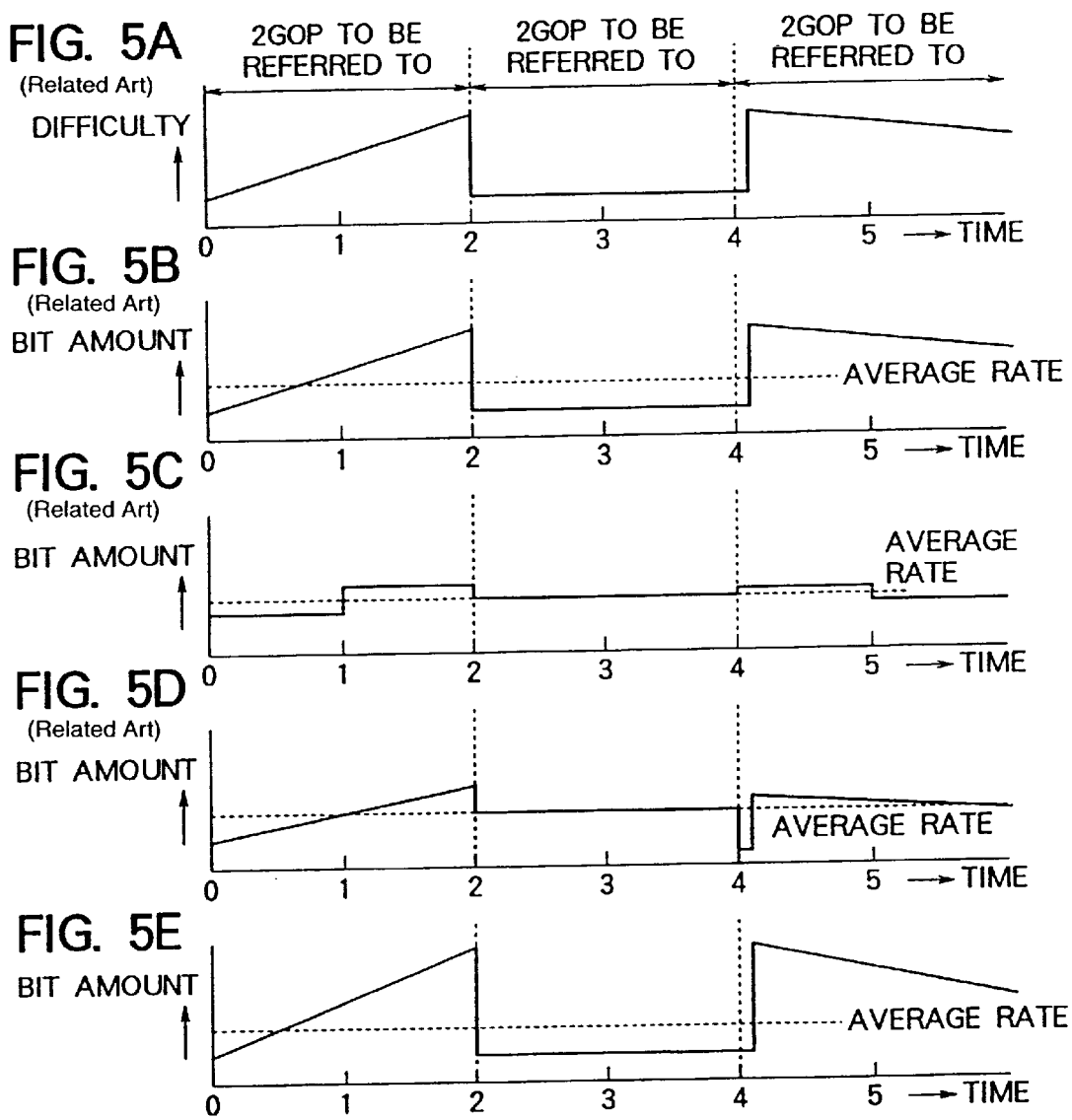
FIGS. 5A–5E are diagrams to which reference will be made in explaining a 2-pass encoding technique of the present invention and other 2-pass encoding techniques.

FIG. 5E illustrates a distribution of bits which may be obtained with the present apparatus. As shown therein, such bit distribution is proportional to the distribution of difficulty data shown in FIG. 5A. Further, such bit distribution of FIG. 5E provides an allocation of bits which is closer to the ideal case of FIG. 5B than either of the distributions/allocations of FIGS. 5C or 5D.

By providing a more suitable allocation of bits and utilizing the advantages of a feed forward arrangement, the present encoder apparatus enables an image to be restored with relatively high quality.

Furthermore, although the apparatus of FIG. 2 was described as having two encoders, the present invention is not so limited. That is, the present invention may utilized a different number of encoders. For example, the present invention may utilized only one encoder.

Other embodiments of the present invention will now be described.

The data of the amount of bits $F_{j+L}$ per frame may be data of the average amount of bits per frame (or filed or picture) without regard to the picture type. The average amount of bits per picture ($F_{j+L}$) may be obtained by dividing the amount of bits per second by the number of pictures per second, as shown in equation 4 below:

$$F_{j+L} = Br/Pr3 \tag{4}$$

However, since I-pictures generally have the largest generated amount of bits, followed by P-pictures and B-pictures, a more acceptable distribution of bits may be obtained if the data of the amount of bits $F_{j+L}$ is changed in accordance with the picture type. That is, if the data of the amount of bits $F_{j+L}$ is made constant, a problem may occur. For example, consider the situation in which the j+L–1th picture for which the difficulty is being determined is an I-picture. In such situation, the value of the difficulty may be very large and, as a result, the denominator of equation 1 may become large. However, the data of the average amount of bits Rj may not be large. As such, the value of the target amount of bit data Tj of the jth-picture may be small. (This may be more obvious by referring to equation 1.)

As a result, $F_{j+L}$ may be provided for each picture type with a predetermined fixed ratio. That is, a ratio of the amount of bits of the I-, P-, and B-pictures per picture may have a predetermined fixed ratio i:p:b. $F_{j+L}$ may be respectively determined for each picture type (I, P and B) by the following equations 5–7. (Equation 5 is used to determine the amount of bits per frame when j is an I-picture, equation 6 is used to determine the amount of bits per frame when j is a P-picture, and equation 7 is used to determine the amount of bits per frame when j is a B-picture.)

$$F_{j+L} = F_{I\text{-}picture} = G \times i / \{i + px(N/M-1) + bxNx(1-1/M)\} \tag{5}$$

$$F_{j+L} = F_{P\text{-}picture} = G \times p / \{i + px(N/M-1) + bxNx(1-1/M)\} \tag{6}$$

$$F_{j+L} = F_{B\text{-}picture} = G \times b / \{i + px(N/M-1) + bxNx(1-1/M)\} \tag{7}$$

Here, N represents the number of pictures per GOP (or an interval between I pictures), M represents an interval between P-pictures, and G is [(Br×N)/Pr] which represents an average amount of bits of 1 GOP having N pictures. As previously mentioned, i is the ratio of the amount of bits of an I picture to that of a P picture and a B picture, and p and b are similar ratios. As a result, the number of P-pictures per GOP is N/M-1, and the number of B-pictures per GOP is N (1-1/M).

Therefore, by utilizing equations 5–7, the amount of bits $F_{j+L}$ per frame may be determined with respect to each picture with a fixed ratio so as to obtain a more acceptable distribution of bits. Accordingly, since the picture type is considered in determining the amount of bits, the above-described problem (wherein the value of the target bit amount Tj becomes small since the value of the difficulty data of an I-picture is large whereupon encoding is performed with a small amount of bits) may be avoided so that an image may be restored with relatively high quality.

The ratio of the amount of bits for each picture type may fluctuate considerably according to the image pattern. Accordingly, to obtain a more ideal distribution of the amount of bits, the ratio of the amount of bits for each picture type of the pictures for which difficulty data is to be determined (that is, the ratio of i:p:b) may be dynamically changed according to the image pattern. Further, since the ratio of the amount of bits of the GOP for which the difficulty data is sought may not have as yet been determined, the ratio of the amount of bits for each picture type of the preceding GOP may be used. The amount of bits Fj per frame may be determined by the following equations 8–10 when j is an I-picture, P-picture, and B-picture, respectively.

$$Fj = F_{I\text{-}picture} = G \times SI\text{-}picture / \{SI\text{-}picture + \Sigma SP\text{-}picture + \Sigma S_{B\text{-}picture}\} \quad (8)$$

$$Fj = FP\text{-}picture = (G\text{-}FI\text{-}picture) \times \{\Sigma S_{P\text{-}picture}\} / \{\Sigma S_{P\text{-}picture} + \Sigma S_{B\text{-}picture}\} \times 1/(N/M-1) \quad (9)$$

$$Fj = F_{B\text{-}picture} = (G\text{-}F_{I\text{-}picture} - \Sigma S_{P\text{-}picture}) \times 1 / \{N \times (1-1/M)\} \quad (10)$$

$S_{I\text{-}picture}$, $S_{P\text{-}picture}$, and $S_{B\text{-}picture}$ respectively represent the generated amount of bits of an I-picture, P-picture, and B-picture of the previous GOP.

Therefore, the ratio of i:p:b may be changed in accordance with an image pattern by utilizing equations 8 to 10. Further, such use may provide a more acceptable distribution of bits.

In the above description, the correlation of the generated amount of bits for each picture type in the same scene was utilized. However, when the scene changes, the correlation of the image patterns before and after such scene change is lost. Accordingly, scene changes may be detected and the results therefrom utilized in determining the amount of bits or ratio thereof. Two methods may be utilized to perform such procedure.

In a first, since the amount of bits of several pictures before and after a scene change may be locally large, such part is not utilized in calculating the ratio of the amount of bits for each picture type when a scene change is detected.

In a second method, since there may be little or no correlation between an image pattern after a scene change and the image pattern before such scene change, the ratio of the amount of bits is utilized in calculations for only the pictures after such scene change.

Either of the above-described two methods may provide a bit distribution which is close to the ideal bit distribution.

Therefore, a ratio of the difficulty of the image to be coded to a sum of the difficulties of L images is multiplied by an average amount of bits allocated to L images each time an image is coded so as to determine a target amount of code. Such present technique provides a more acceptable allocation of bits as compared to the previously described techniques wherein coding is performed by allocating bits within or using difficulty information of a predetermined range (such as 2 GOPs). As a result, the present technique enables an image to be restored with relatively high quality.

Other embodiments of the present invention will now be described. In describing such embodiments, unless otherwise specified, the equations will be numbered starting with equation number 1 and the initial embodiment described therein will be referred to as the first embodiment, and subsequent embodiments as the second embodiment, and so forth.

When video data having a high difficulty such as a pattern having a large number of high frequency components or a pattern having much motion is compressed and coded by a compressing and coding method of video data such as the MPEG system, generally distortion becomes apt to occur along with the compression. For this reason, it is necessary to compress and code the video data having a high difficulty with a low compression rate. Also, it is necessary to allocate a larger amount of the target data to the compressed video data obtained by compressing and coding data having a high difficulty than to compressed video data of video data of a pattern having a low difficulty.

In order to adaptively allocate the target amount of data with respect to the difficulty of the video data in this way, the 2-path encoding system shown as the related art is effective. However, the 2-path encoding system is unsuitable for real time compression and coding.

The simplified 2-path encoding system shown as the first embodiment was made to solve the problem of such a 2-path encoding system. In this, the difficulty of the noncompressed video data is calculated from the difficulty data of the compressed video data obtained by preliminarily compressing and coding the noncompressed video data. The compression rate of the noncompressed video data delayed by exactly a predetermined time by an FIFO memory or the like can be adaptively controlled based on the difficulty calculated by the preliminary compression and coding.

Figure 6:
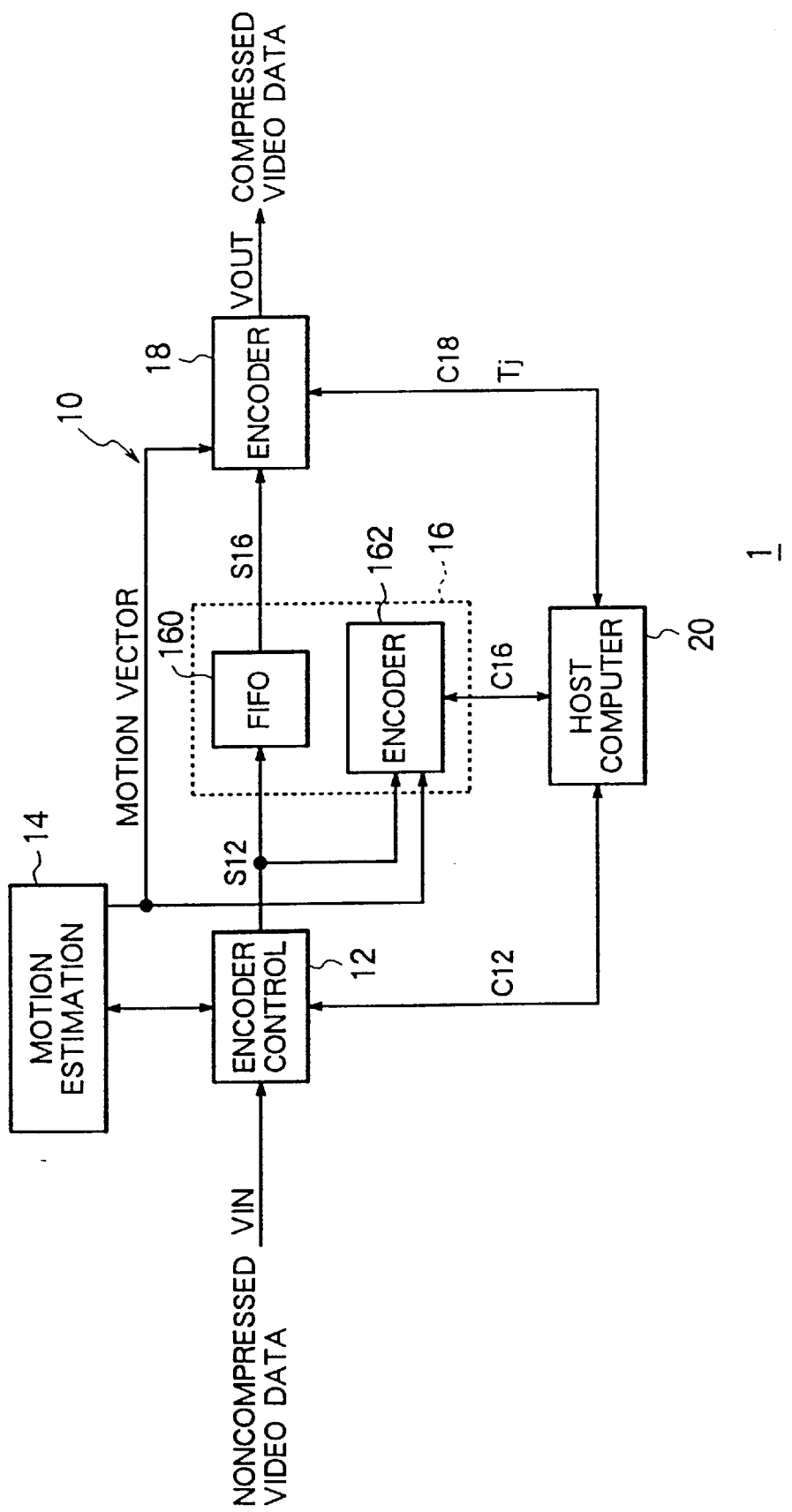
FIG. 6 is a diagram of a video data compressing apparatus according to an embodiment of the present invention.

FIG. 6 is a view of the configuration of a video data compressing apparatus according to the present invention.

As shown in FIG. 6, the video data compressing apparatus 1 is constituted by a compressing and coding unit 10 and a host computer 20; the compressing and coding unit 10 is constituted by an encoder control unit 12, a motion estimator 14, a simplified 2-path processing unit 16, and a second encoder 18; and the simplified 2-path processing unit 16 is constituted by an FIFO memory 160 and a first encoder 162.

The video data compressing apparatus 1 realizes the simplified 2-path encoding with respect to the noncompressed video data VIN input from an outside apparatus (not illustrated) such as an editing apparatus and video tape recorder apparatus by these components.

In the video data compressing apparatus 1, the host computer 20 controls the operation of the components of the video data compressing apparatus 1. Further, the host computer 20 receives the amount of data of the compressed video data generated by preliminarily compressing and coding the noncompressed video data VIN by the encoder 162 of the simplified 2-path processing unit 16, a value of a direct current component (DC component) of he video data after the DCT processing, and a power of the direct current component (AC) via a control signal C16 and calculates the difficulty of the pattern of the compressed video data based on these received values. Further, the host computer 20 allocates the target amount of data $T_j$ of the compressed video data generated by the encoder 18 for every picture via the control signal C18 based on the calculated difficulty, sets the same in a quantization circuit 166 (FIG. 8) of the encoder 18, and adaptively controls the compression rate of the encoder 18 in units of pictures.

The encoder control unit 12 notifies the existence of pictures of the noncompressed video data VIN to the host computer 20 and further performs the preliminary processing for the compression and coding for every picture of the noncompressed video data VIN. That is, the encoder control unit 12 rearranges the input noncompressed video data in the order of coding, performs a picture-field conversion, performs 3:2 pull-down processing (processing for converting video data of 24 frames/sec. of a moving picture to video data of 30 frames/sec. and removing the redundancy before the compression and coding) etc. where the noncompressed video data VIN is the video data of a moving picture, and outputs the result as the video data S12 to the FIFO memory 160 and encoder 162 of the simplified 2-path processing unit 16.

The motion estimator 14 detects the motion vector of the noncompressed video data and outputs the same to the encoder control unit 12 and the encoders 162 and 18.

In the simplified 2-path processing unit 16, the FIFO memory 160 delays the video data S12 input from the encoder control unit 12 by exactly a time by which for example L (L is an integer) number of pictures of the noncompressed video data VIN is input and outputs the result as the delayed video data S16. to the encoder 18.

Figure 7:
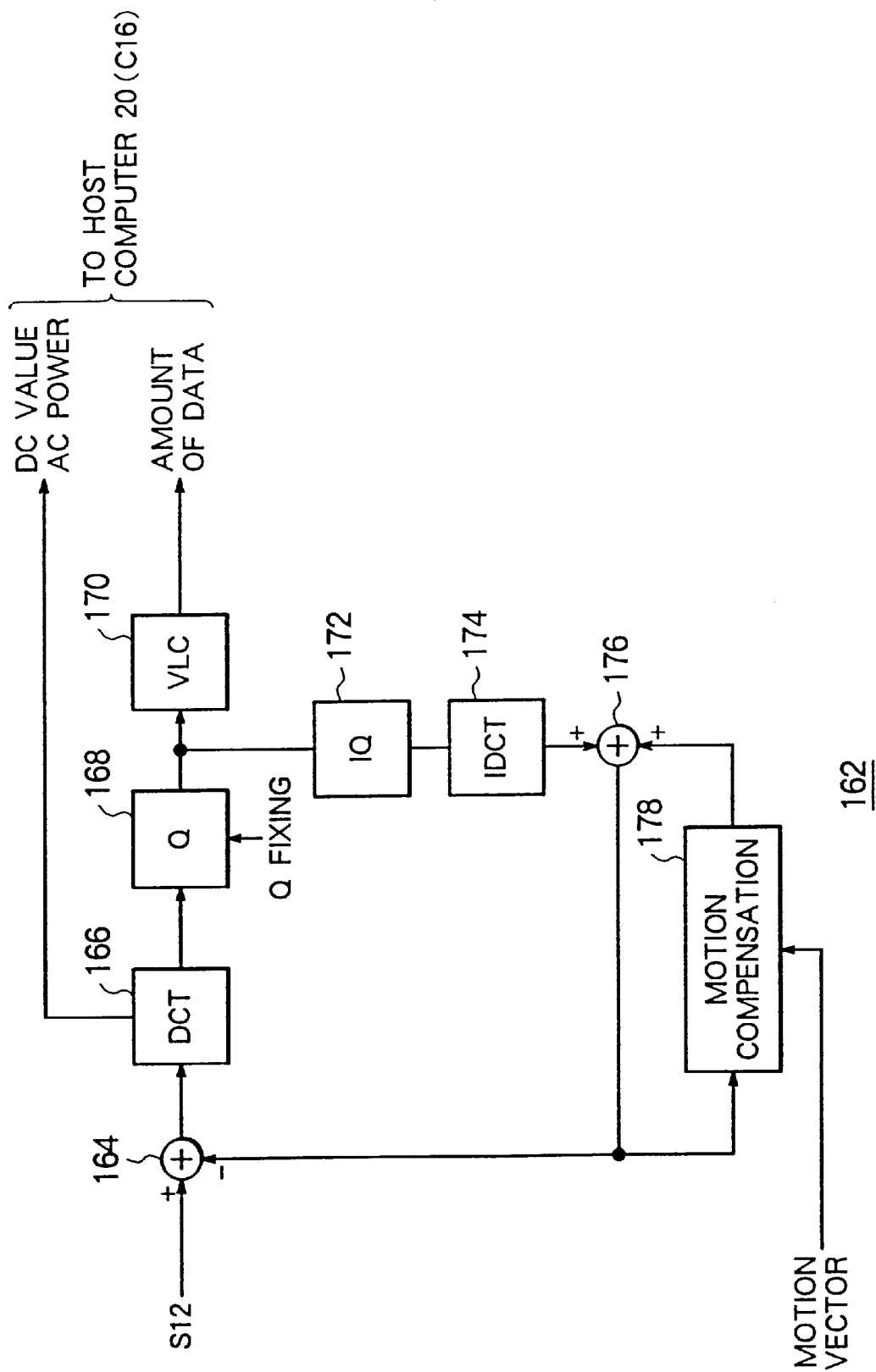
FIG. 7 is a diagram of a simplified 2-pass processing unit of FIG. 6.

FIG. 7 is a view of the configuration of the encoder 162 of the simplified 2-path processing unit 16 shown in FIG. 6.

The encoder 162 is a general video data use compression-coder constituted by, for example as shown in FIG. 7, an adder circuit 164, a DCT circuit 166, a quantization circuit (Q) 168, a variable length coding circuit (VLC) 170, an inverse quantization circuit (IQ) 172, an inverse DCT (IDCT) circuit 174, an adder circuit 176, and a motion compensation circuit 178, compresses and codes the video data S12 which is input by the MPEG system or the like, and outputs the amount of data etc. for every picture of the compressed video data to the video encoder 20.

The adder circuit 164 subtracts the output data of the adder circuit 176 from the video data S12 and outputs the same to the DCT circuit 166.

The DCT circuit 166 performs discrete cosine conversion (DCT) processing on the video data input from the adder circuit in units of macro blocks of for example 16 pixels×16 pixels, converts this from data of the time domain to data of the frequency domain, and outputs the resultant data to the quantization circuit 168. Further, the DCT circuit 166 outputs the value of the DC component and the power of the AC component of the video data after DCT to the video encoder 20.

The quantization circuit 168 quantizes the data of the frequency domain input from the DCT circuit 166 by a fixed quantization value Q and outputs the result as the quantized data to the variable length coding circuit 170 and the inverse quantization circuit 172.

The variable length coding circuit 170 performs variable length coding on the quantized data input from the quantization circuit 168 and outputs the amount of the compressed video data obtained as a result of the variable length coding to the host computer 20 via the control signal C16.

The inverse quantization circuit 172 inversely quantizes the quantized data input from the variable length coding circuit 168 and outputs the same as the inverse quantized data to the inverse DCT circuit 174.

The inverse DCT circuit 174 performs inverse DCT processing with respect to the inverse quantized data input from the inverse quantization circuit 172 and outputs the result to the adder circuit 176.

The adder circuit 176 adds the output data of the motion compensation circuit 178 and the output data of the inverse DCT circuit 174 and outputs the resultant data to the adder circuit 164 and the motion compensation circuit 178.

The motion compensation circuit 178 performs the motion compensation processing based on the motion vector input from the motion estimator 14 with respect to the output data of the adder circuit 176 and outputs the resultant data to the adder circuit 176.

Figure 8:
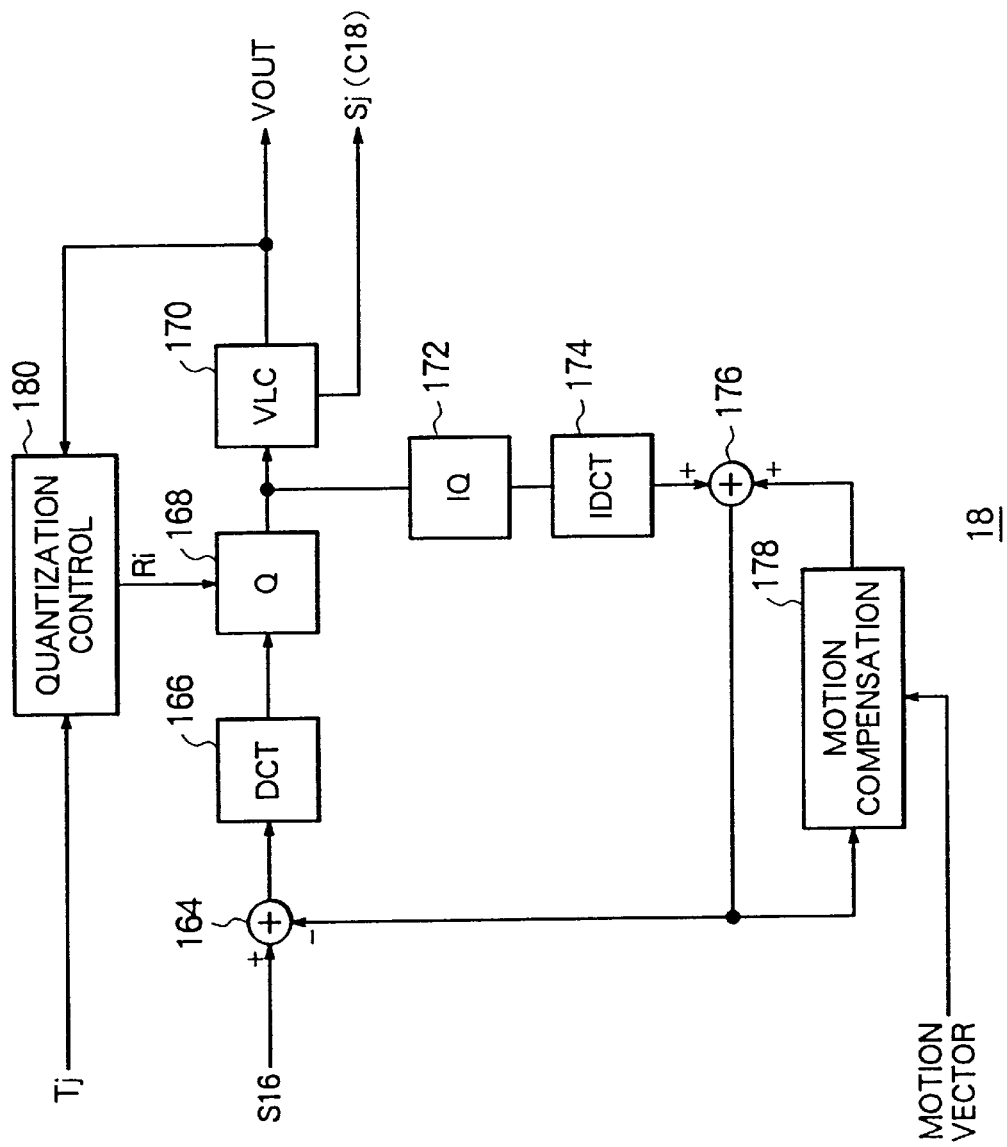
FIG. 8 is a diagram of an encoder of FIG. 6.

FIG. 8 is a view of the configuration of the encoder 18 shown in FIG. 6.

As shown in FIG. 8, the encoder 18 is comprised of the encoder 162 shown in FIG. 7 plus the quantization control circuit 180. The encoder 18 uses these components and applies the motion compensation processing, DCT processing, quantization processing, and the variable length coding processing to the delayed video data S16 delayed by the amount of L number of pictures by the FIFO memory 160 based on the target amount of data $T_j$ set from the video encoder 20, generates the compressed video data VOUT of the MPEG or the like, and outputs the same to an outside apparatus (not illustrated).

In the encoder 18, the quantization control circuit 180 sequentially supervises the amount of the compressed video data VOUT output by the variable length quantization circuit 170 and successively adjusts the quantization value $Q_j$ set in the quantization circuit 168 so that the amount of data of the compressed video data finally generated from the j-th picture of the delayed video data S16 approaches the target amount of data $T_j$ set from the video encoder 20.

Further, the variable length quantization circuit 170 outputs an actual amount of data $S_j$ of the compressed video data VOUT obtained by compressing and coding the delayed video data S16 to the host computer 20 via the control signal C18 in addition to the output of the compressed video data VOUT to the outside.

Below, the simplified 2-path encoding operation of the video data compressing apparatus 1 in the first embodiment will be explained.

FIGS. 9(A)–(C) are views of the operation of the simplified 2-path encoding of the video data compressing apparatus 1 in the first embodiment.

The encoder control unit 12 performs preliminary processing such as rearrangement of the pictures in the order of coding by the encoder control unit 12 with respect to the noncompressed video data VIN input to the video data compressing apparatus 1 and outputs the resultant data as the video data S12 to the FIFO memory 160 and the encoder 162 as shown in FIG. 9(A).

Note that, by the rearrangement of the order of the pictures by the encoder control unit 12, the order of coding of the pictures shown in FIG. 9 etc. and the order of display after the expansion and decoding are different.

The FIFO memory 160 delays each picture of the input video data S12 by exactly an amount of L number of pictures and outputs the result to the encoder 18.

The encoder 162 preliminarily successively compresses and codes the pictures of the input video data S12 and outputs the amount of data of the compressed and coded data obtained by compressing and coding the j-th (j is an integer) picture and the value of the DC component and the power of the AC component of the video data after the DCT processing to the host computer 20.

For example, since the delayed video data S16 input to the encoder 18 is delayed by exactly L number of pictures by the FIFO memory 160, as shown in FIG. 9(B), when the encoder 18 compresses and codes the j-th (j is an integer) picture (picture a of FIG. 9(B)) of the delayed video data S16, this means that the is encoder 162 compresses and codes the (J+L)th picture (picture b of FIG. 9(B)) preceding the j-th picture of the video data S12 by the amount of L pictures. Accordingly, when the encoder 18 starts the compression and coding of the j-th picture of the delayed video data S16, the encoder 162 has completed the compression and coding of the j-th to (J+L−1)th pictures (range c of FIG. 9(B)) of the video data S12, so the actual difficulty data $D_j$, $D_{j+1}$, $D_{j+2}$, ..., $D_{j+L}$ after the compression and coding of these pictures have been already calculated by the host computer 20.

The host computer 20 calculates the target amount of data $T_j$ to be allocated to the compressed video data obtained by compressing and coding the j-th picture of the delayed video data S16 by the encoder 18 and sets the calculated target amount of data $T_j$ in the quantization control circuit 180.

$$T_j = R'_j \times (D_j) \Big/ \left( \sum_{k=j}^{j+L-1} D_k \right) \qquad \text{[Equation 1]}$$

Note, in Equation 1, $D_j$ is the actual difficulty data of the j-th order of the video data S12, $R'_j$ is an average of the target amount of data which can be allocated to the j-th to (J+L−1)th pictures of the video data S12 and S16, and an initial value $(R'_j)$ of the $R'_j$ is a target amount of data which can be averagely allocated to each picture of the compressed video data, represented by the following Equation 2, and updated as shown in Equation 3 whenever the encoder 18 generates the one picture's worth of the compressed video data.

[Equation 2]

$$R'_1 = (\text{Bit}_{13}\text{rate} \times L) \times \text{Picture}_{13} \text{ rate} \qquad (2)$$

[Equation 3]

$$R'_{j+1} = R'_j - S_j + F_{J+L} \qquad (3)$$

Note that, the numeral bit rate in Equation 3 indicates the amount of data (bit amount) per second determined based on the transmission capacity of the communication line and the recording capacity of the recording medium, the picture rate indicates the number of pictures per second contained in the video data (30/sec (NTSC), 25 /sec (PAL)), and the numeral $F_{j+L}$ indicates an average amount of data per picture determined in accordance with the picture type.

The DCT circuit 166 of the encoder 18 performs the DCT processing for the j-th picture of the delayed video data S16 which is input and outputs the resultant data to the quantization circuit 168.

The quantization circuit 168 quantizes the data of the frequency domain of the j-th picture input from the DCT circuit 166 by the quantization value $Q_j$ adjusted by the quantization control circuit 180 based on the target amount of data $T_j$ and outputs the same as the quantized data to the variable length coding circuit 170.

The variable length coding circuit 170 performs the variable length coding for the quantized data of the j-th picture input from the quantization circuit 168, generates the compressed video data VOUT of the amount of data near the target amount of data $T_j$, and outputs the result.

Similarly, as shown in FIG. 9(B), when the encoder 18 compresses and codes the (j+1) picture (picture a' of FIG. 9(C)) of the delayed video data S16, the encoder 162 has completed the compression and coding of the (j+1)th to (J+L)th pictures (range c' of FIG. 4(C)) of the video data S12, and the actual difficulty data $D_{j+1}, D_{j+2}, D_{J+3}, \ldots, D_{j+L}$ of these pictures have been already calculated by the host computer 20.

The host computer 20 calculates the target amount of data $T_{j+1}$ to be allocated to the compressed video data obtained by compressing and coding the (j+1)th picture of the delayed video data S16 by the encoder 18 and sets the same in the quantization control circuit 180 of the encoder 18.

The encoder 18 compresses and codes the (j+1)th picture based on the target amount of data $T_j$ set in the quantization control circuit 180 from the host computer 20, generates the compressed video data VOUT of the amount of data near the target amount of data $T_{j+1}$, and outputs the same.

Further, below, the video data compressing apparatus 1 similarly successively compresses and codes the k-th picture of the delayed video data S16 by changing the quantization value $Q_k$ (k=j+2, j+3, ...) for every picture and outputs the resultant data as the compressed video data VOUT.

As explained above, according to the video data compressing apparatus 1 shown in the first embodiment, the difficulty of the pattern of the noncompressed video data VIN is calculated for a short time, and the noncompressed video data VIN can be adaptively compressed and coded with a compression rate in accordance with the calculated difficulty. That is, according to the video data compressing apparatus 1 shown in the first embodiment, unlike the 2-path encoding system, the noncompressed video data VIN can be adaptively compressed and coded based on the difficulty of the pattern of the noncompressed video data VIN in almost real time, and thus it can be applied to a purpose for which a real time property is required, for example, a live broadcast.

Note that, in addition to what is shown in the first embodiment, the data multiplexing apparatus 1 according to the present invention can adopt various configurations, for example, the amount of data of the compressed video data compressed and coded by the encoder 162 is used as the difficulty data as it is, and therefore the simplification of the processing of the host computer 20 is achieved.

According to the simplified 2-path encoding system shown in the first embodiment, the adaptive compressing and coding processing is possible for noncompressed video data in real time and in accordance with the difficulty of the pattern. When the simplified 2-path encoding system shown in the first embodiment is used, however, if the real time property is strictly required, the delay time of the FIFO memory 160 cannot be made long, the calculation of a really adequate target amount of data $T_j$ is difficult, and thus there is a possibility of reducing the quality of the video obtained by expanding and decoding the compressed video data VOUT.

In the second embodiment, an explanation will be made, using the video data compressing apparatus 1 (FIG. 1) shown in the first embodiment, of a compressing and coding system (predictive simplified 2-path encoding system) in which the difficulty data (predictive difficulty data) $D_{j+L}$ to $D_{j+L+B}$ of the (J+L)th picture to the (J+L+B)th picture (B is an integer) are calculated from the actual difficulty data $D_j$ to $D_{J+L-1}$ of the j-th picture to (J+L–1)th picture of the compressed video data obtained by preliminarily compressing and coding the noncompressed video data by the amount of L number of pictures so as to obtain the adequate value of the target amount of data $T_j$ even if the delay time of the FIFO memory 160 is not made long by changing the processing of the host computer 20. Also, a value of the target amount of data $T_j$ more adequate than that by the simplified 2-path encoding system shown in the first embodiment can be obtained based on the difficulty data $D_j$ to $D_{j+L}-1$ which are actually obtained (actual difficulty data) and the difficulty data $D'_{j+L}$ to $D'_{j+L+B}$ obtained by prediction.

First, the predictive simplified 2-path encoding system explained in the second embodiment will be conceptually explained.

The predictive simplified 2-path encoding system assumes that the pattern will gradually become more difficult, that is, the high frequency components after the DCT processing at the time of the compression and coding will become greater, the pattern of the noncompressed video data which is becoming faster in motion will become even more difficult, and conversely the pattern of the noncompressed video data which gradually becomes less difficult (easy) will become even more simplified.

That is, in the predictive simplified 2-path encoding system, the host computer 20 controls the compression rate for the encoder 18 based on this assumption so that, when it is predicted that the pattern will become further difficult, the target amount of data to be allocated to the pictures which are being compressed and coded at that point of time will be saved for preparation for a picture with a pattern which is becoming further difficult and, conversely, where it is predicted that the pattern will become easier, the target amount of data to be allocated to the pictures which are being compressed and coded at that point of time will be increased.

Next, the explanation of the concept of the predictive simplified 2-path encoding system will be continued.

Video data generally has a high correlation in the time direction and the space direction. The compression and coding of the video data are carried out by paying attention to their correlation and removing redundancy.

The fact that the correlation is high in the time direction means that the difficulty of the picture of the noncompressed video data at the present point of time and the difficulty of the picture of the noncompressed video data after this are close. Further, also as a trend of change of difficulty, the trend of the change of difficulty up to the present point of time continues also after this in many cases.

Giving a concrete example, a pattern of noncompressed video data in the case where the camera is turned slowly in the horizontal direction from a stationary state to capture a standing object while finally rotating the camera at a constant rotation speed will be considered. Since the camera is in a stationary state at first, a stationary video is shot and the difficulty of the pattern becomes low. Next, when assuming that a constant rotational speed is obtained one to two seconds after the start of the camera, the trend of the difficulty of the pattern becoming high for one to two seconds after the start of the camera is exhibited. When viewing this state from the video data compressing apparatus 1 side, the trend that the difficulty of the pattern of the noncompressed video data which is input will become higher will continue during the period when a few GOPs worth of compressed video data is generated.

Accordingly, in the case as shown in this concrete example, when the difficulty of the pattern of the noncompressed video data tends to increase, it is appropriate that the difficulty of the pattern after this be predicted to tend to increase. In the predictive simplified 2-path encoding system explained below, the time correlation of such a difficulty and the trend of change of the difficulty is positively utilized to perform more suitable allocation of the target amount of data for pictures of the compressed video data than that by the simplified 2-path encoding system shown in the first embodiment.

Below, the operation of the predictive simplified 2-path encoding of the video data compressing apparatus 1 of the second embodiment will be explained.

FIGS. 10(A)–(C) are views of the operation of the predictive simplified 2-path encoding of the video data compressing apparatus 1 in the second embodiment.

The encoder control unit 12 performs preliminary processing such as the rearrangement of pictures in the order of the coding by the encoder control unit 12 on the noncompressed video data VIN input to the video data compressing apparatus 1 in the same way as in the first embodiment and outputs the resultant data as the video data S12 to the FIFO memory 160 and the encoder 162 as shown in FIG. 10(A).

The FIFO memory 160 delays each picture of the input video data S12 by exactly the amount of L number of pictures in the same way as in the first embodiment and outputs the resultant data to the encoder 18.

The encoder 162 preliminarily successively compresses and codes the pictures of the input video data S12 in the same way as that in the first embodiment and outputs the amount of the compressed and coded data obtained by compressing and coding the j-th (j is an integer) picture, the value of the DC component, and the power of the AC component of the video data after the DCT processing to the host computer 20. The host computer 20 successively calculates the actual difficulty data $D_j$ based on these values input from the encoder 162.

For example, since the delayed video data S16 input to the encoder 18 is delayed by exactly L number of pictures by the FIFO memory 160, as shown in FIG. 10(B), when the encoder 18 compresses and codes the j-th picture (picture a of FIG. 10(B)) of the delayed video data S16, this means that the encoder 162 compresses and codes the (J+L)th picture (picture b of FIG. 10(B)) preceding the j-th picture of the video data S12 by the amount of L number of pictures in the same way as that in the first embodiment.

Accordingly, when the encoder 18 starts the compression and coding of the j-th picture of the delayed video data S16, the 10 encoder 162 has completed the compression and coding of the (J–A)th to (J+L–1)th pictures (range c of FIG. 10(B), but FIG. 10 shows a case where A=0) of the video data S12 and outputs the amount of data after the compression and coding of these pictures, the value of the DC component, and the power of the AC component of the video data after the DCT processing to the host computer 20. The host computer 20 has already completed the calculation of the difficulty data (actual difficulty data, range d of FIG. 10(B)) $D_{j-A}, D_{j-A+1}, \ldots, D_j, D_{j+1}, D_{j+2}, \ldots, D_{j+L-1}$ based on these values input from the encoder 162. Note that, A is an integer and may be positive or negative.

The host computer 20 predicts the difficulty data (predictive difficulty data; range e of FIG. 10(B)) $D'_{j+L}, D'_{j+L+1}, D'_{j+L+2}, \ldots, D'_{j+L+B}$ after the compression and coding of the (J+L)th to (J+L+B)th pictures of the video data S12 based on the actual difficulty data $D_{j-}, D_{j-a+}, \ldots, D_j, D_{j+1}, D_{j+2}, \ldots, D_{j+L-1}$ and calculates the target amount of data $T_j$ after the compression and coding of the j-th picture of the delayed video data S16 by Equation 4 shown below. Accordingly, in order to calculate the target amount of data $T_j$ after the compression and coding of the j-th picture of the delayed video data S16, the difficulty data of an amount of (A+L+B+1) of the range c of FIG. 10(B) containing the actual difficulty data and the predictive difficulty data will be used. Note that, a method of calculating the predictive difficulty data based on the actual difficulty data will be mentioned in detail in the fifth embodiment and subsequent embodiments.

[Equation 4]

$$T_j = R'_j \times (D_J) \bigg/ \left( \sum_{k=j}^{J+L-1} D_k + \sum_{k=j+L}^{J+L+B-1} D'_k \right) \quad (4)$$

Note that the symbols of Equation 4 are the same as the symbols of Equation 1.

The encoder 18 generates the compressed video data VOUT of the amount of data near the target amount of data $T_j$ based on the target amount of data $T_j$ set in the quantization control circuit 180 by the host computer 20 and outputs the same in the same way as the first embodiment.

Further, in the same way as the operation shown in FIG. 10 (B), the host computer 20 calculates the target amount of data $T_{j+1}$ after the compression and coding of the (j+1)th picture of the delayed video data S16 based on the actual difficulty data $D_{j-A+1}, D_{j-A+2}, \ldots, D_j, D_{j+1}, D_{j+2}, \ldots, D_{j+L}$ of the range d' of FIG. 10(C) before the (J+L+1)th picture (picture b' of FIG. 10(C)) of the video data S12 and the predictive difficulty data $D'_{j+L+1}, D'_{j+L+2}, D'_{j+L+3}, \ldots, D_{j+L+B+1}$ indicated in the range e' of FIG. 10(C), that is, the actual difficulty data and predictive difficulty data shown in the range c' of FIG. 10(C) for the (j+l)th picture (picture a' of FIG. 10(C)) of the delayed video data S16. The encoder 18 compresses and codes the (j+1)th picture of the delayed video data S16 based on the target amount of data $T_{j+1}$ calculated by the host computer 20 to generate the compressed and coded data VOUT of the amount of data near the target amount of data $T_{j+1}$.

Note that, the predictive simplified 2-path encoding operation of the video data compressing apparatus 1 described above is the same with respect to the (J+1)th picture of the delayed video data S16.

Below, referring to FIG. 11, the operation of the video data compressing apparatus 1 in the second embodiment will be organized and explained.

Figure 11:
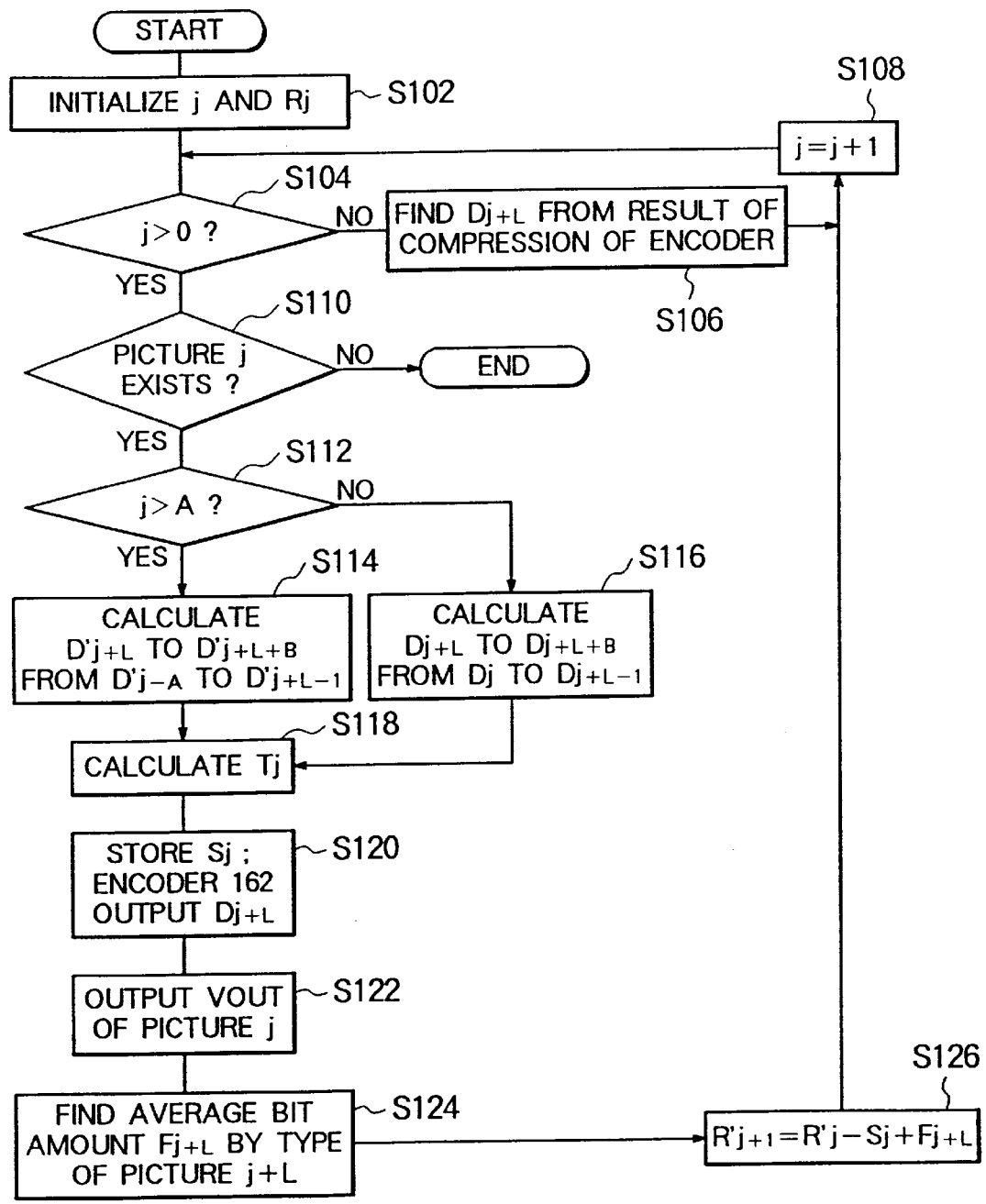
FIG. 11 is a flow chart to which reference will be made in explaining an operation of the video data compressing apparatus of FIG. 6.

FIG. 11 is a flow chart of the operation of the video data compressing apparatus 1 (FIG. 6) in the second embodiment.

As shown in FIG. 11, at step 102 (S102), the host computer 20 initializes the numerals j and $R'_1$ used in Equation 1, etc. while defining that j=−(L−1) and $R'_1$ (bit rate×(L+B))/picture rate.

At step 104 (S104), the host computer 20 decides whether or not the numeral j is larger than 0. Where the numeral j is larger than 0, the operation routine proceeds to the processing of step S106, and where if it is smaller than the latter, the operating routine proceeds to the processing of step S110.

At step 106 (S106), the encoder 162 compresses and codes the (J+L)th picture of the video data S12 to generates the actual difficulty data $D_{j+L}$. At step 108 (S108), the host computer 20 increments the numeral j (j=j+1).

At step 110 (S110), the host computer 20 decides whether or not the j-th picture exists in the delayed video data S16. Where the j-th picture exists, the operation routine goes to step S1 S12, while where it does not exist, the compressing and coding processing is ended.

At step 112 (S112), the host computer 20 decides whether or not the numeral j is larger than the numeral A. Where the numeral j is larger than the numeral A, the operation routine goes to step S114, while when it is smaller than the latter, the operation routine goes to step S116.

At step 114 (S114), the host computer 20 calculates the predictive difficulty data $D'_{j+L}$ to $D'_{j+L+B}$ based on the actual difficulty data $D_{j-A}$ to $D_{j+L-1}$.

At step 116 (S116), the host computer 20 calculates the predictive difficulty data $D'_{j+L}$ to $D'_{j+L+B}$ from the actual difficulty data $D_1$ to $D_{j+L-1}$.

At step 118 (S118), the host computer 20 calculates the target amount of data $T_j$ by using Equation 4 and sets the result in the quantization control circuit 180 of the encoder 18. Further, the encoder 18 compresses and codes the j-th picture of the delayed video data S16 based on the target amount of data $T_j$ set in the quantization control circuit 180 and outputs the amount of data $S_j$ of the compressed video data actually obtained from the j-th picture to the host computer 20.

At step 120 (S120), the host computer 20 stores the amount of data $S_j$ from the encoder 18 and further outputs the actual difficulty data $D_{j+L}$ of the (J+L)th picture of the video data S12.

At step 122 (S122), the encoder 18 outputs the compressed video data VOUT obtained by compressing and coding the j-th order of delayed video data S16 to the outside.

At step 124 (S124), the host computer 20 calculates the numeral $F_{j+L}$ used in Equation 3 in accordance with the picture type.

At step 126 (S126), the host computer 20 performs the operation shown in Equation 3 ($R'_{j+1}=R'_j-S_j+F_{j+L}$).

As explained above, according to the predictive simplified 2-path encoding of the video data compressing apparatus 1 shown in the second embodiment, the noncompressed video data VIN can be adaptively compressed and coded by calculating the difficulty of the picture pattern of the noncompressed video data VIN in a short time and further the difficulty predicted based on the calculated difficulty can be used to allocate a more suitable target amount of data to each picture of the compressed video data compared with the simplified 2-path encoding system. Accordingly, when expanding and decoding video data compressed by the predictive simplified 2-path encoding system, a higher quality of video can be obtained compared with a case of expanding and decoding video data compressed by the simplified 2-path encoding system.

Below, a third embodiment of the present invention will be explained.

The encoder 162 and the encoder 18 (FIG. 6) compress and code the noncompressed video data in units of GOPs (groups of pictures) comprised of a plurality of I pictures (intra coded pictures), B pictures (bi-directionally coded pictures), and P pictures (predictive coded pictures) or a combination of them by the MPEG system or the like. For this reason, it is convenient if also the simplified 2-path encoding system shown in the first embodiment is carried out separately within the framework of the GOPs. In the third embodiment, an explanation of the simplified 2-path encoding system carried out within the framework of the GOPs using the video data compressing apparatus 1 (FIG. 6).

Figure 12:
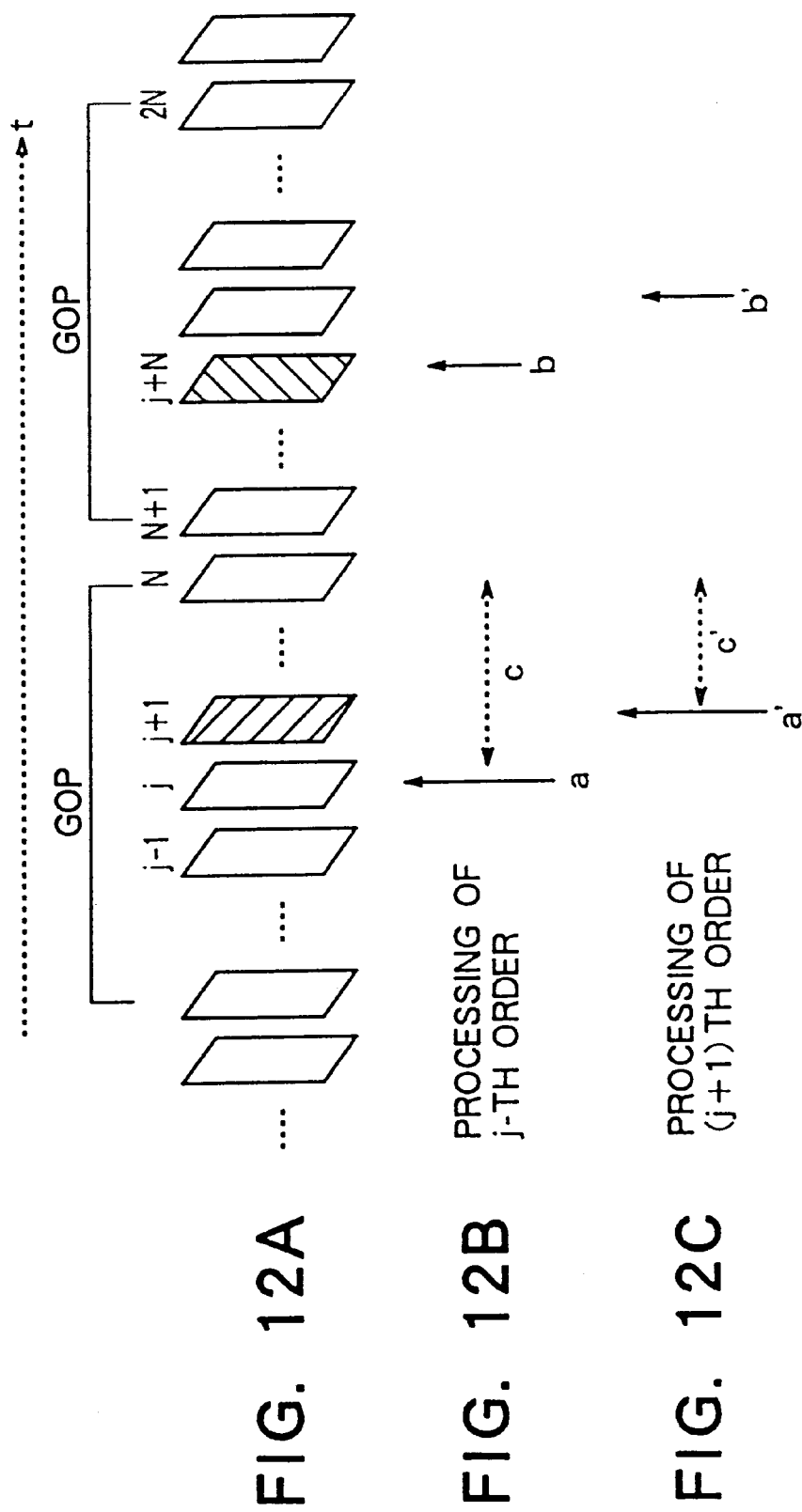
FIGS. 12(A) to (C) are diagrams to which reference will be made in explaining a simplified 2-pass encoding system carried out within the frames of a GOP by the video data compressing apparatus according to an embodiment of the present invention.

FIGS. 12(A) to 12(C) are views of the simplified 2-path encoding system carried out within the framework of GOPs by the video data compressing apparatus 1 according to the present invention. Note that, in FIG. 12, the first picture of the first GOP is shown as the first picture.

As shown in FIG. 12(A), the encoder control unit 12 rearranges the order of the pictures contained in the noncompressed video data VIN which are input and outputs the same to the FIFO memory 160 and the encoder 162 in the same way as the first embodiment.

The FIFO memory 160 delays the pictures of the input video data S12 by an amount of N number of pictures (L=N, where N is an integer), that is, by exactly the amount of one GOP, and outputs the resultant data to the encoder 18.

The encoder 162 preliminarily successively compresses and codes the pictures of the input video data S12 and outputs the amount of data of the compressed and coded data obtained by compressing and coding the j-th (j is an integer) picture, the value of the DC component, and the power of the AC component of the video data after DCT to the host computer 20.

For example, the delayed video data S16 input to the encoder 18 is delayed by exactly N number of pictures by the FIFO memory 160, therefore, as shown in FIG. 12(B), when the encoder 18 compresses and codes the j-th picture (picture a of FIG. 12(B)) of the delayed video data S16, this means that the encoder 162 compresses and codes the (J+N)th picture (picture b of FIG. 12(B)) preceding the j-th picture of the video data S12 by the amount of N number of pictures.

In the third embodiment, however, the video data compressing apparatus 1 performs the simplified 2-path encoding within the framework of the GOPs, therefore when the encoder 18 starts the compression and coding of the j-th picture of the delayed video data S16, the host computer 20 calculates the target amount of data $T_j$ by Equation 5 shown below by using the actual difficulty data (range d of FIG. 12(B)) $D_j, D_{j+1}, \ldots, D_N$ after the compression and coding of the j-th to N-th pictures (range c of FIG. 12 (B)) among the j-th picture to the (j+N−1)th picture of the video data S12 which have finished being compressed and coded by the encoder 162 and sets the same in the quantization control circuit 180 of the encoder 18.

$$T_j = R''_j \times (D_j) / \left( \sum_{k=j}^{j+N-1} D_K + \sum_{k=j+N}^{2N} D'_K \right) \quad \text{[Equation 5]}$$

Note, the $R''_j$ in Equation 5 is a value obtained by subtracting the amount of data which has been already actually used in the compression and coding for the first picture to the (J−1)th picture in the same GOP of the delayed video data S16 from the target amount of data allocated to the GOPs, that is, the target amount of data which should be allocated to the compressed video data of the remaining pictures of the same GOP. Accordingly, $R''_j$ is found by Equation 6 shown below.

[Equation 6]

$$R''_j = R_{j-1} - S_j \quad (6)$$

Accordingly, $R''_1$ (j=1) where the first picture of GOP is compressed and coded is found by Equation 7 shown below.

[Equation 7]

$$R''_1 = G + R''_N \quad (7)$$

Note, in Equation 7, G is a fixed amount of data (G)=(Bit rate×N)/Picture rate) allocated to one GOP, and the initial value of $R_N$ (j=N) is 0.

The encoder 18 generates the compressed video data VOUT having the amount of data near the target amount of data $T_j$ based on the target amount of data $T_j$ set in the quantization control circuit 180 from the host computer 20 and outputs the same in the same way as the first embodiment.

Further, in the same way as the operation shown in FIG. 12(B), the host computer 20 calculates the target amount of data $T_{j+1}$ after the compression and coding of the (j+1)th picture of the delayed video data S16 based on the actual difficulty data $D_{j+1}, D_{j+2}, \ldots, D_N$ of the range d' of FIG. 12(C) before the N-th picture of the video data S12, that is the difficulty data shown in the range c' of FIG. 7(C) also for the (j+1)th picture (picture a' of FIG. 7(C)) of the delayed video data S16. The encoder 18 compresses and codes the (j+1)th picture of the delayed video data S16 based on the target amount of data $T_{j+1}$ calculated by the host computer 20 to generate the compressed and coded data VOUT of the target amount of data $T_{j+1}$.

Note that, the simplified 2-path encoding operation of the video data compressing apparatus 1 described above is the same with respect to the (J+1)th picture of the delayed video data S16.

As explained above, according to the simplified 2-path encoding by the video data compressing apparatus 1 shown in the third embodiment, the simplified 2-path encoding can be carried out within the framework of GOPs, therefore the processing is simplified in content and a short processing time is enough. Accordingly, it is suitable for compressing and coding the noncompressed video data of live broadcasts for which a real time property is required and in addition the video data compressing apparatus 1 can be easily and cheaply configured.

Below, a fourth embodiment of the present invention will be explained.

In the fourth embodiment, an explanation will be made of a method of performing the compression and coding by calculating the target amount of data $T_j$ by using the actual difficulty data of the pictures of the same GOP and the predictive difficulty data predicted for the next GOP and setting the same in the quantization control circuit 180 of the encoder 18 when performing the predictive simplified 2-path encoding carried out separately within the framework of the GOPs by the video data compressing apparatus 1 (FIG. 6), that is, the compression and coding of the j-th picture of the delayed video data S16 by the same encoder 18.

Figure 13:
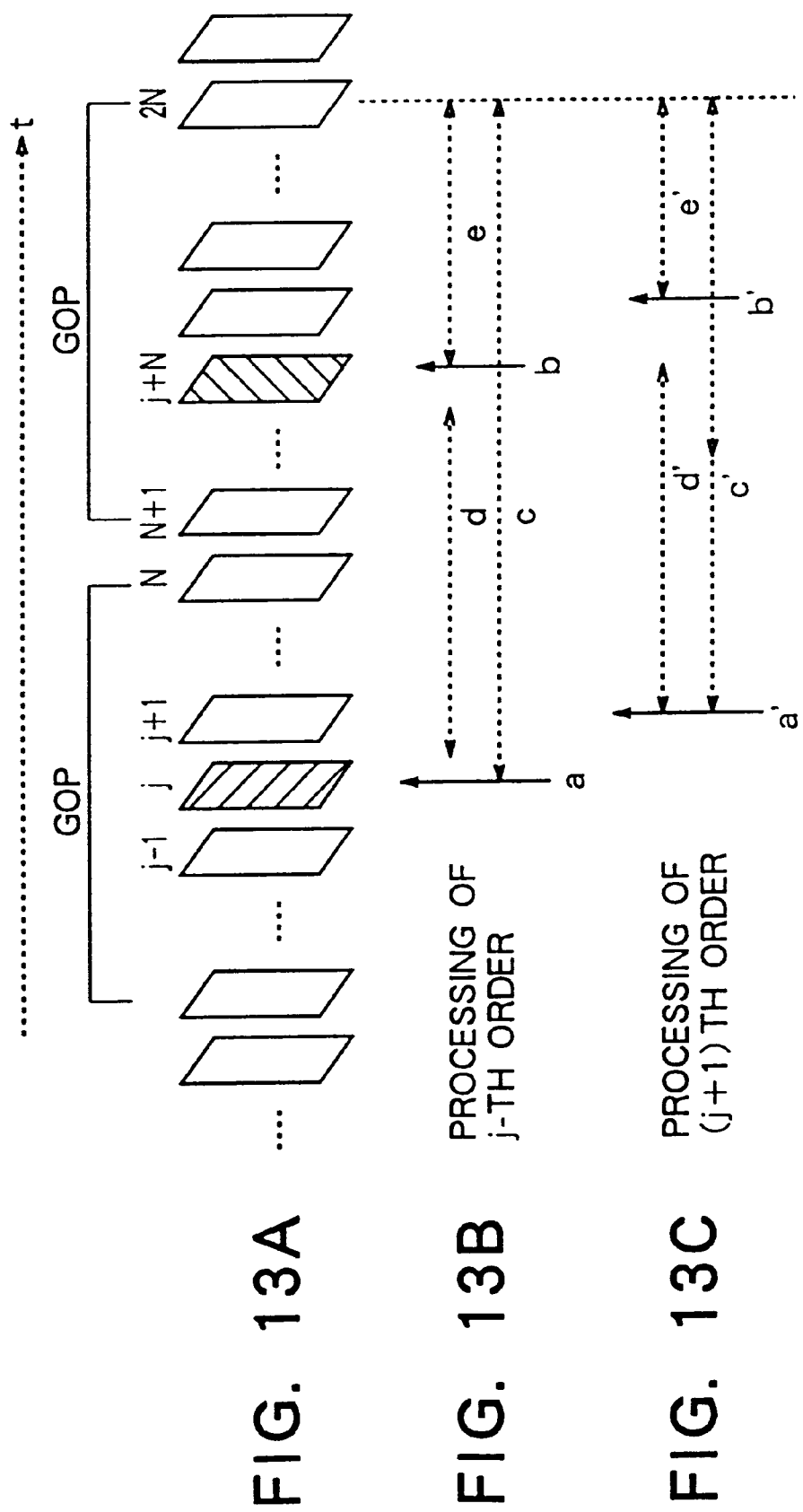
FIGS. 13(A) to (C) are diagrams to which reference will be made in explaining a simplified 2-pass encoding system carried out within the frames of a GOP by the video data compressing apparatus according to an embodiment of the present invention.

FIGS. 13(A) to 13(C) are views of the predictive simplified 2-path encoding system to be carried out within the framework of the GOPs by the video data compressing apparatus 1 according to the present invention in the fourth embodiment. Note that, in FIG. 13, the first picture of the GOP is indicated as the first picture.

As shown in FIG. 13(A), the encoder control unit 12 rearranges the order of pictures contained in the noncompressed video data VIN input and outputs the resultant data to the FIFO memory 160 and the encoder 162 in the same way as the first embodiment.

The FIFO memory 160 delays each picture of the input video data S12 by an amount of N number of pictures, that is, by exactly an amount of one GOP, and outputs the result to the encoder 18.

The encoder 162 preliminarily successively compresses and codes the pictures of the input video data S12 and outputs the amount of the compressed and coded data obtained by compressing and coding the j-th (j is an integer) picture, the value of the DC component, and the power of the AC component of the video data after DCT to the host computer 20. The host computer 20 calculates the actual difficulty data $D_j$ from these values.

For example, the delayed video data S16 input to the encoder 18 is delayed by exactly N number of pictures by the FIFO memory 160, therefore as shown in FIG. 13(B), when the encoder 18 compresses and codes the j-th picture (picture a of FIG. 13(B)) of the delayed video data S16, this means that the encoder 162 compresses and codes the (J+N)th picture (picture b of FIG. 13(B)) preceding the j-th picture of the video data S12 by the amount of N number of pictures.

In the fourth embodiment, however, the video data compressing apparatus 1 performs the simplified 2-path encoding within the framework of the GOPs, therefore when the encoder 18 starts the compression and coding of the j-th picture of the delayed video data S16, the host computer 20 uses the difficulty data (range d of FIG. 13(B)) after the compression and coding of the j-th to (j+N−1)th pictures (range c of FIG. 13 (B)) among the j-th picture to the (j+N−1)th picture of the video data S12 which have finished being compressed and coded by the encoder 162 as the actual difficulty data $D_j, D_{j+1}, \ldots, Dj+_{N-1}$, and further, calculates the predictive difficulty data $D'_{j+N}, D'_{j+N+1}, \ldots, D'_{2N}$ from the (J+1)th picture of the same GOP to the last picture of the next GOP (2N-th picture), calculates the target amount of data $T_j$ based on the actual difficulty data and the predictive difficulty data and sets this in the quantization control circuit 180 of the encoder 18.

$$T_j = R''_j \times (D_j) / \left( \sum_{k=j}^{j+N-1} D_K + \sum_{k=j+N}^{2N} D'_K \right) \quad \text{[Equation 8]}$$

Note, in Equation 8, j=1, 2, . . . , N, and $R''_j$ are values obtained by subtracting the amount of data which has been actually already used in the compression and coding with respect to the first picture to the (J−1)th picture of the delayed video data S16 in two GOPs from the target amount of data allocated to two GOPs, that is the target amount of data which should be allocated to the compressed video data of the remaining pictures of two GOPs. Accordingly, $R''_j$ is found by Equation 9 shown below.

[Equation 9]

$$R''_j = R_{j-1} - S_j \qquad (9)$$

Accordingly, $R''_1$ (j=1) where the first picture of the first GOP of FIG. 13 is compressed and coded is found by Equation 10 shown below.

[Equation 10]

$$R''_1 = G + R''_N \qquad (10)$$

Note, the initial value of $R''_N$ in Equation 10 is G.

The encoder 18 generates the compressed video data VOUT having the amount of data near the target amount of data $T_j$ based on the target amount of data $T_j$ set in the quantization control circuit 180 from the host computer 20 and outputs the same in the same way as the second embodiment.

Further, in the same way as the operation shown in FIG. 13(B), the host computer 20 calculates the target amount of data $T_{j+1}$ after the compression and coding of the (j+1)th picture of the delayed video data S16 based on the actual difficulty data $D_{j+2}, D_{j+3}, \ldots, D_{N+1}$ of the range d' of FIG. 13(C) before the (j+N)th picture of the video data S12, that is, the actual difficulty data shown in the range c' of FIG. 13(C), and the predictive difficulty data of the (J+N+1)th picture to the 2N-th picture of the video data S12 also for the (j+1)th picture (picture a' of FIG. 13(C)) of the delayed video data S16.

The encoder 18 compresses and codes the (j+1)th picture of the delayed video data S16 based on the target amount of data $T_{j+1}$ calculated by the host computer 20 to generate the compressed and coded data VOUT of the target amount of data $T_j+1$.

Note that, the simplified 2-path encoding operation of the video data compressing apparatus 1 described above is the same for the (J+1)th picture of the delayed video data S16.

Below, the operation of the video data compressing apparatus 1 of the fourth embodiment will be explained referring to FIG. 14.

Figure 14:
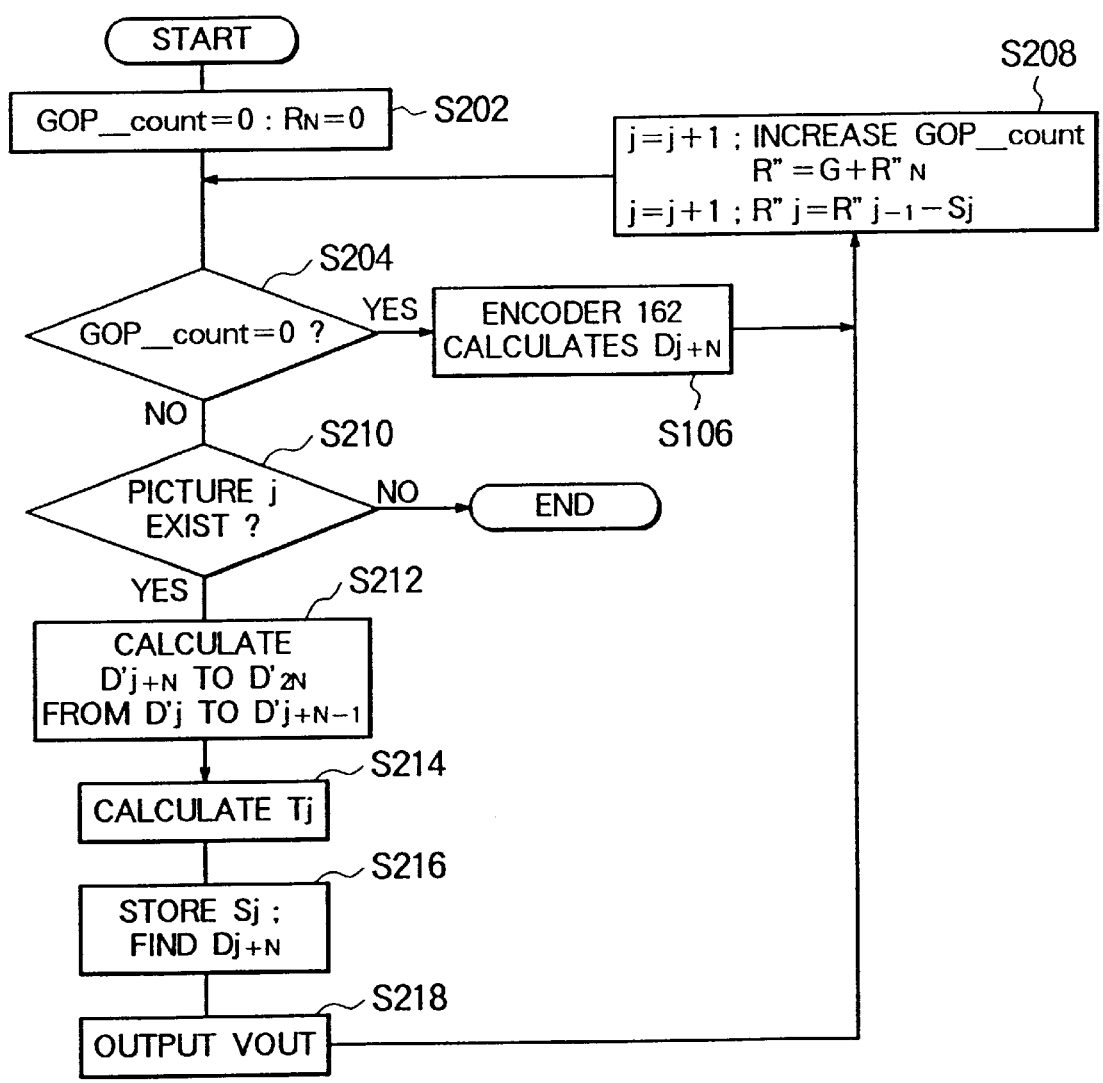
FIG. 14 is a flow chart to which reference will be made in explaining an operation of the video data compressing apparatus embodiment of the present invention.

FIG. 14 is a flow chart of the operation of the video data compressing apparatus 1 in the fourth embodiment.

As shown in FIG. 14, at step 202 (S202), the host computer 20 clears the numerical $GOP_{count}$ and $R_N$ to zero ($GOP_{count}, R_N = 0$).

At step 204 (S204), the host computer 20 decides whether or not the numerical $GOP_{count}$ is 0. Where the numerical $GOP_{count}$ is 0, the host computer 20 proceeds to the processing of S206, and where it is not 0, it proceeds to the processing of step S210.

At step 206 (S206), the (J+N) th picture of the video data S12 is compressed and coded, and the amount of the compressed video data obtained as a result of this, the value of the DC component, and the power of the AC component of the video data after the DCT processing are output to the host computer 20.

At step 208 (S208), the host computer 20 increments the numeral $GOP_{count}$ when the numeral j is N and j=1, changes the numeral $R''_1$ to $G+R''_N$ ($R''_1 = G+R''_N$:Equation 7), increments the numeral j in cases other than this, and changes the numeral $R''_j$ to $R''_{j-1} - S_j$ ($R''_j = R''_{j-1} - S_j$:Equation 6).

At step 210 (S210), the host computer 20 decides whether or not the j-th picture exists in the delayed video data S16. Where the j-th picture exists, the operation routine goes to step S212, while where it does not exist, the compressing and coding processing is ended.

At step 212 (S212), the host computer 20 calculates the predictive difficulty data $D'_{j+N}$ to $D'_{2N}$ from the actual difficulty data $D_j$ to $D_{j+N-1}$.

At step 214 (S214), the host computer 20 calculates the target amount of data $T_j$ by using the actual difficulty data $D_j$ to $D_{j+N-1}$ and the predictive difficulty data $D'_{j+N}$ to $D'_{2N}$ and sets the same in the quantization control circuit 180 of the encoder 18. The encoder 18 compresses and codes the j-th picture of the delayed video data S16 by using the set target amount of data $T_j$.

At step 216 (S216), the encoder 18 outputs the amount of data $S_j$ of the compressed video data obtained by compressing and coding the j-th picture of the delayed video data S16 to the host computer 20. The host computer 20 stores the amount of data $S_j$. The encoder 162 compresses and codes the (J+N)th picture of the video data S12 and outputs the amount of the video data obtained as the result, the value of the DC component, and the power of the AC component of the video data after the DCT processing to the host computer 20. The host computer 20 calculates the actual difficulty data $D_{j+N}$ based on these values.

At step 218 (S218), the encoder 18 outputs the j-th compressed video data VOUT of the delayed video data S16 to the outside.

As explained above, by the predictive simplified 2-path encoding within the framework of GOPs by the video data compressing apparatus 1 shown in the fourth embodiment, a more suitable target amount of data $T_j$ can be calculated compared with the simplified 2-path encoding within the framework of GOPs shown in the third embodiment, therefore the quality of the video obtained by expanding and decoding the compressed video data VOUT obtained as a result of the compression and coding can be enhanced. In addition, compared with the predictive simplified 2-path encoding not contained in the framework of GOPs shown in the second embodiment, the processing is simplified and a shorter processing time is satisfactory. Accordingly, it is suitable for compressing and coding the noncompressed video data of a relay on the spot where a real time property is required, and in addition the video data compressing apparatus 1 can be easily and cheaply constituted.

Below, an explanation will be made of the method of calculating the predictive difficulty data based on the actual difficulty data by a simplified linear prediction as the fifth embodiment of the present invention. Note that, if a plurality of picture types are mixed in the same GOP, the prediction of the difficulty data becomes complex. Accordingly, for convenience of the explanation, in the fifth embodiment, an explanation will be made taking as an example a case where all of the pictures contained in GOP are I pictures, and the number of each of the actual difficulty data and the predictive difficulty data is 15 (L+A, B=15).

Figure 15:
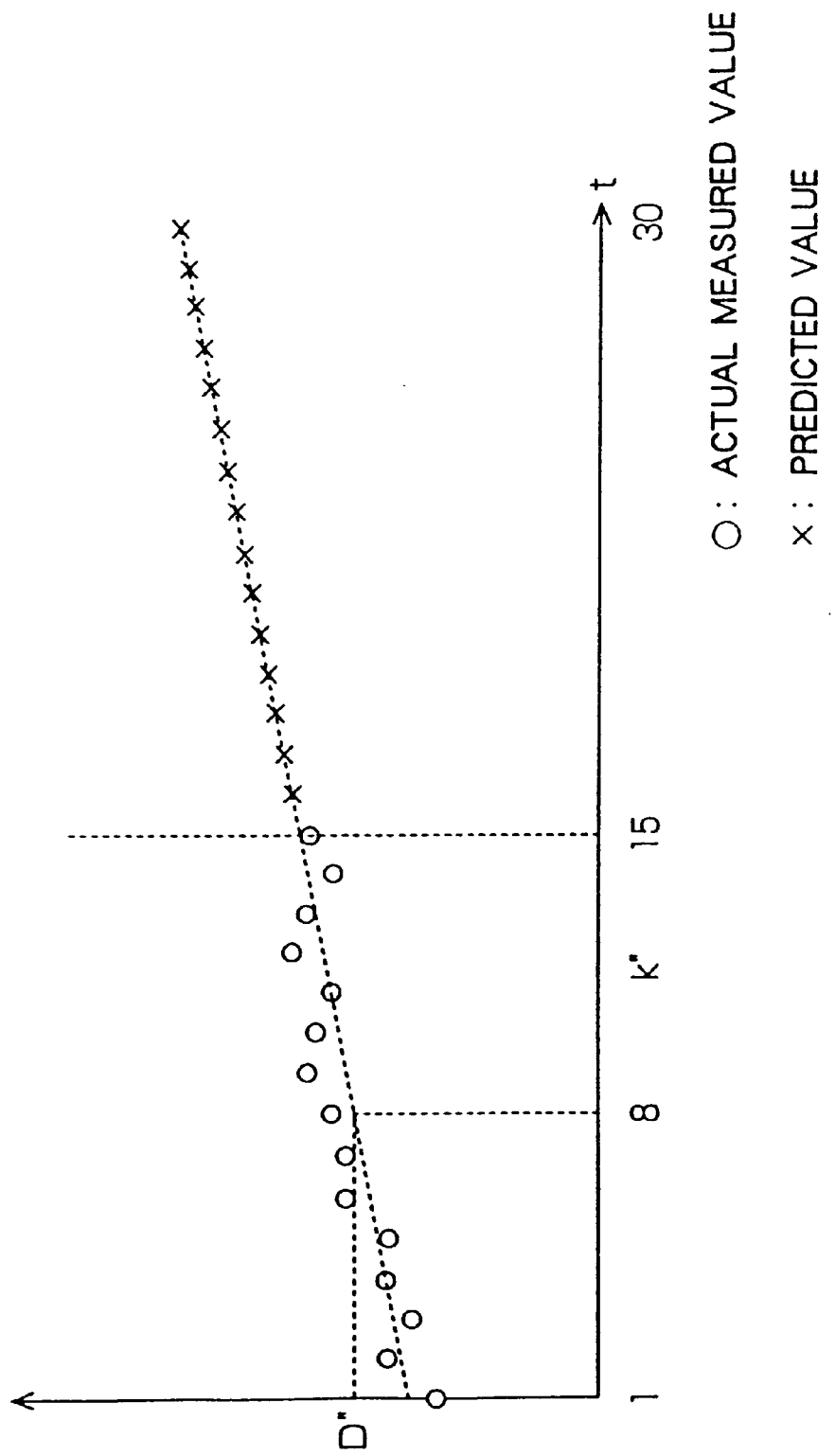
FIG. 15 is a diagram to which reference will be made in explaining calculating predictive difficulty data from actual difficulty data by linear predictions.

FIG. 15 is a view illustrating a method of calculating the predictive difficulty data from the actual difficulty data by the linear prediction in the fifth embodiment. Note that, FIG. 15 shows a case where the number of each of the actual difficulty data and the predictive difficulty data calculated from the actual difficulty data is 15 (L+A, B=15) as mentioned above.

The encoder control unit 12 rearranges the order of the pictures contained in the noncompressed video data VIN input and outputs the same to the FIFO memory 160 and the encoder 162 in the same way as the first embodiment.

The FIFO memory 160 delays each picture of the input video data S12 by an amount of 15 pictures (L+A=15), that is, by exactly the amount of one GOP, and outputs the resultant data to the encoder 18.

The encoder 162 preliminarily successively compresses and codes the pictures of the input video data S12 at first as indicated by a mark o in FIG. 15 and outputs the amount of data of the compressed and coded data obtained by compressing and coding the first picture to 15th picture and the value of the DC component and the power of the AC component of the video data after the DCT processing to the host computer 20. The host computer 20 successively calculates the actual difficulty data $D_1$ to $D_{15}$ based on these values.

The host computer 20 calculates the average value D" of the calculated actual difficulty data $D_1$ to $D_{15}$ by Equation 11 shown below.

$$D'' = \left(\sum_{k=1}^{15} D_K\right)/15 \qquad \text{[Equation 11]}$$

Next, the host computer 20 calculates the data of the center of 15 pieces of actual difficulty data $D_1$ to $D_{15}$, that is, the temporary predictive difficulty data $D_1$, to $D_{15}$, by Equation 13 shown below wherein the actual difficulty data $D_8$ is the average value D" and the inclination is according to Equation 12 shown below, and finds the error function E(a) by Equation 13.

[Equation 12]

$$D'_j = a \times (j-8) + D'' \qquad (12)$$

$$E(a) = \sum_{k=1}^{15} (D_j - D'_j)^2 \qquad \text{[Equation 13]}$$

Further, the host computer 20 finds the inclination a which minimizes the error function E(a) shown in Equation 13. The host computer 20 assigns the inclination a found in this way in Equation 12 and calculates the predictive difficulty data $D'_{16}$ to $D'_{30}$ indicated by a mark x in FIG. 15.

As described above, the host computer 20 calculates the predictive difficulty data $D'_{16}$ to $D'_{30}$ and calculates the target amount of data $T_1$ by using the calculated predictive difficulty data $D'_{16}$ to $D'_{30}$ as shown in the second embodiment and third embodiment.

Further, the host computer 20 calculates the quantization value $Q_1$ for bringing the amount of data of the compressed video data generated from the first picture by the encoder 18 to the target amount of data $T_1$, and sets this in the quantization circuit 166 of the encoder 18. The encoder 18 compresses and codes the first picture of the delayed video data S16 by using the quantization value $Q_1$ set from the host computer 20 and outputs the same as the compressed video data VOUT.

As described above, the host computer 20 calculates the target data for each picture and successively compresses and codes the pictures.

Note that, in Equation 13, a case where the error function E(a) was calculated based on the square error between the straight line shown in Equation 12 and the actual difficulty data $D_1$ to $D_{15}$ was shown, but in order to reduce the calculation amount of the host computer 20, in place of Equation 13, it is also possible to calculate the error function E(a) based on the absolute value of the straight line shown in Equation 12 and the actual difficulty data $D_1$ to $D_{15}$ by Equation 14 shown below.

$$E(a) = \sum_{k=1}^{15} |D_j - D'_j| \qquad \text{[Equation 14]}$$

Note that, needless to say the linear prediction of the present embodiment can be applied also to a case where the number of the actual difficulty data and the number of the predictive difficulty is other than 15.

Below, an explanation will be made of a method of calculating the predictive difficulty data by weighing the actual difficulty data based on the actual difficulty data (weighted linear prediction) as the sixth embodiment of the present invention. Note that, when a plurality of picture types are mixed in the same GOP, the prediction of the difficulty data becomes complex. Accordingly, for convenience of the explanation, also in the sixth embodiment, in the same way as the fifth embodiment, an explanation will be made by taking as an example a case where all of the pictures contained in GOP are I pictures and the number of each of the actual difficulty data and the predictive difficulty data is 15 (L+A, B=15).

It can be considered that the longer the time interval, the less the time correlation between pictures of the video data. Accordingly, so as to calculate the target amount of data of the pictures during the compression and coding, it can be considered that the difficulty of a picture nearer in time has a larger correlation with the difficulty of the picture during the compression and coding. However, where the predictive difficulty data is calculated by a simplified linear prediction shown in the fifth embodiment, such a correlation of difficulty along with the elapse of time is not considered. The calculation of the predictive difficulty data by the weighted linear prediction as will be explained in the sixth embodiment is aimed at improvement of the is precision of the predictive difficulty data by giving a larger influence to the error function by the difficulty of the picture nearer the picture which is now being compressed and coded.

Figure 16:
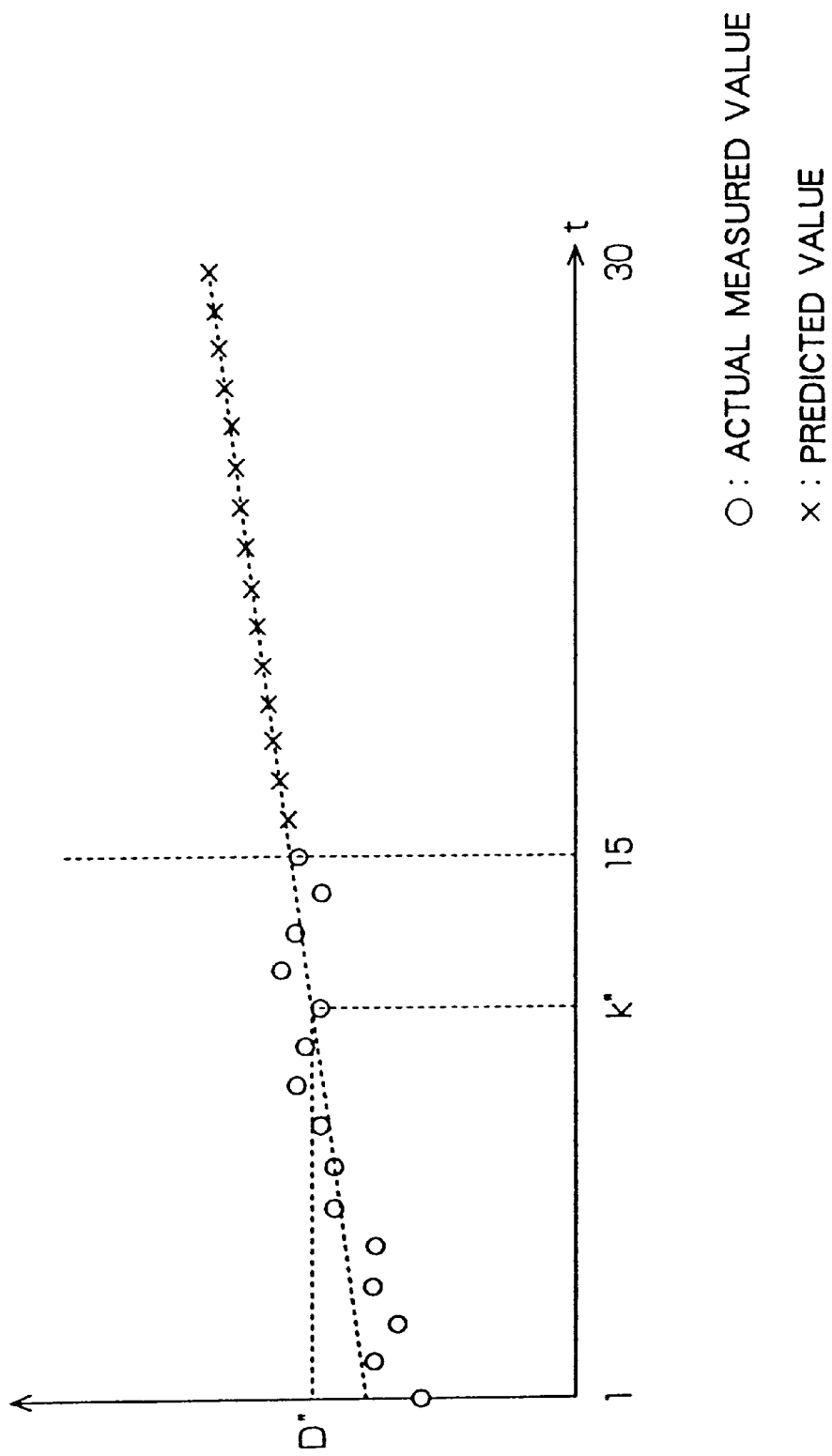
FIG. 16 is a diagram to which reference will be made in explaining calculating the predictive difficulty data from the actual difficulty data by weighted linear prediction.

FIG. 16 is a view illustrating the method of calculating the predictive difficulty data from the actual difficulty data by the weighted linear prediction in the sixth embodiment. Note that, in FIG. 16, as mentioned above, a case is shown where the number of each of the actual difficulty data and the predictive difficulty data calculated from the actual difficulty data is 15 (L+A, B=15).

The encoder control unit 12 rearranges the order of the pictures contained in the noncompressed video data VIN input and outputs the resultant data to the FIFO memory 160 and the encoder 162 in the same way as the first embodiment.

The FIFO memory 160 delays each picture of the input video data S12 by an amount of 15 pictures (L+A=15), that is, by exactly the amount of one GOP, and outputs the same to the encoder 18.

The encoder 162 preliminarily successively compresses and codes the pictures of the input video data S12 as indicated by the mark o in FIG. 16 at first and outputs the amount of the compressed video data and the value of the DC component and the power of the AC component of the video data after the DCT processing to the host computer 20. The host computer 20 successively calculates the actual difficulty data $D_1$ to $D_{15}$ of the compressed and coded data of the first picture to the 15th picture based on these values.

The host computer 20 calculates the average value D" of the calculated actual difficulty data $D_1$ to $D_{15}$, calculates the weighted average value k" of the coefficient k by Equation 15 shown below, and multiplies each of the actual difficulty data $D_1$ to $D_{15}$ by the power of the weighing coefficient ω (1>ω>0) to weight them and calculate the weighted average value D" of the actual difficulty data $D_1$ to $D_{15}$.

$$k'' = \left(\sum_{k=1}^{15} \omega^{15-K} \times k\right) / 15 \qquad \text{[Equation 15]}$$

$$D'' = \left(\sum_{k=1}^{15} \omega^{15-K} \times D_k\right) \qquad \text{[Equation 16]}$$

Next, the host computer 20 determines the straight line represented by Equation 17 shown below by using the calculated weighted average value k" of the coefficient k and the weighted average value D" of the actual difficulty data $D_1$ to $D_{15}$.

[Equation 17]

$$D'_j = a \times (j - k'') + D'' \qquad (17)$$

Further, the temporary predictive difficulty data $D_1'$ to $D_{15}'$ are calculated from Equation 17, and the error function E(a) is found by Equation 18.

$$E(a) = \sum_{k=1}^{15} ((D_j - D'_j)^2 \times \omega^{15-k}) \qquad \text{[Equation 18]}$$

Further, the host computer 20 finds the inclination a minimizing the error function E(a) shown in Equation 13. The host computer 20 inserts the inclination a found in this way in Equation 12 to calculate the predictive difficulty data $D'_{16}$ to $D'_{30}$ indicated by the mark x in FIG. 16.

As described above, the host computer 20 calculates the predictive difficulty data $D'_{16}$ to $D'_{30}$ and calculates the target amount of data $T_1$ by using the calculated predictive difficulty data $D'_{16}$ to $D'_{30}$ as shown in the second embodiment and the third embodiment.

Further, the host computer 20 calculates the quantization value $Q_1$ for bringing the amount of data of the compressed video data generated from the first picture by the encoder 18 to the target amount of data $T_1$ and sets the same in the quantization circuit 166 of the encoder 18. The encoder 18 compresses and codes the first picture of the delayed video data S16 by using the quantization value $Q_1$ set from the host computer 20 and outputs the same as the compressed video data VOUT.

As described above, the host computer 20 calculates the target amount of data for each picture and successively compresses and codes the pictures.

Note that, in Equation 18, a case where the host computer 20 calculates the error function E(a) based on the square difference between the straight line shown in Equation 16 and the actual difficulty data $D_1$ to $D_{15}$ is shown, but in order to reduce the amount of calculations of the host computer 20, in place of Equation 18, it is also possible to calculate the error function E(a) based on the absolute value between the straight line shown in Equation 16 and the actual difficulty data $D_1$ to $D_{15}$ by Equation 19 shown below.

$$E(a) = \sum_{k=1}^{15} (|D_j = D'_j| \times \omega^{15-k}) \qquad \text{[Equation 19]}$$

Note that, needless to say the linear prediction of the present embodiment can be applied also to a case where the number of the actual difficulty data and the number of the predictive difficulty is other than 15.

Below, as a seventh embodiment of the present invention, a method of calculating the predictive difficulty data by considering the change of the difference between the adjoining actual difficulty data (difference prediction) based on the actual difficulty data will be explained. Note that, if a plurality of picture types are mixed in the same GOP, the prediction of the difficulty data becomes complex. Accordingly, for the convenience of the explanation, also in the seventh embodiment, in the same way as the fifth embodiment and sixth embodiment explained heretofore, the explanation will be made by taking as an example a case where all of the pictures contained in the GOP are I pictures, and the number of each of the actual difficulty data and the predictive difficulty data is 15 (L+A, B=15).

Figure 17:
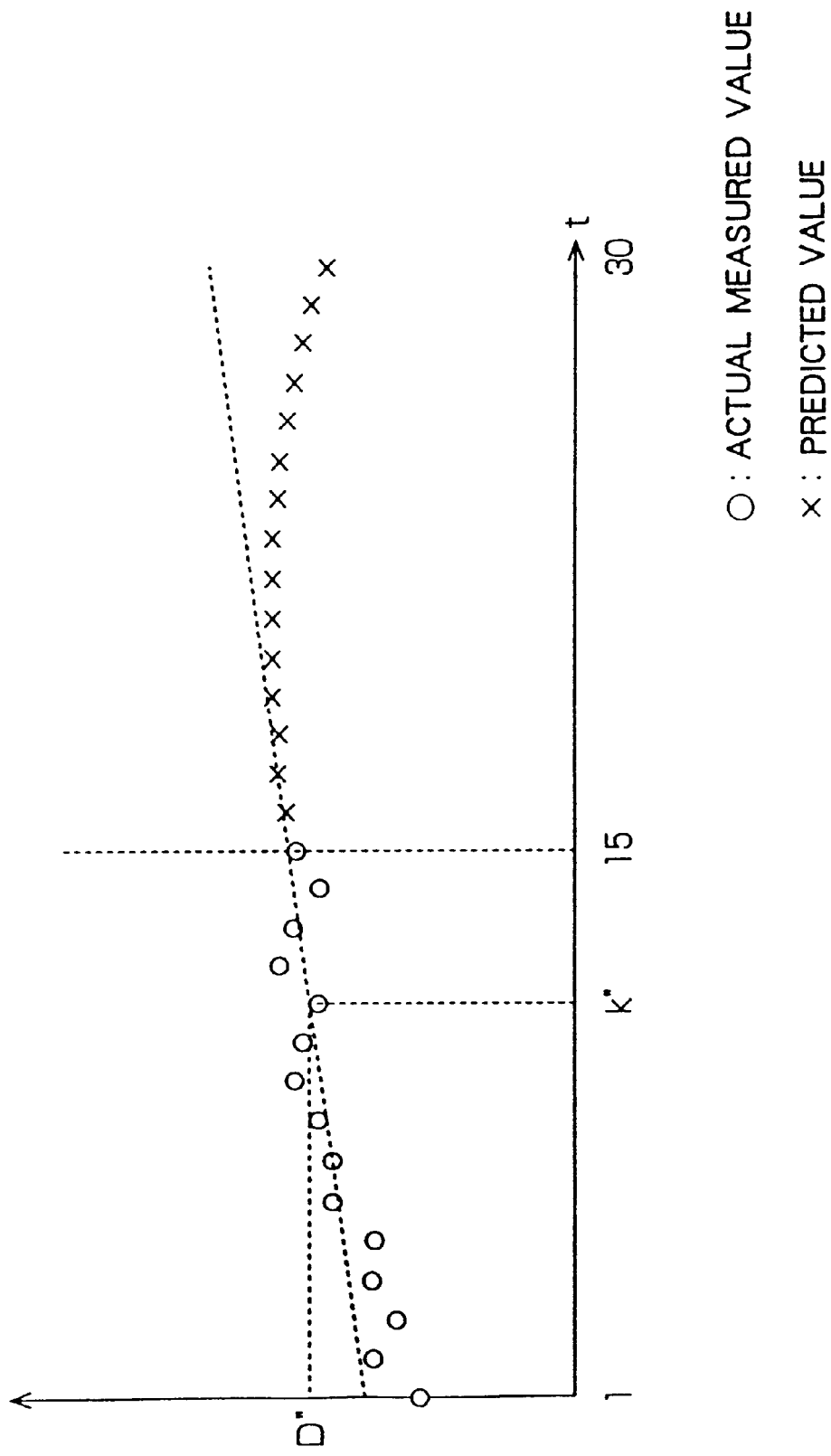
FIG. 17 is a diagram to which reference will be made in explaining a calculating the predictive difficulty data from the actual difficulty data by a differential prediction.

FIG. 17 is a view illustrating a method of calculating the predictive difficulty data from the actual difficulty data by the differential prediction in the seventh embodiment. Note that, in FIG. 17, a case where the number of each of the actual difficulty data and the predictive difficulty data calculated from the actual difficulty data is 15 (L+A, B=15) is shown.

For example, as indicated by the mark o in FIG. 17, in video data of a pattern in which the increase of the value of the actual difficulty data gradually slows, it is expected that the increase of the difficulty of the video data will slow also after this (16th picture on) and the difficulty will be further reduced. In such a case, it can be considered that the precision of the predictive difficulty data can be further improved by reflecting the difference of value between the adjoining actual difficulty data on the predictive difficulty data. In the differential prediction shown in the seventh embodiment, it is intended to improve the precision of the predictive difficulty data from such a viewpoint. Note that, many methods can be considered for reflecting the difference of value between the adjoining actual difficulty data on the predictive difficulty data and these can be made as complicated as desired, but in the seventh embodiment, an explanation will be made of the simplest case where the value of the difference is linearly approximated.

The encoder control unit 12 rearranges the order of the pictures contained in the noncompressed video data VIN input and outputs the resultant data to the FIFO memory 160 and the encoder 162 in the same way as the first embodiment.

The FIFO memory 160 delays each picture of the input video data S12 by the amount of 15 pictures (L+A=15), that is, by exactly the amount of one GOP, and outputs the same to the encoder 18.

The encoder 162 preliminarily successively compresses and codes the pictures of the input video data S12 as indicated by the mark o in FIG. 17 at first and outputs the amount of data of the compressed and coded data obtained by compressing and coding the first picture to the 15th picture and the value of the DC component and the power of the AC component of the video data after the DCT processing to the host computer 20. The host computer 20 successively calculates the actual difficulty data $D_1$ to $D_{15}$ from these values.

The host computer 20 calculates the actual difficulty data $D_1$ to $D_{15}$ from the amount of data of the compressed video data and the value of the DC component and the power of the AC component of the video data after the DCT processing input from the encoder 162 and further calculates the difference $\Delta_k$ ($\Delta_k = D_k - D_{k-1}$; k=0, 2, . . . , 14) between adjoining actual difficulty data.

Further, the host computer 20 performs the linear approximation by using Equation 10 to Equation 13 shown in the fifth embodiment or Equation 14 to Equation 18 shown in the sixth embodiment to calculate the predictive difference values $\Delta_{16}$ to $\Delta_{30}$.

Further, the host computer 20 applies Equation 11 shown in the fifth embodiment or Equation 16 shown in the sixth embodiment for the calculated predictive difference values $\Delta_{16}$ to $\Delta_{30}$, calculates the predictive difficulty data $D'_{16}$, and calculates the predictive difficulty data $D'_{17}$ to $D'_{30}$ by using Equation 20 shown below.

$$D'_j = D'_{16} + \sum_{k=16}^{1} \Delta_k \quad [\text{Equation 20}]$$

The host computer 20 calculates the target amount of data $T_1$ by using the actual difficulty data $D_1$ to $D_{15}$ and the predictive difficulty data $D'_{16}$ to $D'_{30}$ calculated as explained above.

Note that, in the seventh embodiment, the host computer 20 approximates the difference $\Delta_k$ between the adjoining pictures by a straight line (primary function). Accordingly, the predictive difficulty data $D'_{16}$ to $D'_{30}$ calculated by the host computer 20 are approximated to the values on a parabola (secondary function) obtained by integrating the primary function as indicated by the mark x in FIG. 17.

Further, the host computer 20 calculates the quantization value $Q_1$ for bringing the amount of data of the compressed video data generated from the first picture by the encoder 18 to the target amount of data $T_1$ and sets the same in the quantization circuit 166 of the encoder 18. The encoder 18 compresses and codes the first picture of the delayed video data S16 by using the quantization value $Q_1$ set from the host computer 20 and outputs the same as the compressed video data VOUT.

As described above, the host computer 20 calculates the target amount of data for each picture and successively compresses and codes the pictures.

Note that, needless to say the linear prediction of the present embodiment can be applied also to a case where the number of the actual difficulty data and the number of the predictive difficulty is other than 15.

Below, an explanation will be made of the method of calculating the predictive difficulty data where the GOP is comprised by a plurality of types of pictures. Note that, in the eighth embodiment, a case where one GOP is comprised by 15 pictures in an order of I, B, B, P, B, B, P, B, B, P, B, B, P, B, and B and the number of each of the actual difficulty data and the predictive difficulty data is 15 (L+A, B=15) will be exemplified.

In the fifth embodiment to seventh embodiment, for convenience, the explanation of the present invention was made taking as an example a case where the GOP was comprised by only I pictures. In actuality, however, the GOP is comprised by I pictures, P pictures, and B pictures and it is necessary to calculate the predictive difficulty data by the method corresponding to the picture type. In the method of calculation of the predictive difficulty data in the eighth embodiment, such an actual circumstance is considered.

Prediction by Picture Type

First, a method of performing the predictive simplified 2-path encoding by calculating the predictive difficulty data by picture type can be considered.

That is, the encoder 162 (FIG. 6) outputs the amount of data obtained by compressing and coding each picture of the GOP and the value of the DC component and the power of the AC component of the video data after the DCT processing to the host computer 20. The host computer 20 independently processes the actual difficulty data calculated from these values for each picture type by a simplified linear prediction, weighted linear prediction, or differential prediction shown in the fourth embodiment to the seventh embodiment, calculates the predictive difficulty data of each of the I pictures, P pictures, and B pictures, and calculates the target amount of data $T_j$.

The encoder 18 compresses and codes the delayed video data S16 based on the target amount of data $T_j$ calculated by the host computer 20 for each picture type as shown in the second embodiment and the fourth embodiment to seventh embodiment and outputs the resultant data as the compressed video data VOUT.

Normalization Prediction

Next, a method of performing the predictive simplified 2-path encoding by normalizing the actual difficulty data in accordance with the value of the actual difficulty data of each picture contained in the GOP and calculating the predictive difficulty data from the normalized actual difficulty data can be considered.

Where the normalization prediction is carried out, first, the host computer 20 calculates the actual difficulty data from the amount of data of each of the I pictures, B pictures, and P pictures generated from each picture of the GOP by the encoder 162 and the value of the DC component and the power of the AC component after the DCT processing and further calculates the proportion of the values of the actual difficulty data of each of the I pictures, B pictures, and P pictures (I:P:B).

Next, the host computer 20 normalizes the actual difficulty data of the I pictures, B pictures, and P picture with a calculated proportion of values of the actual difficulty data and calculates the temporary predictive difficulty data using the normalized actual difficulty data. Further, the host computer 20 multiplies the proportion of each of the I pictures, B pictures, and P pictures with the temporary predictive difficulty data to calculate the predictive difficulty data.

Below, the method of normalization prediction will be explained in more detail referring to FIG. 18.

Figure 18:
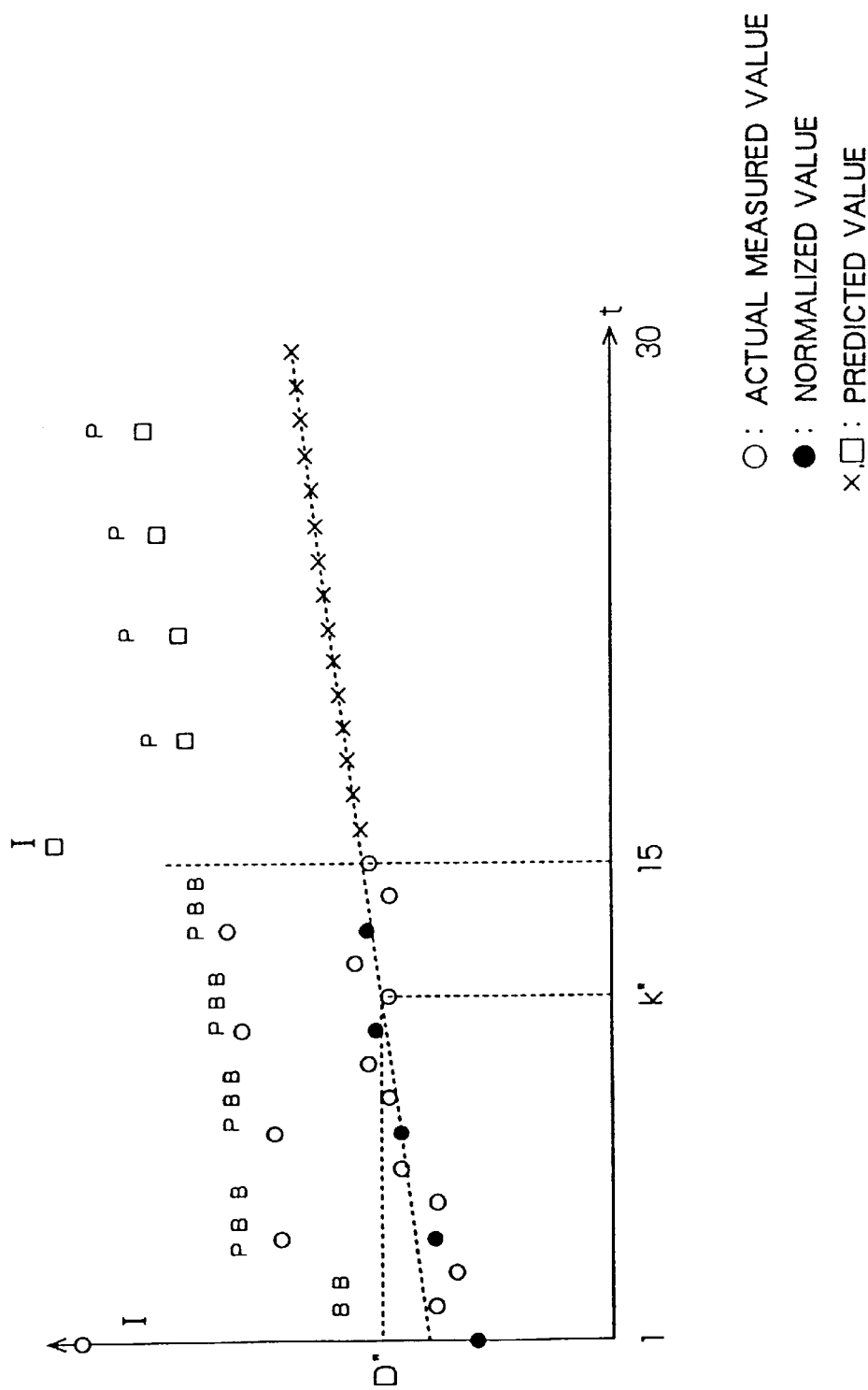
FIG. 18 is a diagram to which reference will be made in explaining calculating the predictive difficulty data from the actual difficulty data wherein a GOP includes a plurality of types of pictures.

FIG. 18 is a view of the method of calculating the predictive difficulty data from the actual difficulty data where the GOP is comprised by a plurality of types of pictures. Note that, in FIG. 18, a case where the number of each of the actual difficulty data and the predictive difficulty data calculated from the actual difficulty data is 15 (L+A, B=15) as mentioned above is shown.

The encoder 162 outputs the amount of data of the pictures contained in the GOP of the video data S12 in the order of I, B, B, P, B, B, P, B, B, P, B, B, P, B, and B and the value of the DC component and the power value of the AC component after the DCT processing to the host computer 20. The host computer 20 calculates the actual difficulty data $D_1$ to $D_{15}$ indicated by the mark o in FIG. 18 from these values.

Further, the host computer 20 normalizes the generated actual difficulty data $D_1$ to $D_{15}$. That is, in the case where, for example, among the actual difficulty data $D_1$ to $D_{15}$, the proportion of the value of the difficulty data $D_1$ of the I pictures, the value of each of the difficulty data $D_4$, $D_7$, $D_{10}$, and $D_{13}$ of the P pictures, and the value of each of the difficulty data $D_2$, $D_3$, $D_5$, $D_6$, $D_8$, $D_9$, $D_{11}$, $D_{12}$, $D_{14}$, and $D_{15}$ of the B pictures, that is, the proportion of the amount of data of one I picture, the amount of data of one P picture, and the amount of data of one B picture is for example almost 4:2:1, the host computer 20 divides the actual difficulty data $D_1$ of the I picture by 4, divides each value of the actual difficulty data $D_4$, $D_7$, $D_{10}$, and $D_{13}$ of P picture by 2, and further divides each value of the actual difficulty data $D_2$, $D_3$, $D_5$, $D_6$, $D_8$, $D_9$, $D_{11}$, $D_{12}$, $D_{14}$, and $D_{15}$ of the B picture by 1 to perform the normalization and generates the normalized actual difficulty data indicated by the mark o in FIG. 18.

Next, the host computer 20 generates the temporary predictive difficulty data indicated by the mark x in FIG. 18 by the simplified linear prediction shown in for example the fifth embodiment.

Further, among the temporary difficulty data indicated by the mark x in FIG. 18, the temporary difficulty data of the I pictures is multiplied by 4, the temporary difficulty data of the P pictures is multiplied by 2, and the temporary difficulty data of the B pictures is multiplied by 1 to generate the predictive difficulty data $D'_{16}$ to $D'_{30}$ indicated by a square mark in FIG. 18.

In the same way as the fifth embodiment, the host computer 20 generates the target amount of data $T_j$ by using the actual difficulty data $D_1$ to $D_{15}$ and the predictive difficulty data $D'_{16}$ to $D'_{30}$.

The encoder 18 compresses and codes the delayed video data S16 based on the target amount of data $T_j$ generated by the host computer 20 and outputs the same as the compressed video data VOUT.

As explained above, according to the video data compressing apparatus of the present invention and the method of the same, noncompressed video data can be compressed and coded to less than a predetermined amount of data not without using 2-path encoding.

Further, according to the video data compressing apparatus of the present invention and the method of the same, a high quality video can be obtained when expanding and decoding the compressed video data compressed and coded to less than the predetermined amount of data without using 2-path encoding.

Further, according to the video data compressing apparatus of the present invention and the method of the same, the noncompressed video data can be compressed and coded without using 2-path encoding by estimating the amount of data of the compressed video data after the compression and coding and adjusting the compression rate based on the estimated amount of data of the compressed video data.

Further, according to the video data compressing apparatus of the present invention and the method of the same, the noncompressed video data can be compressed and coded without using 2-path encoding while estimating the amount of data of the is compressed video data after the compression and coding with a high precision.

Thus, in the above embodiments, both actual difficulty data and predictive difficulty data may be utilized to determine a target amount of code data. As such, the picture quality may be improved even if the size of the buffer FIFO remains the same. However, if the FIFO is reduced (as, for example, from 15 frames to 8 frames), then the processing may be closer to real time. In this situation, the target amount of data may be determined based on the actual or real difficulty data of frames 1–8 and the predicted difficulty data of frames 9–15. Further, the present invention may utilized polynomial curve fit or similar techniques for predicting difficulty data. Furthermore, the difficulty data may be weighted in accordance with a predetermined arrangement. For example, the actual difficulty data may be weighted more than the predicted difficulty data. Further, picture data may be normalized.

Thus, the above embodiments may enable high quality compressed video data to be generated in real time without compression and coding for only the estimation of the compression difficulty. That is, video data (FIG. 5(A)) rearranged in an order suited for coding is preliminarily successively compressed and coded as it is. The actual difficulty data $D_j$ indicating the difficulty of the pattern of the video data is generated based on the result of this preliminary compression and coding. Further, based on the actual difficulty data (range d of FIG. 5(B)) $D_{j-A}$ to $D_{j+L-1}$, predictive difficulty data (range e of FIG. 5(B)) $D'_{j+L}$ to $D'_{j+L+B}$ which have not been actually generated are generated. On the other hand, the input video data is delayed by exactly an amount of L pictures, subjected to DCT, and further quantized by a quantization value $Q_j$ for obtaining the target amount of data $T_j$ after the compression and coding of the j-th picture calculated based on the actual difficulty data and the predictive difficulty data and output as the compressed video data.

Other embodiments of the present invention will now be described. In describing such embodiments, unless otherwise specified, the equations will be numbered starting with equation number 1 and the initial embodiment described therein will be referred to as the first embodiment, and subsequent embodiments as the second embodiment, and so forth.

Below, an explanation will be made of a method of continuously connecting a plurality of series of noncompressed video data (hereinafter, the noncompressed video data will be also described as a scene) to obtain a single series of noncompressed video data by edit processing (edited video data) and compressing and coding the edited video data comprised by these plurality of scenes by the simplified 2-path encoding system using the video data compressing apparatus 1 (FIG. 6) shown in the above first embodiment.

Figure 19A:
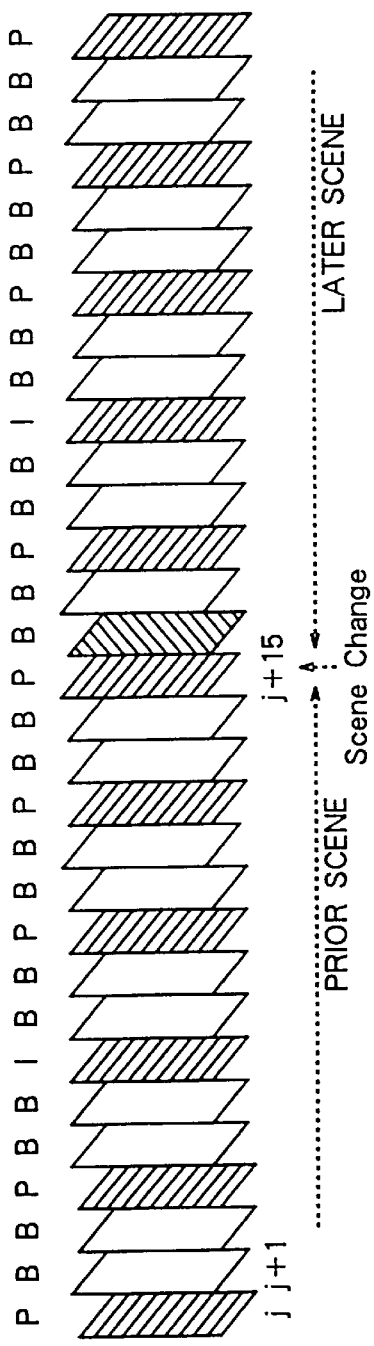
FIGS. 19(A) to (C) are diagrams to which reference will be made in explaining compression and coding with respect to pictures before and after a scene change by the predictive simplified 2-path encoding system and an improved predictive simplified 2-path encoding system.
Figure 19B:
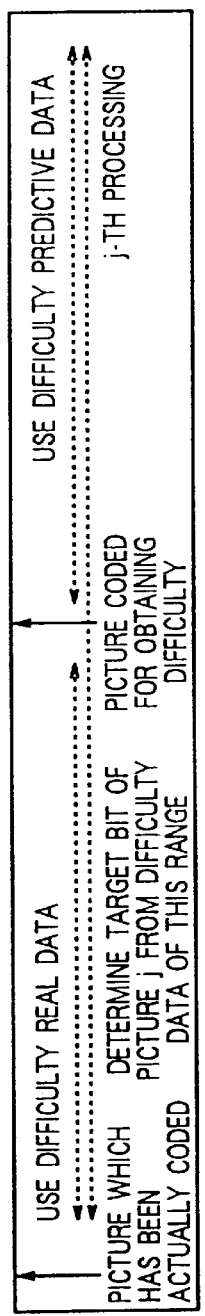
Figure 19C:
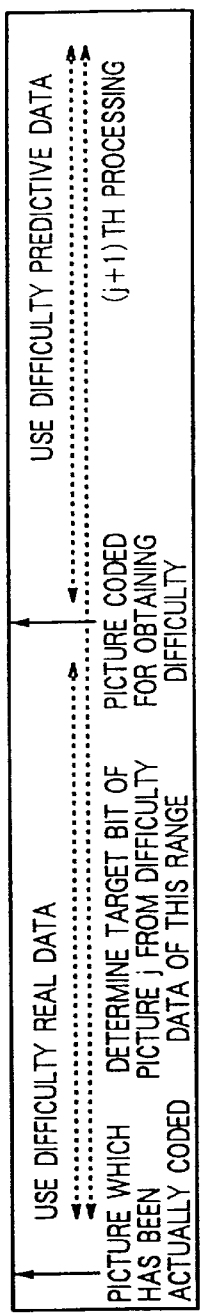

FIGS. 19(A) to 19(C) are views of the compression and coding of the pictures before and after a scene change by the improved predictive simplified 2-path encoding system in the second embodiment and the improved predictive simplified 2-path encoding system in a third embodiment.

The predictive simplified 2-path encoding system shown in the second embodiment predicts the amount of data of each of the pictures of the compressed video data by utilizing the time correlation between pictures contained in the video data which are input as shown in FIG. 19(A). Where a scene change is caused at a timing shown in FIG. 19(B), however, there is no correlation between pictures before and after the scene change, therefore, as shown in FIG. 19(C), the target amount of data $T_j$ for the pictures after the scene change will be calculated based on the difficulty data before the scene change, therefore there is a possibility that not only cannot the effect of the predictive simplified 2-path encoding system shown in the second embodiment be obtained, but also the quality of the video after the expansion and decoding is conversely degraded.

That is, giving a concrete example, in the predictive simplified 2-path encoding system, where a scene change occurs during a period where a scene having an easy picture pattern is input and replaces a scene having a difficult picture pattern, irrespective of the fact that the host computer 20 predicts the value of the difficulty data of the edited video data input to be small even after the scene change, in actuality a picture having a difficult pattern is input and the amount of data to be allocated to each picture in a later scene becomes insufficient. In this way, when the amount of data to be allocated is insufficient, a considerable coding distortion occurs in the compressed video data of the part of a scene change and the quality of the video obtained by the expansion and decoding is considerably lowered.

The predictive simplified 2-path encoding system (improved predictive simplified 2-path encoding system) shown in the third embodiment was made from such a viewpoint and has as an object thereof to perform efficient compression and coding by removing adverse influences due to the allocation of the amounts of data based on the prediction of the difficulty data in a part where the time correlation of the edited video data is lost when a time correlation of the edited video data is lost before or after the scene change and further predicting the amount of codes to be allocated to the pictures immediately after the scene change with a high precision.

To achieve this object, in the improved predictive simplified 2-path encoding system, the predictive simplified 2-path encoding system using the video data compressing apparatus 1 (FIG. 1) shown in the second embodiment is improved, the scene change is detected, and the difficulty of the predetermined number of pictures after this is predicted correctly as much as possible by using not the actual difficulty data before the scene change which no longer can be used for the calculation of the amount of data to be allocated to the picture of the compressed video data, but the actual difficulty data found after the scene change.

First, the concept of the improved predictive simplified 2-path encoding system will be explained referring to FIG. 20 and FIG. 21.

Figures 20A, 20B, 20C:
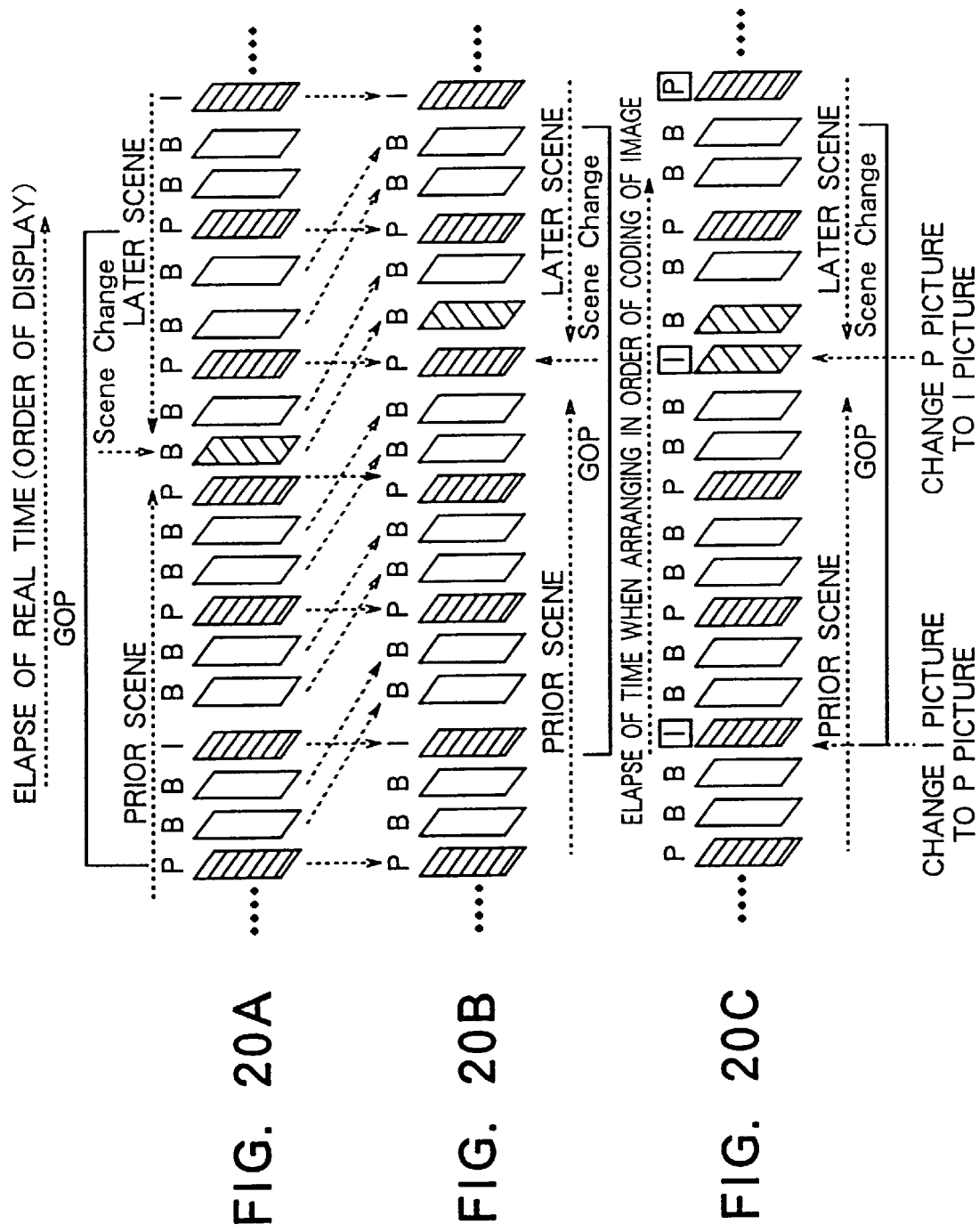
FIGS. 20(A) to (C) are diagrams to which reference will be made in explaining processing for rearranging the order of pictures of the edited video data by an encoder control unit of FIG. 6 and the processing for changing the picture type by a host computer.

FIGS. 20(A) to 20(C) are views of the processing for rearranging the order of the pictures of the edited video data by the encoder control unit 12 (FIG. 6) and the processing for changing the type of the picture (picture type) by the host computer 20.

Figure 21:
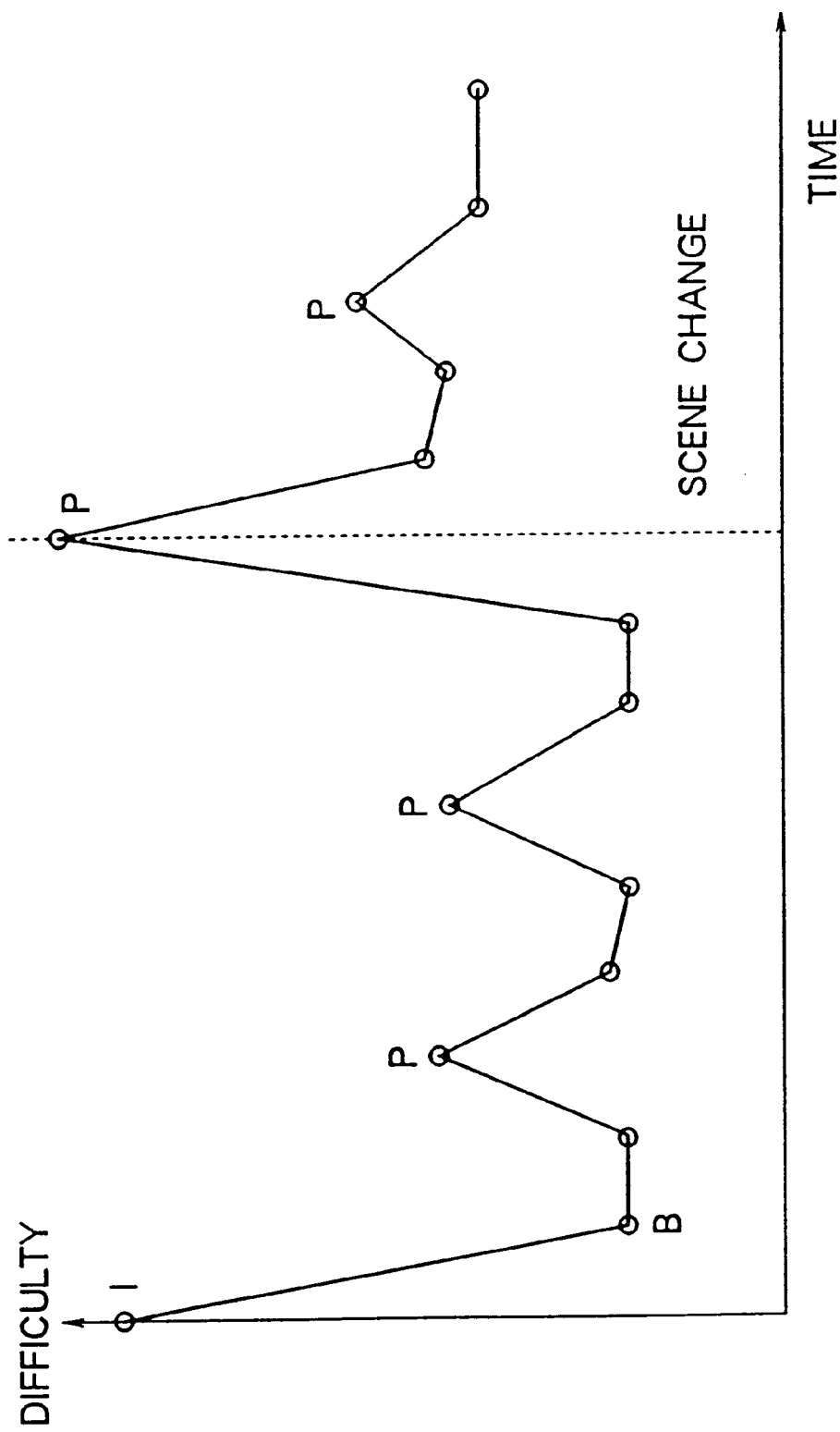
FIG. 21 is a diagram illustrating the change of the value of the actual difficulty data near the part of a scene change of the edited video data along with the elapse of time.

FIG. 21 is a view illustrating the change of the value of the actual difficulty data near the scene change part of the edited video data along with the elapse of time. Note that, in FIG. 21, the I-picture, P-picture, and the B-picture indicate the picture type after compressing and coding the edited video data.

When a scene change of the edited video data is caused in the picture which becomes the P-picture after the compression and coding (hereinafter, "picture which becomes the P-picture after the compression and coding" etc. will be also simply described as "P-picture" etc.), the value of the actual difficulty data $D_j$ generated by the encoder 162 and the host computer 20 from the video data S12 obtained by rearranging the order of the pictures of the edited video data as shown in FIGS. 20(A) and 20(B) by the encoder control unit 12 (FIG. 6) changes as shown in for example FIG. 21. That is, immediately after the scene change, the actual difficulty data $D_j$ of the leading P-picture of the edited video data is increased since the P-picture of the compressed video data generated from this picture cannot refer to the forward picture and will be generated by almost the same processing as that for the I-picture. Accordingly, the value of the actual difficulty data $D_j$ of the P-picture at the head of the scene becomes the value the same extent as that of for example the difficulty data $D_j$ of the I-picture.

Accordingly, the host computer 20 monitors the change of the value of the actual difficulty data DJ along with the elapse of time based on the picture type sequence of the compressed video data generated by the encoder 162. For example, where the value of the actual difficulty data $D_j$ of the P-picture becomes 1.5 times or more that of the actual difficulty data $D_j$ of the P-picture immediately before this, where it becomes 0.7 time or more that of the actual difficulty data $D_j$ of the I-picture immediately before this, or where the value of the actual difficulty data becomes 1.5 times or more compared with the value predicted by the host computer 20 by the same method as that in the predictive simplified 2-path encoding system shown in the second embodiment, it can be decided that a scene change was caused in the picture of the edited video data corresponding to that P-picture.

When a scene change of the edited video data is caused in a picture which becomes the I-picture after the compression and coding, however, the value of the actual difficulty data $D_j$ generated by the host computer 20 sometimes causes almost no change. Nevertheless, the value of the actual difficulty data $D_j$ of the B-picture immediately after the scene change is increased up to the same extent as that of the value of the actual difficulty data $D_j$ of the P-picture.

Accordingly, the host computer 20 monitors the change of the value of the actual difficulty data $D_j$ along with the elapse of time. For example where the value of the actual difficulty data $D_j$ of the B-picture becomes 1.5 times or more that of the actual difficulty data $D_j$ of the B-picture immediately before this, or where the value of the actual difficulty data $D_j$ becomes 1.5 times or more compared with the predicted value, it can be decided that a scene change was caused in the picture of the edited video data corresponding to the I-picture immediately before the B-picture. Further, as another method, there can be mentioned a method in which when the value of the actual difficulty data Dj of the I-picture shows a considerable increase and phenomenon compared with the value predicted by the same method as that in the predictive simplified 2-path encoding system shown in the second embodiment, the host computer 20 decides that a scene change was caused in that I-picture.

On the other hand, the correlation between the picture before the scene change of the edited video data and the picture after the scene change is lost due to the occurrence of the scene change, therefore the predictive difficulty data $D'_j$ for the picture after the scene change using the actual difficulty data $D_j$ before the scene change in the predictive simplified 2-path encoding system shown in the second embodiment no longer has meaning.

However, the few pictures immediately after a scene change of the edited video data have a sufficient correlation with the pictures after this, therefore it is possible to predict the value of the actual difficulty data $D_j$ of the predetermined number of pictures after this based on the actual difficulty data $D_j$ of some pictures immediately after the scene change.

Further, the predictive simplified 2-path encoding system shown in the second embodiment calculates the target amount of data $T_j$ as shown in the above Equation 4. Accordingly, to calculate the target amount of data $T_j$, it is sufficient so far as the sum value $Sum_j$ defined in the following Equation 5 is used. It is not always necessary to find individual predictive difficulty data $D'_j$.

$$Sum_j = \sum_{k=j+L}^{j+L+B-1} D'_k \quad \text{[Equation 1]}$$

When the sum value $Sum_j$ defined in Equation 1 is used, Equation 4 above can be rewritten to the following Equation 2.

$$T_j = R'_j \times (D_j) \Bigg/ \left( \sum_{k=j}^{j+L-1} D_k + Sum_j \right) \quad \text{[Equation 2]}$$

That is, the host computer 20 can calculate the target amount of data $T_j$ so far as not the individual predictive difficulty data $D'_j$, but the sum value $Sum_j$ can be predicted.

In the improved predictive simplified 2-path encoding system in the third embodiment, the host computer 20 predicts the sum value $Sum_j$ based on the actual difficulty data $D_j$ generated immediately after the scene change and calculates the target amount of data $T_j$ with a high precision based on the predicted sum value $Sum_j$. Subsequently, during a period where a predetermined number of pictures of the edited video data are input, the host computer 20 successively corrects the values of the sum value $Sum_j$ based on the actual difficulty data $D_j$ generated after this. Further, the host computer 20 generates the target amount of data $T_j$ by the same method as that in the predictive simplified 2-path encoding system shown in the second embodiment after the predetermined number of pictures are further input after the scene change and a sufficient number of actual difficulty data $D_j$ are generated.

Next, the operation of the video data compressing apparatus 1 (FIG. 1) in the third embodiment will be explained. Note that, for simplification of the explanation, in the third embodiment as well, an explanation will be made taking as an example a case where, as shown in FIG. 19, the video data compressing apparatus 1 compresses and codes the edited video data to a picture type sequence the same as that in the second embodiment (N=15, M=3; N is the number of pictures contained in one GOP, and M is the number of B-pictures between P-pictures) to generate the predictive difficulty data $D'_j$ of the next 15 pictures from the actual difficulty data $D_j$ of 15 pictures in the same way as in the second embodiment.

The encoder control unit 12 performs the same processing as that in the first embodiment and the second embodiment, rearranges the order of pictures of the noncompressed video data input by the picture type sequence shown in for example FIG. 20(A) to an order suited for the compression and coding in the encoder 162 and the encoder 18 as shown in FIG. 20(B), that is, an order where the B-picture comes behind the I-picture or P-picture immediately after this and outputs the resultant data to the encoder 162 and the FIFO memory 162 as the video data S12. Accordingly, for example, as shown in FIG. 20(A), even if a scene change between the data of the first scene and the data of the second scene is caused in the picture which should be compressed and coded to the B-picture, the first picture type of the later scene to be input to the encoder 162 and the encoder 18 becomes the P-picture or the I-picture without fail.

The FIFO memory 160 delays for example the edited video data input by an amount of 15 pictures and outputs the delayed data to the encoder 18 in the same way as that in the first embodiment and the second embodiment.

The encoder 162 compresses and codes the video data S12 by the picture type sequence I, B, B, P, B, B, P, B, B, P, B, B, P, B, B, P, B, B irrespective of the existence of a scene change in the same way as that in the first embodiment and the second embodiment generates the actual difficulty data $D_j$, and outputs the same to the host computer 20. The change of the value of the actual difficulty data $D_j$ generated by the encoder 162 along with the elapse of time becomes for example as shown in FIG. 21. Generally the value of the actual difficulty data of the first P-picture of the later scene immediately after the occurrence of a scene change becomes larger than the value of the actual difficulty data of the other P-pictures.

The host computer 20 monitors the change of the value of the actual difficulty data input from the encoder 162 along with the elapse of time, and decides that, as mentioned above in the third embodiment, a scene change occurred in a P-picture by for example a method of detecting the P-picture in which the value of the actual difficulty data $D_j$ is a value of for example 1.5 times (for practical use, it is preferred if a value of 1.4 times to 1.8 times is adopted) or more that of the actual difficulty data $D_j$ of the P-picture immediately before this. When detecting a scene change, the host computer 20 further controls the encoder 18 so as to change the first P-picture of the later scene to an I-picture without referring to the last picture of the previous scene and change the last I-picture of the previous scene to the P-picture as shown in FIG. 20(C) and makes the encoder 18 change the picture type sequence when compressing and coding the parts before and after the scene change of the edited video data.

Note that, even if a scene change is caused, a large change is not always caused in the amount of data of the I-picture per se. However, the host computer 20 monitors the change of the value of the actual difficulty data of the B-picture along with the elapse of time as mentioned above in the third embodiment and can decide that the scene change was caused in the I-picture by for example a method of detecting the B-picture having actual difficulty data of the value of 1.5 times that of the actual difficulty data of the B-picture immediately before this.

Figure 22:
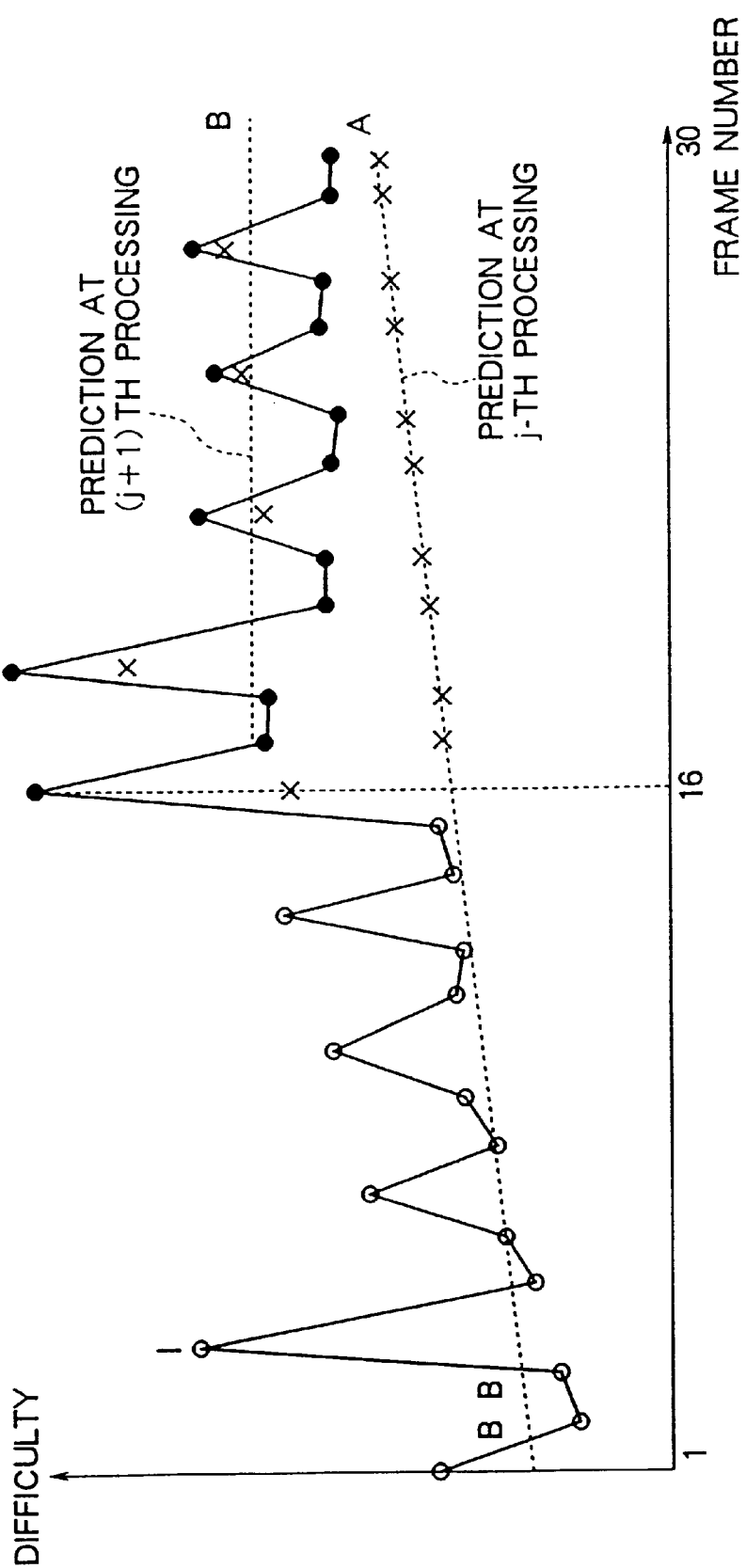
FIG. 22 is a diagram to which reference will be made in explaining a method of calculating the predictive difficulty data $D'_{16}$ to $D'_{30}$ based on the actual difficulty data $D_1$ to $D_{15}$ when a scene change is caused in the edited video data and a method of calculating predictive difficulty data $D'_{16}$ to $D'_{30}$ when a scene change is not caused in the edited video data by the host computer of FIG. 6.

FIG. 22 is a view of a method of calculating the predictive difficulty data $D'_{16}$ to $D'_{30}$ based on the actual difficulty data $D_1$ to $D_{15}$ when a scene change is caused in the edited video data and a method of calculating the predictive difficulty data $D'_{16}$ to $D'_{30}$ when a scene change is not caused in the edited video data.

The host computer 20 generates the actual difficulty data $D_1$ to $D_{15}$ indicated by a mark o in FIG. 22 from the data obtained from the encoder 162 when a scene change is not caused in the edited video data and calculates the predictive difficulty data $D'_{16}$ to $D'_{30}$ indicated by a mark x in FIG. 22 for every type of picture (picture type) based on the generated actual difficulty data $D_1$ to $D_{15}$.

That is, where a scene change is not caused in the edited video data, the host computer 20 linearly approximates the values of the actual difficulty data $D_2, D_3, \ldots, D_{13}$ and $D_{14}$ of the B-picture by a dotted line A in FIG. 22 and externally inserts the same, generates the predictive difficulty data $D'_{16}$, $D'_{17}, \ldots, D'_{29}$, and $D'_{30}$ of the B-picture, linearly approximates the value of the actual difficulty data $D_4$ of the I-picture and, if necessary, the actual difficulty data $D_j$ of the I-picture before this and externally inserts the same, generates the predictive difficulty data $D'_{18}$ of the I-picture, linearly approximates the values of the actual difficulty data $D_1, D_7, \ldots, D_{12}$ of the P-picture, and, if necessary, the actual difficulty data $D_j$ of the P-picture before this and externally inserts the same, and generates the predictive difficulty data $D'_{15}$, $D'_{21}$, ..., $D'_{27}$ of the P-picture. Further, the host computer 20 calculates the target amount of data $T_j$ by the predictive simplified 2-path encoding system shown in the second embodiment by using these actual difficulty data $D_j$ and predictive difficulty data $D'_j$.

Below, an explanation will be made of the processing content in a case where the host computer 20 detects a scene change of the edited video data by a P-picture dividing the same into stages.

First Stage

When the host computer 20 detects that a scene change was caused in a P-picture, the difficulty of the B-picture and the P-picture influenced by the amount of motion between pictures etc. cannot be predicted from only the actual difficulty data $D_{15}$ of the P-picture indicated by o in FIG. 22. Therefore, the host computer 20 finds the sum value $Sum_j$ defined in Equation 1 by using the ratio of the values of the actual difficulty data of the I-picture, P-pictures, and the B-pictures (i:p:b) which was found in advance by experiment etc.

That is, to calculate the target amount of data for the (j+1)th (j=1 in FIG. 22) picture, the host computer 20 inserts the actual difficulty data $D_{j+15}$ of the P-picture in which the scene change was caused in Equation 3 using for example the following ratio of values of the actual difficulty data of the I-picture, P-pictures, and the B-pictures found in advance, predicts the sum value $Sum_{j+1}$ used for the calculation of the target amount of data $T_{j+1}$ for the (j+1)th picture, and further inserts the predicted sum value $Sum_{j+1}$ in above Equation 4 to calculate the target amount of data $T_{j+1}$ for the (j+1)th picture. p [Equation 3]

$$Sum_{j+1} = D_{j+15} \times (1+4\times p/i+10\times b/i)+\alpha \qquad (3)$$

Equation 3 means that, by using the fact that the value of the actual difficulty data $D_{j+15}$ of the P-picture in which the scene change was caused is equal to the actual difficulty data $D_{j+18}$ of the I-picture immediately after this as mentioned above in the third embodiment, the host computer 20 multiples the actual difficulty data $D_{j+15}$ of the P-picture calculated at first after the scene change by the coefficient-obtained by multiplying the ratio (i:p:b) found in advance and the number of the I-picture, P-pictures, and B-pictures contained in one GOP and further adds the predetermined constant $\alpha$ and calculates the sum value $Sum_{j+1}$.

Note that, in Equation 3, the constant $\alpha$ takes the predetermined value found in advance by experiment etc. and has meaning as a margin anticipating that the (j+16)th and (j+17)th B-pictures immediately after the (j+15)th P-picture in FIG. 22, that is, immediately after the scene change, are generated by only forward prediction or backward prediction, therefore the amount of data is larger compared with the other B-pictures.

When it is assumed that the host computer 20 changed the linear prediction of the (j+15)th to (j+30)th difficulty data using the sum value $Sum_j$ found by Equation 3, the values of the predictive difficulty data $D'_{j+15}$ to $D'_{j+30}$ are increased by the scene change and become the values indicated by a dotted line B in FIG. 22. Note, for the calculation of the target amount of data $T_j$, it is sufficient so far as only the value of the sum value $Sum_j$ is predicted. As will be mentioned later, the value of the constant $\alpha$ is corrected when calculating the sum value $Sum_{j+1}$ for the (j+2)th picture, therefore the host computer 20 will not to perform the prediction of the difficulty data for every type of picture when a scene change is caused unlike the case where a scene change is not caused.

Second Stage

When the host computer 20 calculates the target amount of data $T_{j+2}$ for the (j+2)th picture, the actual difficulty data $D_{j+16}$ of the (j+16)th B-picture is calculated. In the example shown in FIG. 22, the (j+16)th B-picture belongs to a later scene, but as shown in FIGS. 20(A) and 20(B), the encoder control unit 12 has rearranged the order of the pictures, so there is a possibility that the (j+16)th B-picture belongs to a previous scene and is generated by only the forward prediction or backward prediction, therefore the host computer 20 cannot use the actual difficulty data $D_{j+16}$ of the (j+16)th B-picture for the prediction of the sum value $Sum_{j+2}$ for calculating the target amount of data $T_{j+2}$ for the (j+2)th picture.

In Equation 3, however, it is possible to correct the constant $\alpha$ of Equation 3 using the value of the actual difficulty data $D_{j+16}$ of the first B-picture between two B-pictures considering the margin as the constant $\alpha$. Therefore, as shown below as Equation 4, the host computer 20 calculates the constant $\alpha'$ by correcting the constant a of Equation 3 based on the actual difficulty data $D_{j+16}$, and can predict the sum value $Sum_{j+2}$ having a further high precision. The host computer 20 inserts the predicted sum value $Sum_{j+2}$ in Equation 4 and calculates the target amount of data $T_{j+2}$ with respect to the (j+2)th picture.

[Equation 4]

$$Sum_{j+2} = D_{j+15} \times (1+4\times p/i+10\times b/i)+\alpha' \qquad (4)$$

Third Stage

When the host computer 20 calculates the target amount of data $T_{j+3}$ for the (j+3)th picture, the actual difficulty data $D_{j+17}$ of the (j+17)th B-picture has been calculated. Accordingly, Equation 3 clarifies the values of the actual difficulty data $D_{j+16}$ and $D_{j+16}$ of both of the two B-pictures considering the margin as the constant $\alpha$, that is, all of the set of B-pictures sandwiched by the I-picture and P-picture in the picture type sequence shown in FIGS. 20(A) to 20(C), therefore, as shown below in Equation 5, the constant $\alpha$ of Equation 3 or the constant $\alpha'$ of Equation 4 becomes unnecessary.

[Equation 5]

$$Sum_{j+3} = D_{j+15} \times (1+4\times p/i+10\times b/i) \qquad (5)$$

Fourth Stage

When the host computer 20 calculates the target amount of data $T_{j+3}$ for the (j+4)th picture, the actual difficulty data $D_{j+18}$ of the (j+18)th I-picture is calculated. At this stage, in the example shown in FIG. 22, the values of the actual difficulty data $D_i$ of all types of pictures (picture types) after the scene change are clarified. Therefore, it becomes possible to replace the value of the ratio (i:p:b) found in advance and used in Equation 3 to Equation 5 by the actual difficulty data $D_{j+18}$ of the I-picture, the actual difficulty data $D_{j+15}$ of the P-picture, and the actual difficulty data $D_{j+16}$ ($D_{j+17}$) of the P-picture which are actually calculated by the host computer 20.

In this way, the host computer 20 predicts the sum value $Sum_{j+18}$ with a further high precision by using Equation 5 in which the ratio (i:p:b) found in advance is replaced by the actual ratio [$D_{j+18}, D_{j+15}, D_{j+16}$ ($D_{j+17}$)], inserts the same in above Equation 4, and calculates the target amount of data $T_{j+4}$ for the (j+4)th picture.

Fifth Stage

In the same way as in the fourth stage, after the target amount of data $T_{j+3}$ for a few (for example six to nine)

pictures after the (j+5)th order is calculated and the actual difficulty data $D_i$ of an amount sufficient for the calculation of the predictive difficulty data $D'_i$ is obtained, the host computer 20 calculates the predictive difficulty data $D'_i$ by linear approximation, inserts the calculated predictive difficulty data $D'_i$ in above Equation 4, and calculates the target amount of data $T_i$ in the same way as the case where a scene change is not caused.

Where the host computer 20 decides that a scene change was caused in the I-picture based on the change of the actual difficulty data $D_i$ of the I-picture as mentioned above in the third embodiment, it can perform the same processing as that in the case where the host computer 20 decides that a scene change was caused in a P-picture, that is, the processing of the first stage to fifth stage, to calculate the target amount of data $T_i$ with respect to each picture.

On the other hand, when the host computer 20 decides that a scene change was caused in the I-picture based on the change of the actual difficulty data $D_i$ of a B-channel as mentioned above in the third embodiment, the host computer 20 cannot perform the processing of the first stage or the second stage in a case where it decides that the scene change was caused in the P-picture. Accordingly, where it decides that the scene change was caused in the I-picture based on the change of the value of the actual difficulty data $D_i$ of a B-channel, the host computer 20 performs the processing of the second stage or the third stage in the case where it decides that the scene change was caused in the P-picture and calculates the target amount of data $T_i$ for each picture.

The contents of processing for the prediction of the sum value $Sum_i$ and the calculation of the target amount of data $T_i$ explained above will be further explained referring to a flow chart.

Figure 23A:
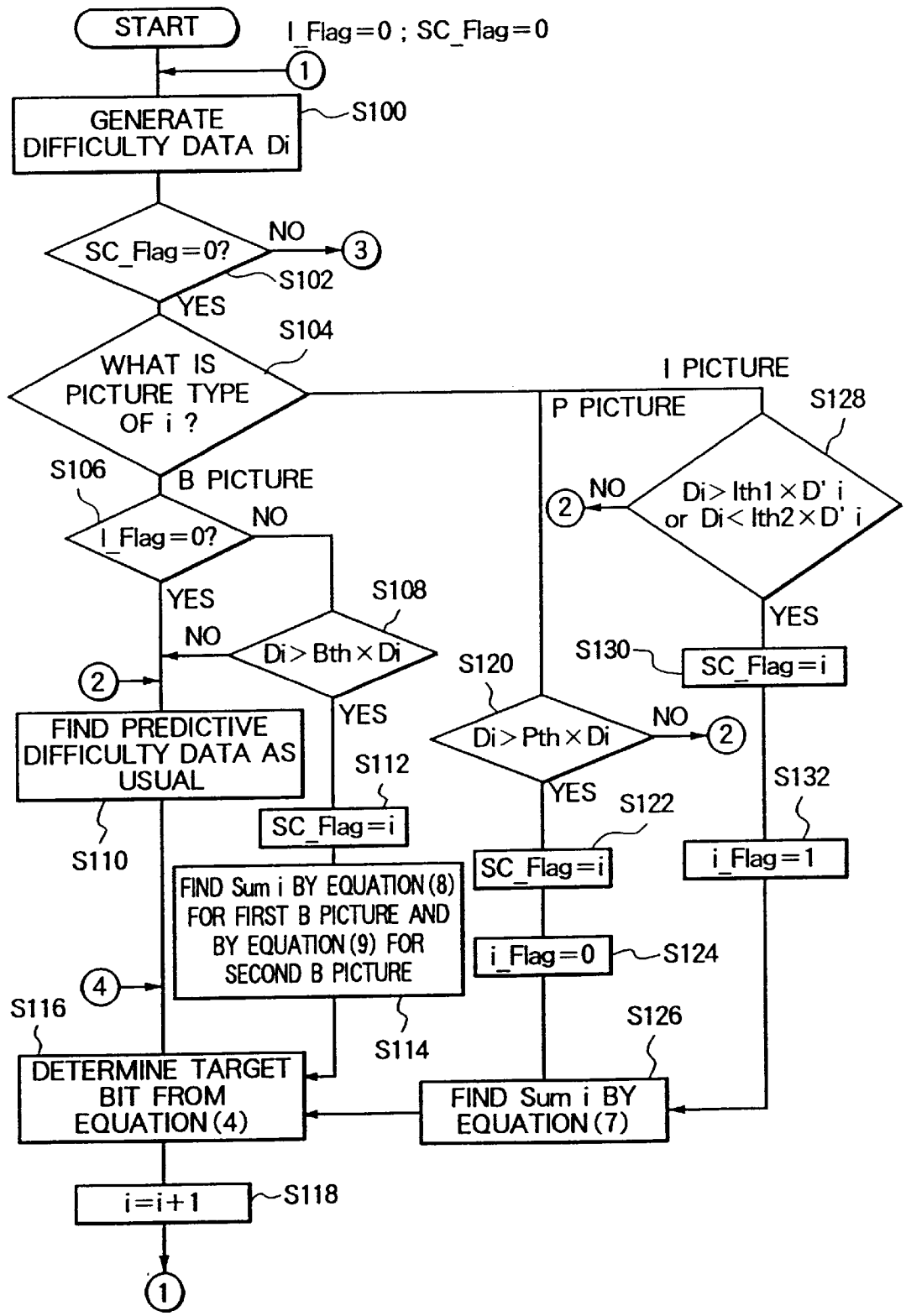
FIG. 23(A) and 23(B) is a flow chart to which reference will be made in explaining the processing content for the prediction of the sum value $Sum_i$ and the calculation of the target amount of data $T_i$ in an improved predictive simplified 2-path encoding system.
Figure 23B:
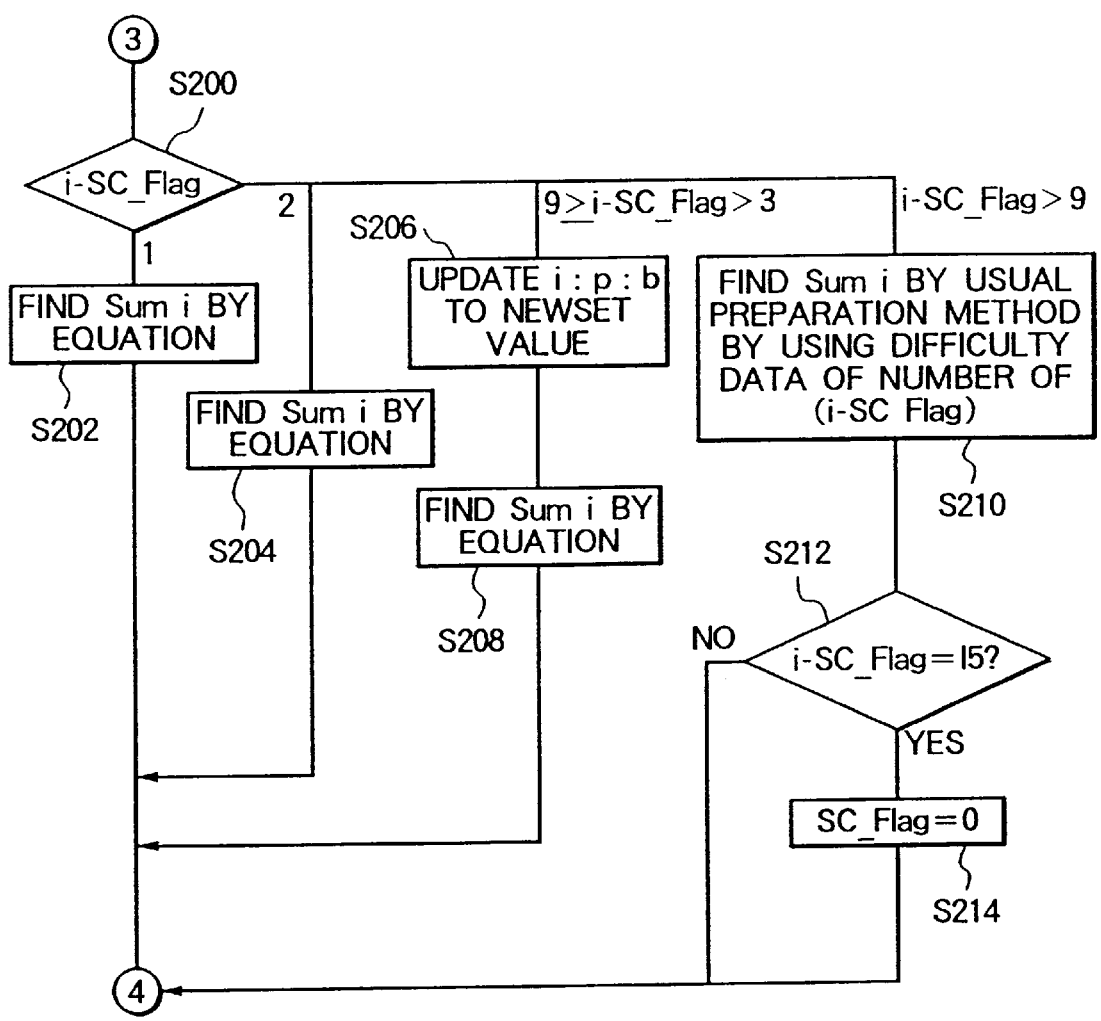

FIGS. 23(A) and 23(B) are views of the processing for prediction of the sum value $Sum_i$ and the calculation of the target amount of data $T_i$ in the improved predictive simplified 2-path encoding system in the third embodiment.

Note that, in FIGS. 23(A) and 23(B), data SC_Flag indicates the position of a scene change when a scene change has been caused within the past 14 pictures and is set to 0 in cases other than this. Further, the value of the data I_Flag becomes 1 until the processing for three pictures is ended immediately after the I-picture in the picture type sequence shown in FIGS. 20(A) to 20(C) and becomes 0 in cases other than this. Further, the coefficients Ith1, Ith2, Pth, and Bth indicate the coefficients used for determining the values of the (I-picture, P-pictures, and B-pictures at the time of detection of a scene change.

As shown in FIG. 23(A), at step 100 (S100), the host computer 20 obtains predetermined data from the encoder 162 and generates the actual difficulty data $D_i$.

At step 102 (S102), the host computer 20 decides whether or not the value of the data SC_Flag is 0. When the value of the data SC_Flag is 0, the operation routine proceeds to the processing of S200 (FIG. 12), while when it is not 0, the operating routine proceeds to the processing of S104.

At step 104 (S104), the host computer 20 decides the type of the i-th picture (picture type). Where the i-th picture is a B-picture, P-picture, and I-picture, it proceeds to the processing of S106, S120, and S128, respectively.

At step 106 (S106), the host computer 20 decides whether or not the value of the data I_Flag is 0. Where the value of the data I_Flag is 0, it proceeds to the processing of S110, while where it is not 0, it proceeds to the processing of S108.

At step 108 (S108), the host computer 20 decides whether or not the actual difficulty data $D_i$ of the B-picture is larger than the predictive difficulty data $D'_i \times B_{th}$. Where it is larger than the latter, it proceeds to the processing of S112, while when it is smaller than the latter, it proceeds to the processing of S110.

At step 110 (S110), the host computer 20 performs the same processing as that in the case where a scene change is not caused to calculate the predictive difficulty data $D'_i$.

At step 112 (S112), the host computer 20 brings the value of the data SC_Flag to 1.

At step 114 (S114), the host computer 20 calculates the sum value $Sum_i$ by Equation 4 where the i-th picture is the first B-picture after the scene change and calculates the sum value $Sum_i$ by Equation 9 where it is the second B-picture after the scene change.

At step 116 (S116), the host computer 20 inserts the predicted sum value $Sum_i$ or the predictive difficulty data $D'_i$ in above Equation 4 and calculates the target amount of data $T_i$ (target bit) for the i-th picture.

At step 118 (S118), the host computer 20 increments the data i.

At step 120 (S220), the host computer 20 decides whether or not the actual difficulty data $D_i$ of the P-picture is larger than the predictive difficulty data $D'_i \times Pth$. When it is larger than the latter, it goes to the processing of S122, while when it is smaller than the latter, it goes to the processing of S110.

At step 122 (S122), the host computer 20 inserts the data in the data SC_Flag.

At step 124 (S124), the host computer 20 makes the value of the data I_Flag 0.

At step 126 (S126), the host computer 20 predicts the sum value $Sum_i$ by using Equation 3.

At step 128 (S220), the host computer 20 decides whether or not the actual difficulty data $D_i$ of the I-picture is out of the range of the predictive difficulty data $D'_i \times Ith1$ to predictive difficulty data $D'_i \times Ith2$. Where it is out of the range, it proceeds to the processing of S130, while where it is within the range, it proceeds to the processing of S110.

At step 130 (S130), the host computer 20 inserts the data i in the data SC_Flag.

At step 132 (S132), the host computer 20 makes the value of the data I_Flag 1 and proceeds to the processing of S126.

As shown in FIG. 23(B), at step 200 (S200), the host computer 20 proceeds to the processing of S202, S204, S206, and S210 when the values obtained by subtracting the data SC_Flag from the data i are 1, 2, 3 to 9, and over 9, respectively.

At step 202 (S202), the host computer 20 predicts the sum value $Sum_i$ by Equation 4 and proceeds to the processing of S116 (FIG. 23(A)).

At step 204 (S204), the host computer 20 predicts the sum value $Sum_i$ by Equation 5 and proceeds to the processing of S116 (FIG. 23(A)).

At step 206 (S206), the host computer 20 replaces the ratio (i:p:b) found in advance in Equation 5 with the calculated actual difficulty data.

At step 208 (S208), the host computer 20 predicts the sum value $Sum_i$ by using Equation 5 in which the ratio (i:p:b) is replaced with the calculated actual difficulty data.

At step 210 (S210), the host computer 20 performs the linear approximation by using the actual difficulty data of an amount of (i−SC_Flag) pictures and calculates the sum value $Sum_i$ (predictive difficulty data $D'_i$).

At step 212 (S212), the host computer 20 decides whether or not (i−SC_Flag)=15. Where (i−SC_Flag)=15, the operating routine proceeds to the processing of S214. Where (i−SC_Flag) is not equal to 15, it proceeds to the processing of S110 (FIG. 23(A)).

The host computer 20 sets the target amount of data $T_j$ generated by the processing explained above in a quantization control circuit 180 of the encoder 18.

The encoder 18 performs the compression and coding by changing the first P-picture of the later scene to the I-picture so that it does not refer to the last picture of the previous scene as shown in FIG. 20(C) based on the target amount of data $T_j$ set from the host computer 20 and changing the last I-picture of the previous scene to the P-picture and outputs the resultant data as the compressed video data VOUT similar to that in the first embodiment and the second embodiment.

As described above, according to the improved predictive simplified 2-path encoding system shown in the third embodiment, the compression and coding are possible by allocating a larger amount of data to the video data containing a scene change, camera flash, etc. In addition, the coding distortion caused before or after the scene change and camera flash can be conspicuously reduced. Accordingly, the quality of the video obtained by expanding and decoding the compressed video data generated by the improved predictive simplified 2-path encoding system shown in the third embodiment can be improved.

Note that, in the third embodiment, Equation 3 to Equation 5 suited to the processing for a picture sequence of N=15 and M=3 were given as examples, but by suitably changing Equation 3 to Equation 5 (changing coefficients 4 and 10 in Equation 3 to Equation 5 in accordance with the picture sequence), the improved predictive simplified 2-path encoding system can be applied to other picture sequences as well.

As mentioned above, according to the video data compressing apparatus of the present invention and the method of the same, the compressed video data can be generated by compressing and coding video data continuously containing a plurality of scenes to the predetermined amount of data or less without relying on 2-path encoding and, in addition, the quality of the video obtained by expanding and decoding the compressed video data obtained by compressing and coding the boundary (scene change) part in the time direction of a successive plurality of scenes can be held.

In the above embodiments, the target amount of data may be determined based upon both actual difficulty data and predicted difficulty data wherein the predicted difficulty data may be obtained in accordance with the 1st–5th stages. Briefly, in the 1st stage, if difficulty data of one frame is known at a scene change, equations 2 and 3 may be utilized; in the 2nd stage, if other frames after the scene change are known, the α of equation 3 may be varied in accordance with the other difficulty data; in the 3rd stage, other difficulty data may be known; in the 4th stage, if the next frame is a P picture, the I/P ratio may be calculated; and, in the 5th stage, if sufficient data is available (for example, 6 or more), data may be predicted using a linear, polynomial, or other curve fit techniques.

Thus, the above embodiments may enable the quality of a video obtained by compressing and coding a boundary part in a time direction of a plurality of scenes to be maintained. That is, where a scene change is not caused in edited video data, predictive difficulty data $D'_{16}$ to $D'_{30}$ are calculated based on the generated actual difficulty data $D_1$ to $D_{15}$ and the target value data is calculated. Where a scene change is caused, the actual difficulty data $D_{15}$ of the first picture of the later scene is multiplied by the coefficient based on the ratio of the values of the actual difficulty data for every picture type, a constant indicating a margin anticipating an increase of the amount of data of the B-picture is added, the sum value of the difficulty data is predicted, and the target amount of data is calculated. Further, the constant is corrected based on the actual difficulty data of the newly obtained B-picture. Finally, at a stage where the predetermined number of the actual difficulty data are obtained, the target amount of data is calculated by returning to the method the same as that in the case where a scene change is not caused.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A video data compressing apparatus having:

first compressing and coding means for compressing and coding noncompressed video data which is input for every picture by a predetermined compressing and coding method to generate first compressed and coded data;

delaying means for delaying the noncompressed video data by exactly a time during which a predetermined number of pictures of the noncompressed video data is input;

target value data generating means for generating the target value data indicating the target value of the amount of compressed video data after compressing and coding the noncompressed video data for every picture based on the amount of the first compressed and coded data generated during a period when the predetermined number of pictures of the noncompressed video data is input; and second compressing and coding means for compressing and coding the delayed noncompressed video data for every picture so that the amount has a value indicated by the generated target value data by a compressing and coding method corresponding to the compressing and coding method of the first compressing and coding means to generate second compressed and coded data, wherein the target value data generating means predicts the amount of still ungenerated first compressed and coded data based on the amount of the first compressed and coded data generated during a period when the predetermined number of pictures of the noncompressed video data is input to generate the target value data based on the amount of the generated first compressed and coded data and the amount of predicted still ungenerated first compressed and coded data.

2. A video data compressing apparatus as set forth in claim 1, wherein the delaying means delays the noncompressed video data by exactly a time for which L number of pictures of the noncompressed video data is input; and when the second compressing and coding means compresses and codes a j-th picture of the delayed noncompressed video data, the target value data generating means predicts the amount of data of a (J+L)th picture to a (J+L+B)th picture of the first compressed video data based on the amount of data of a (J−A)th picture to a (J+L−1)th picture of first compressed video data generated by compressing and coding the (J−A)th picture to the (J+L−1)th picture of the noncompressed video data by the first compressing and coding means, and generates the target value data based on the amount of data of the (J−A)th picture to the (J+L−1)th picture of the first compressed video data and the (J+L)th picture to the (J+L+B)th picture of predicted first compressed video data (where, A, B, and j are integers).

3. A video data compressing apparatus as set forth in claim 2, wherein:

the target value data generating means finds a predetermined function based on a mean value of the amount of data of the (J−A)th picture to the (J+L−1)th picture of generated first compressed video data and a change of the amount of data of the (J−A)th picture to the (J+L−1)th picture of the first compressed video data along with the elapse of time;

predicts the amount of data of the (J+L)th picture to the (J+L+B)th picture of the first compressed video data based on the found predetermined function; and generates the target value data based on the amount of data of the (J−A)th picture to the (J+L−1)th picture of the first compressed video data and the amount of data of the (J+L)th picture to the (J+L+B)th picture of the predicted first compressed video data.

4. A video data compressing apparatus as set forth in claim 3, wherein the target value data generating means finds the predetermined function by integrating a primary function approximating the amount of data of the (J−A)th picture to the (J+L−1)th picture of the first compressed video data indicated by this function and the change of the amount of data of the (J−A)th picture to the (J+L−1)th picture of the generated first compressed video data along with the elapse of time.

5. A video data compressing apparatus as set forth in claim 3, wherein the target value data generating means finds the predetermined function so that a square sum of each of the values of difference between the amount of data of the (J−A)th picture to the (J+L−1)th picture of the first compressed video data indicated by this predetermined function and the amount of data of the (J−A)th picture to the (J+L−1)th picture of the generated first compressed video data or an absolute value sum becomes a minimum.

6. A video data compressing apparatus as set forth in claim 5, wherein the target value data generating means uses the primary function as the predetermined function.

7. A video data compressing apparatus as set forth in claim 6, wherein the target value data generating means finds the predetermined function by performing weighing greater for the value of the difference nearer the j-th picture of the first compressed video data in time.

8. A video data compressing apparatus as set forth in claim 1, wherein:

the first compressing and coding means generates first compressed video data in GOP units by compressing and coding the noncompressed video data which is input and the target value data generating means predicts the amount of data of the still ungenerated first compressed and coded data in units of GOPs based on the amount of data of the GOP units of the first compressed video data.

9. A video data compressing apparatus as set forth in claim 1, wherein:

the first compressing and coding means compresses and codes the noncompressed video data which is input to generate first compressed video data in GOP units containing a plurality of types of pictures and the target value data generating means normalizes the amount of data of the first compressed video data for every type of the pictures contained in the GOP of the first compressed video data and predicts the amount of data of the still ungenerated first compressed and coded data based on the amount of data of normalized first compressed video data.

10. A video data compression method comprising the steps of:

compressing and coding noncompressed video data which is input for every picture by a predetermined compressing and coding method to generate first compressed and coded data;

delaying the noncompressed video data by exactly a time in which a predetermined number of pictures of the noncompressed video data is input;

predicting the amount of still ungenerated first compressed and coded data based on the amount of the first compressed and coded data generated during a period when the predetermined number of pictures of the noncompressed video data is input;

generating target value data indicating the target value of the amount of compressed video data after compressing and coding the noncompressed video data for every picture based on the amount of data of the generated first compressed and coded data and the amount of data of predicted still ungenerated first compressed and coded data; and compressing and coding by the predetermined compressing and coding method delayed noncompressed video data for every picture to generate second compressed and coded data so that the amount of data has a value indicated by the target value data generated in the step of generating.

11. A video data compressing method as set forth in claim 10, comprising:

delaying the noncompressed video data by exactly a time during which L number of pictures of the noncompressed video data is input;

when compressing and coding the j-th picture of delayed noncompressed video data to generate the second compressed and coded data, predicting the amount of data from the (J+L)th picture to the (J+L+B)th picture of first compressed video data based on the amount of data of the (J−A)th picture to the (J+L−1)th picture of the first compressed video data generated by compressing and coding the (J−A)th picture to the (J+L−1)th picture of the noncompressed video data and generating the target value data based on the amount of data of the (J−A)th picture to the (J+L−1)th picture of the first compressed video data and the (J+L)th picture to the (J+L+B)th picture of predicted first compressed video data (where, A, B, and j are integers).

12. A video data compressing method as set forth in claim 10, comprising:

finding a predetermined function based on a calculated mean value and the change of the amount of data of the (J−A)th picture to the (J+L−1)th picture of the first compressed video data along with the elapse of time;

predicting the amount of data of from the (J+L)th picture to the (J+L+B)th picture of the first compressed video data based on the found predetermined function; and generating the target value data based on the amount of data of the (J−A)th picture to the (J+L−1)th picture of the first compressed video data and the (J+L)th picture to the (J+L+B)th picture of the predicted first compressed video data (where, A, B, and j are integers).

13. A video data compressing method as set forth in claim 12, comprising:
finding the predetermined function by integrating a primary function approximating the amount of data of the (J−A)th picture to the (J+L−1)th picture of the first compressed video data indicated by this function and the change of the amount of data of the (J−A)th picture to the (J+L−1)th picture of the generated first compressed video data along with the elapse of time.

14. A video data compressing method as set forth in claim 12, comprising:
finding the predetermined function so that a square sum of the values of difference between the amount of data of the (J−A)th picture to the (J+L−1)th picture of the first compressed video data indicated by this predetermined function and the amount of data of the (J−A)th picture to the (J+L−1)th picture of the generated first compressed video data or an absolute value sum becomes a minimum.

15. A video data compressing method as set forth in claim 14, wherein
the predetermined function is the primary function.

16. A video data compressing method as set forth in claim 15, comprising
finding the predetermined function by performing weighing greater for the value of the difference nearer the j-th picture of the first compressed video data in time.

17. A video data compressing method as set forth in claim 10, comprising:
compressing and coding the noncompressed video data which is input to generate first compressed video data in GOP units and
predicting the amount of data of the still ungenerated first compressed and coded data in units of GOPs based on the amount of data in GOP units of the first compressed video data.

18. A video data compressing method as set forth in claim 10, comprising:
compressing and coding the noncompressed video data which is input to generate first compressed video data in GOP units containing the plurality of types of pictures and
normalizing the amount of data of the first compressed video data for every type of the pictures contained in the GOPs of the first compressed video data and predicting the amount of data of the still ungenerated first compressed and coded data based on the amount of data of the normalized first compressed video data.

19. A video data compressing apparatus having:
picture rearranging means for rearranging pictures of a successive plurality of series of noncompressed video data in a predetermined order;
first compressing means for compressing the plurality of series of noncompressed video data rearranged in order by a predetermined compressing method by a predetermined picture type sequence comprised of a plurality of types of pictures to generate first compressed video data;
delaying means for delaying the noncompressed video data by exactly a time during which a predetermined number of pictures of the noncompressed video data are input;
target value data generating means for generating target value data indicating the target value of the amount of data of each of the pictures of the compressed video data generated from the plurality of series of noncompressed video data based on a sum of the amounts of data of the first compressed video data generated during a period where the predetermined number of pictures of the noncompressed video data are input and on the type of the picture of the first compressed video data generated from the picture of a boundary part of a time direction of the plurality of series of noncompressed video data; and
a second compressing means for compressing a delayed plurality of series of noncompressed video data by a compressing method corresponding to the compressing method of the first compressing means so that the amount of data becomes the target value indicated by the generated target value data to generate second compressed video data individually corresponding to the plurality of series of noncompressed video data.

20. A video data compressing apparatus as set forth in claim 19, wherein the target value data generating means further has:
boundary detecting means for detecting a boundary of the plurality of series of noncompressed video data based on a change of the amount of data of the first compressed video data;
sum predicting means for predicting the sum of the amounts of data of the first compressed video data based on the types of the pictures of the first compressed video data generated from the leading picture of the plurality of series of noncompressed video data and the amount of data thereof; and
target value data calculating means for calculating the target value data indicating the target value of the amount of data of the compressed video data generated from a predetermined number of pictures after the boundary of the plurality of series of noncompressed video data based on the sum of the predicted amounts of data of the first compressed video data.

21. A video data compressing apparatus as set forth in claim 20, wherein the boundary detecting means detects the boundary of the plurality of series of noncompressed video data immediately before a P-picture with an amount of data which becomes large when the amount of data of a P-picture of the first compressed video data becomes larger than the amount of data of the P-picture immediately before it by a predetermined proportion or more in the predetermined picture type sequence.

22. A video data compressing apparatus as set forth in claim 20, wherein the boundary detecting means detects the boundary of the plurality of series of noncompressed video data immediately before an I-picture immediately before a B-picture with an amount of data which becomes large where the amount of data of a B-picture of the first compressed video data becomes larger than the amount of data of the B-picture immediately before this by a predetermined proportion or more in the predetermined picture type sequence.

23. A video data compressing apparatus as set forth in claim 20, wherein provision is further made of a data amount predicting means for predicting the amount of data of each of the pictures of compressed video data generated from the noncompressed video data and where the ratio between the amount of data of the pictures of the corresponding first compressed video data and the predicted amount of data of the pictures of the compressed video data is a predetermined value or more, a boundary of the noncompressed video data is detected.

24. A video data compressing apparatus as set forth in claim 20, wherein:
- the first compressing means compresses the plurality of series of noncompressed video data by a picture type sequence comprised of an I-picture, P-pictures, and B-pictures;
- the picture rearranging means rearranges the pictures of the plurality of series of noncompressed video data in order so that a P-picture or I-picture is generated from the leading picture of the plurality of series of noncompressed video data; and
- the sum predicting means calculates a multiplication value by multiplying the amount of data of the P-picture of the first compressed video data generated from the leading picture of the noncompressed video data by a coefficient based on the ratio among the amounts of data of the I-picture, P-pictures, and the B-pictures where a P-picture is generated from the leading picture of the noncompressed video data and adds a predetermined constant to this to predict the sum of the amount of data of the first compressed video data.

25. A video data compressing apparatus as set forth in claim 24, wherein:
- the sum predicting means corrects the predetermined constant to be added to the multiplication value based on the amounts of data of the B-pictures of the first compressed video data generated from the second and subsequent pictures from the head of the noncompressed video data to predict the sum of the amount of data of the first compressed video data.

26. A video data compressing apparatus as set forth in claim 20, wherein:
- the first compressing means compresses the plurality of series of noncompressed video data by a picture type sequence in which a set of a predetermined number of B-pictures is regularly sandwiched by pictures of a type other than a B-picture;
- the picture rearranging means rearranges the pictures of the plurality of series of noncompressed video data in order so that a picture other than a B-picture is generated from the leading picture of the plurality of series of noncompressed video data;
- where an I-picture is generated from the leading picture of the noncompressed video data, the sum predicting means
- multiplies the amount of data of the I-picture of the first compressed video data generated from the leading picture of the noncompressed video data by a coefficient based on the ratio among the amounts of data of the plurality of types of pictures constituting the picture type sequence to calculate a multiplication value;
- corrects a predetermined constant to be added to the multiplication value based on at least the amount of data of the set of B-pictures to predict the sum of the amounts of data of the first compressed video data; and
- the target value data calculating means calculates the target value data indicating the target value of the amount of data of compressed video data after the first set of B-pictures generated from the plurality of series of noncompressed video data based on the sum of the predicted amounts of data of the first compressed video data.

27. A video data compressing method comprising the steps of:
- rearranging the pictures of a successive plurality of series of noncompressed video data in a predetermined order;
- compressing the plurality of series of noncompressed video data rearranged in order by a predetermined compressing method by a predetermined picture type sequence comprised by a plurality of types of pictures;
- delaying the noncompressed video data by exactly a time during which the predetermined number of pictures of the noncompressed video data are input;
- generating target value data indicating the target value of the amount of data of each of the pictures of compressed video data generated from the plurality of series of noncompressed video data based on the sum of the amounts of data of first compressed video data generated during the period when the predetermined number of pictures of the noncompressed video data are input and on the type of the picture of the first compressed video data generated from the picture of the boundary part in the time direction of the plurality of series of noncompressed video data; and
- compressing the delayed plurality of series of noncompressed video data by the compressing method corresponding to the compressing method of a first compressing means so that the amount of data thereof becomes the target value indicated by the generated target value data to generate second compressed video data individually corresponding to the plurality of series of noncompressed video data.

28. A video data compressing method as set forth in claim 27, comprising
- detecting a boundary of the plurality of series of noncompressed video data based on the change of the amount of data of the first compressed video data;
- predicting the sum of the amounts of data of the first compressed video data based on the types and amounts of data of the pictures of the first compressed video data generated from the leading picture of the plurality of series of noncompressed video data; and
- calculating the target value data indicating the target value of the amount of data of the compressed video data generated from the predetermined number of pictures after the boundary of the plurality of series of noncompressed video data based on the sum of the predicted amounts of data of the first compressed video data.

29. A video data compressing method as set forth in claim 27, comprising
- detecting a boundary of the plurality of series of noncompressed video data immediately before a P-picture with an amount of data which becomes large where the amount of data of a P-picture of the first compressed video data becomes larger than the amount of data of the P-picture immediately before it by a predetermined proportion or more in a predetermined picture type sequence.

30. A video data compressing method as set forth in claim 27, comprising
- detecting a boundary of the plurality of series of noncompressed video data immediately before an I-picture immediately before a B-picture with an amount of data which becomes large where the amount of data of a B-picture of the first compressed video data becomes larger than the amount of data of the B-picture immediately before this by a predetermined proportion or more in the predetermined picture type sequence.

31. A video data compressing method as set forth in claim 27, comprising predicting the amount of data of each of the pictures of the compressed video data generated from the noncompressed video data and detecting a boundary of the noncompressed video data where the ratio between the amount of data of the pictures of the corresponding first compressed video data and the predicted amount of data of the pictures of the compressed video data is a predetermined value or more.

32. A video data compressing method as set forth in claim 27, comprising compressing the plurality of series of noncompressed video data by a picture type sequence comprised of an I-picture, P-pictures, and B-pictures;

rearranging the pictures of the plurality of series of noncompressed video data in order so that a P-picture or an I-picture is generated from the leading picture of the plurality of series of noncompressed video data; and multiplying the amount of data of the P-picture of the first compressed video data generated from the leading picture of the noncompressed video data by a coefficient based on the ratio among the amounts of data of the I-picture, P-pictures, and B-pictures where a P-picture is generated from the leading picture of the noncompressed video data to calculate a multiplication value and adding a predetermined constant to predict the sum of the amounts of data of the first compressed video data.

33. A video data compressing method as set forth in claim 32, comprising correcting the predetermined constant to be added to the multiplication value based on the amount of data of the B-pictures of the first compressed video data generated from the second and subsequent pictures from the head of the noncompressed video data to predict the sum of the amounts of data of the first compressed video data.

34. A video data compressing method as set forth in claim 27, comprising compressing the plurality of series of noncompressed video data by a picture type sequence in which a set of a predetermined number of B-pictures is regularly sandwiched by pictures of a type other than a B-picture;

rearranging the pictures of the plurality of series of noncompressed video data in order so that a picture other than a B-picture is generated from the leading picture of the plurality of series of noncompressed video data;

where an I-picture is generated from the leading picture of the noncompressed video data, multiplying the amount of data of the I-picture of the first compressed video data generated from the leading picture of the noncompressed video data by a coefficient based on the ratio among the amounts of data of the plurality of types of pictures constituting the picture type sequence to calculate a multiplication value;

correcting a predetermined constant to be added to the multiplication value based on at least the amount of data of the set of B-pictures to predict the sum of the amounts of data of the first compressed video data; and calculating the target value data indicating the target value of the amount of data of the compressed video data after the first set of B-pictures generated from the plurality of series of noncompressed video data based on the sum of the predicted amounts of data of the first compressed video data.

* * * * *